US009102570B2

(12) United States Patent
Joo et al.

(10) Patent No.: US 9,102,570 B2
(45) Date of Patent: Aug. 11, 2015

(54) PROCESS OF MAKING METAL AND CERAMIC NANOFIBERS

(75) Inventors: Yong Lak Joo, Ithaca, NY (US); Nathaniel S. Hansen, Ithaca, NY (US); Daehwan Cho, Ithaca, NY (US)

(73) Assignee: CORNELL UNIVERSITY, Ithaca, NY (US)

(*) Notice: Subject to any disclaimer, the term of this patent is extended or adjusted under 35 U.S.C. 154(b) by 536 days.

(21) Appl. No.: 13/451,960

(22) Filed: Apr. 20, 2012

(65) Prior Publication Data

US 2012/0282484 A1    Nov. 8, 2012

Related U.S. Application Data

(60) Provisional application No. 61/478,082, filed on Apr. 22, 2011.

(51) Int. Cl.
*C04B 35/64* (2006.01)
*C04B 35/65* (2006.01)
(Continued)

(52) U.S. Cl.
CPC ....... *C04B 35/62236* (2013.01); *C04B 35/6224* (2013.01); *C04B 35/6225* (2013.01);
(Continued)

(58) Field of Classification Search
CPC .......... C40B 35/64; C40B 35/65; C22B 5/00; D01D 5/003; D01D 5/0038; D01D 5/30; D01D 5/32; D01D 5/34
USPC ............ 264/10, 172.14, 172.15, 211.16, 464, 264/465, 466, 484, 623, 639; 75/330, 345
See application file for complete search history.

(56) References Cited

U.S. PATENT DOCUMENTS

| | | | |
|---|---|---|---|
| 2,810,426 | A | 10/1957 | Till et al. |
| 7,575,707 | B2 | 8/2009 | Xia et al. |

(Continued)

FOREIGN PATENT DOCUMENTS

| | | |
|---|---|---|
| CN | 101126179 A | 2/2008 |
| EP | 1867762 B1 | 9/2008 |

(Continued)

OTHER PUBLICATIONS

The International Bureau of WIPO, International Preliminary Report on Patentability for Corresponding International Application No. PCT/US2011/024894, Dated Aug. 21, 2012 (9 pages).

(Continued)

*Primary Examiner* — Leo B Tentoni
(74) *Attorney, Agent, or Firm* — William Greener; Alek Szecsy; Bond, Schoeneck & King, PLLC

(57) ABSTRACT

Provided herein are nanofibers and processes of preparing nanofibers. In some instances, the nanofibers are metal and/or ceramic nanofibers. In some embodiments, the nanofibers are high quality, high performance nanofibers, highly coherent nanofibers, highly continuous nanofibers, or the like. In some embodiments, the nanofibers have increased coherence, increased length, few voids and/or defects, and/or other advantageous characteristics. In some instances, the nanofibers are produced by electrospinning a fluid stock having a high loading of nanofiber precursor in the fluid stock. In some instances, the fluid stock comprises well mixed and/or uniformly distributed precursor in the fluid stock. In some instances, the fluid stock is converted into a nanofiber comprising few voids, few defects, long or tunable length, and the like.

18 Claims, 46 Drawing Sheets

(51) Int. Cl.

| | |
|---|---|
| *C22B 5/00* | (2006.01) |
| *D01D 5/30* | (2006.01) |
| *D01D 5/32* | (2006.01) |
| *C04B 35/622* | (2006.01) |
| *D01D 5/00* | (2006.01) |
| *D01D 5/34* | (2006.01) |
| *D01F 9/10* | (2006.01) |
| *H01M 4/86* | (2006.01) |
| *H01M 4/88* | (2006.01) |
| *C04B 35/634* | (2006.01) |
| *C04B 35/636* | (2006.01) |

(52) U.S. Cl.
CPC ..... *C04B35/62231* (2013.01); *C04B 35/62259* (2013.01); *C04B 35/6365* (2013.01); *C04B 35/63416* (2013.01); *C04B 35/63424* (2013.01); *C04B 35/63444* (2013.01); *C04B 35/63456* (2013.01); *C04B 35/63488* (2013.01); *D01D 5/0038* (2013.01); *D01D 5/0069* (2013.01); *D01D 5/34* (2013.01); *D01F 9/10* (2013.01); *H01M 4/8621* (2013.01); *H01M 4/8882* (2013.01); *C04B 2235/3234* (2013.01); *C04B 2235/3244* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3293* (2013.01); *C04B 2235/449* (2013.01); *C04B 2235/526* (2013.01); *C04B 2235/5296* (2013.01); *C04B 2235/5409* (2013.01); *Y02E 60/50* (2013.01); *Y10T 428/12431* (2015.01); *Y10T 428/298* (2015.01)

(56) References Cited

U.S. PATENT DOCUMENTS

| | | | |
|---|---|---|---|
| 2006/0013869 | A1 | 1/2006 | Ignatious et al. |
| 2006/0049542 | A1 | 3/2006 | Chu et al. |
| 2007/0018361 | A1 | 1/2007 | Xu |
| 2008/0233284 | A1 | 9/2008 | Kim et al. |
| 2008/0261043 | A1 | 10/2008 | Greiner et al. |
| 2009/0093585 | A1 | 4/2009 | Smith et al. |
| 2010/0028674 | A1 | 2/2010 | Ochanda |
| 2010/0155691 | A1 | 6/2010 | Lee et al. |
| 2011/0151255 | A1* | 6/2011 | Kim et al. ............ 264/465 X |

FOREIGN PATENT DOCUMENTS

| | | |
|---|---|---|
| EP | 2204349 A1 | 7/2010 |
| EP | 2267199 A2 | 12/2010 |
| JP | 2009275339 A | 11/2009 |
| JP | 2010145388 A | 7/2010 |
| KR | 10-0675923 B1 | 1/2007 |
| KR | 10-0995154 B1 | 11/2010 |
| KR | 10-1014260 B1 | 2/2011 |
| WO | 2008030457 A2 | 3/2008 |
| WO | 2010122049 A1 | 10/2010 |

OTHER PUBLICATIONS

Kong, et al., Nanofiber Deposition by Electroblowing of PVA (Polyvinyl Alcohol), Jan. 13, 2009, Journal of Materials Science, vol. 44, pp. 1107-1112.
Patent Corporation Treaty PCT International Search Report for International Application No. PCT/US2012/053097, dated Aug. 30, 2012 (4 pages).
Ramakrishna, et al., "Electrospun nanofibers: Dolving Global Issues", Mar. 2006, Materials Today, vol. 9, No. 3, pp. 40-50.
Ramaseshan, et al., "Nanostructured Ceramics by Electrospinning", 2007, Journal of Applied Physics, vol. 102, pp. 111101-1-111101-17.
Ruffo, et al., "Impedance Analysis of Silicon Nanowire Lithium Ion Battery Anodes", 2009, Journal of Physical Chemistry, vol. 113, pp. 11390-11398.
Scrosati, Bruno and Garche, Jürgen, "Lithium Batteries: Status, Prospects and Future", 2010, Journal of Power Sources, vol. 195, pp. 2419-2430.
Siani, et al., "Improved CO Oxidation Activity in the Presence and Absence of Hydrogen Over Cluster-Derived PtFe/SiO2 Catalysts", 2006, Langmuir, vol. 22, pp. 5160-5167.
Song, et al., "Arrays of Sealed Silicon Nanotubes As Anodes for Lithium Ion Batteries", 2010, Nano Letters, vol. 10, pp. 1710-1716.
Srivastava, et al., "Electrospinning of Hollow and Core/Sheath Nanofibers Using a Microfluidic Manifold", 2007, Microfluid Nanofluid, DOI 10.1007/s10404-007-0177-0.
Tang, et al., "Solution-Processed Core—Shell Nanowires for Efficient Pphotovoltaic Cells", Aug. 21, 2011, Nature Nanotechnology, vol. 6, pp. 568-572.
Teo, W.E. and Ramakrishna, S., "A Review on Electrospinning Design and Nanofibre Assemblies", 2006, Nanotechnology, vol. 17, pp. R89-R106.
Wang, et al., "Advanced Asymmetrical Supercapacitors Based on Graphene Hybrid Materials", 2011, Nano Research, vol. 4(8), pp. 729-736.
Wang, et al., "Conducting Polyaniline Nanowire Arrays for High Performance Supercapacitors", 2010, Journal of Physical Chemistry C, vol. 114, pp. 8062-8067.
Wang, et al., "Flexible Supercapacitors Based on Cloth-Supported Electrodes of Conducting Polymer Nanowire Array/SWCNT Composites", 2011, Journal of Materials Chemistry, vol. 21, pp. 16373-16378.
Werner, et al., "Electrical Conductivity of InN Nanowires and the Influence of the Native Indium Oxide Formed at Their Surface", 2009, Nano Letters, vol. 9, No. 4, pp. 1567-1571.
Woodruff, et al., "Vertically Oriented Germanium Nanowires Grown From Gold Colloids on Silicon Substrates and Subsequent Gold Removal", 2007, Nano Letters, vol. 7, No. 6, pp. 1637-1642.
Wu, et al., "Electrospinning of Fe, Co, and Ni Nanofibers: Synthesis, Assembly, and Magnetic Properties", 2007, Cheristry Materials, vol. 19, pp. 3506-3511.
Wu, et al., "Electrospun Metal Nanofiber Webs as High-Performance Transparent Electrode", 2010, Nano Letters, vol. 10, pp. 4242-4248.
Wu, et al., "Electrospun Metal Nanofiber Webs as High PerformanceTransparent Electrode", Department of Material Science and Engineering and Electrical Engineering, Stanford University, Stanford, CA 94305.
Wu, Bin and Boland, John J., "Synthesis and Dispersion of Isolated High Aspect Ratio Gold Nanowires", 2006, Journal of Colloid and Interface Science, vol. 303, pp. 611-616.
Xia, et al., "MnO2 Nanotube and Nanowire Arrays by Electrochemical Deposition for Supercapacitors", 2010, Journal of Power Sources, vol. 195, pp. 4410-4413.
Xu, et al., "Hierarchical Nanoporous PtFe Alloy With Multimodal Size Distributions and Its Catalytic Performance Toward Methanol Electrooxidation", 2012, Langmuir, vol. 28, pp. 1886-1892.
Yang, et al., "Semiconductor Nanowire: What's Next?", 2010, Nano Letters, vol. 10, pp. 1529-1536.
Yu, et al., "Enhancing the Supercapacitor Performance of Graphene/ MnO2 Nanostructured Electrodes by Conductive Wrapping", 2011, Nano Letters, vol. 11, pp. 4438-4442.
Zhang, et al., "Anisotropic Lithium Insertion Behavior in Silicon Nanowires: Binding Energy, Diffusion Barrier, and Strain Effect", The Journal of Physical Chemistry C, dx.doi.org/10.1021/ jp1115977.
Zhang, et al., "Lithium Insertion in Silicon Nanowires: An ab Initio Study", 2010, Nano Letters, vol. 10, pp. 3243-3249.
Zheng, et al., "Paper Supercapacitors by a Solvent-Free Drawing Method", Energy Environmental Science, Article.
Zhu et al., "Amorphous Silicon Core-Shell Nanowire Solar Cells", Department of Electrical Engineering, Stanford University, Stanford, CA 94305, U.S.A.
Zhu, et al., "Hyperbranched Lead Selenide Nanowire Networks", Published on Web Mar. 10, 2007, Nano Letters, 10.1021/nl0700393.

(56) References Cited

OTHER PUBLICATIONS

Zhu, Jia and Mi, Yi, "More Solar Cells for Less", 2010, Nature Materials, vol. 9, pp. 183-184.
Zhu, et al., "Nanodome Solar Cells with Efficient Light Management and Self-Cleaning", 2010, Nano Letters, vol. 10, pp. 1979-1984.
Zhu, et al., "Nanostructured Photon Management for High Performance Solar Cells", 2010, Materials Science and Engineering, R70, pp. 330-340.
Alvarez, et al., "Conductive-Probe Atomic Force Microscopy Characterization of Silicon Nanowire", Nanoscale Research Letters, 2011, vol. 6.
Bae, et al., "Fiber Supercapacitors Made of Nanowire-Fiber Hybrid Structures for Wearable/Flexible Energy Storage", Wiley-VCH Verlag GmbH & Co. KGaA, Weinheim, Angew. Chem. Int. Ed. 2011, vol. 50, pp. 1683-1687.
Bakhoum, Ezzat G., "New Mega-Farad Ultracapacitors", IEEE Transactions on Ultrasonics, Ferroelectrics, and Frequency Control, Januray 2009, vol. 56, No. 1.
Barakat, et al., "Production of Smooth and Pure Nickel Metal Nanofibers by the Electrospinning Technique: Nanofibers Possess Splendid Magnetic Properties", J. Phys. Chem. C, 2009, vol. 113, pp. 531-536.
Bazilevsky, et al., "Co-Electrospinning of Core—Shell Fibers Using a Single-Nozzle Technique", Langmuir, 2007 vol. 23, pp. 2311-2314.
Chakrapani, et al., "Quaternary Ammonium Ionic Liquid Electrolyte for a Silicon Nanowire-Based Lithium Ion Battery", Journal of Physical Chemistry C, 2011, vol. 115, pp. 22048-22053.
Chan, et al., "High Capacity Li Ion Battery Anodes Using Ge Nanowires", Nano Letters, 2008, vol. 8, No. 1. pp. 307-309.
Chan, et al., "High-Performance Lithium Battery Anodes Using Silicon Nanowires", Nature Nanotechnology, Jan. 2008, vol. 3, pp. 31-35.
Chan, et al., "Structural and Electrochemical Study of the Reaction of Lithium With Silicon Nanowires", Journal of Power Sources. 2009, vol. 189, pp. 34-39.
Chen, et al., "Design and Synthesis of Hierarchical Nanowire Composites for Electrochemical Energy Storage", Advance Functional Materials, 2009, vol. 19, pp. 3420-3426.
Chen, et al., "Flexible and Transparent Supercapacitor Based on In2O3 Nanowire/Carbon Nanotube Heterogeneous Films", Applied Physics Letters, 2009, vol. 94, pp. 043113-1-043113-3.
Choi, et al., "One Dimensional Si/Sn—Based Nanowires and Nanotubes for Lithium-Ion Energy Storage Materials", Journal of Materials Chemistry, DOI: 10.1039/c0jm03842c.
Cui, et al., "Crystalline-Amorphous Core#Shell Silicon Nanowires for High Capacity and High Current Battery Electrodes", Nano Letters, Article ASAP • DOI: 10.1021/n18036323.
Cui, et al., "Diameter-Controlled Synthesis of Single-Crystal Silicon Nanowires", Applied Physics Letters, 2001, vol. 78, No. 15, pp. 2214-2216.
Cui, Yi and Lieber, Charles M., "Functional Nanoscale Electronic Devices Assembled Using Silicon Nanowire Building Blocks", Science Magazine, Feb. 2, 2001, vol. 291, pp. 851-853.
Ding, et al., "Plasmonic Dye-Sensitized Solar Cells", Advanced Energy Materials, 2011, vol. 1, pp. 52-57.
Etacheri, et al., "Effect of Fluoroethylene Carbonate (FEC) on the Performance and Surface Chemistry of Si-Nanowire Li-Ion Battery Anodes", Langmuir, 2012, Article 28, pp. 965-976.
Fan, et al., "Three-Dimensional Nanopillar-Array Photovoltaics on Low-Cost and Flexible Substrates", Nature Materials, Aug. 2009, vol. 8, pp. 648-653.
Garnett, Erik and Yang, Peidong, "Light Trapping in Silicon Nanowire Solar Cells", Nano Letters, 2010, No. 10, pp. 1082-1087.
Hersee, et al., "The Controlled Growth of GaN Nanowires", Nano Letters, 2006, vol. 6, No. 8, pp. 1808-1811.
Yu Huang, et al., "In Situ Observation of the Electrochemical Lithiation of a Single SnO2 Nanowire Electrode", Science Magazine, Dec. 10, 2010, vol. 330, pp. 1515-1520.

Hu, et al., "Si Nanoparticle-Decorated Si Nanowire Networks for Li-Ion Battery Anodes", 2010, Chemistry Communication, DOI: 10.1039/c0cc02078h.
Inagaki, et al., "Carbon materials for electrochemical capacitors", 2010, Journal of Power Sources, pp. 7880-7903.
Jose, et al., "Metal Oxides for Dye-Sensitized Solar Cells", 2009, Journal of American Ceramic Society, vol. 92 [2], pp. 289-301.
Kan, et al., "Synthesis and Size-Dependent Properties of Zinc-Blende Semiconductor Quantum Rods", Mar. 2003, Nature Materials, vol. 2.
Kim, et al., "PbSe Nanocrystal-Based Infrared-to-Visible Up-Conversion Device", 2011, Nano Letters, dx.doi.org/10.1021/n1200704h.
Kim, et al., "Spinel LiMn2 O4 Nanorods as Lithium Ion Battery Cathodes", 2008, Nano Letters, vol. 8 (11), pp. 3948-3952.
Lee, et al., "Semitransparent Organic Photovoltaic Cells with Laminated Top Electrode", 2010, Nano Letters, vol. 10, pp. 1276-1279.
Lin, et al., "Compressional Behavior of Bulk and Nanorod LiMn2O4under Nonhydrostatic Stress", The Journal of Physical Chemistry, dx.doi.org/10.1021/jp112289h.
Li, Dan and Xia, Younan, "Electrospinning of Nanofibers Reinventing the Wheel?", Jul. 19, 2004, Advanced Materials, vol. 16, No. 14.
Li, et al., "Electrospinning of Polymeric and Ceramic Nanofibers as Uniaxially Aligned Arrays", 2003, Nano Letters, vol. 3, No. 8, pp. 1167-1171.
Li, Yimin and Soorjai, Gabor A., "Nanoscale Advances in Catalysis and Energy Applications", 2010, Nano Letters, vol. 10, pp. 2289-2295.
Li, et al., "Thermal Conductivity of Individual Silicon Nanowires", Oct. 6, 2003, Applied Physics Letters, vol. 83, No. 14, pp. 2934-2936.
Liu, et al., "Prelithiated Silicon Nanowires as an Anode for Lithium Ion Batteries", ACS Nano, Article, Published online 10.1021/nn2017167.
Lotus, et al., "Electrical, Structural, and Chemical Properties of Semiconducting Metal Oxide Nanofiber Yarns", 2008, Journal of Applied Physics, vol. 103, pp. 024910-1-024910-6.
Lu, et al., "Size Effect on the Thermal Conductivity of Nanowires", Feb. 1, 2002, Journal of Applied Physics, vol. 91, No. 3, pp. 1542-1552.
Lux, Kenneth W. and Rodriguez, Karien J., "Template Synthesis of Arrays of Nano Fuel Cells", 2005, Nano Letters, vol. 6., No. 2, pp. 288-295.
Macedo, Maria I. F., "Sol-Gel Synthesis of Transparent Alumina Gel and Pure Gamma Alumina by Urea Hydrolysis of Aluminum Nitrate", 2004, Journal of Sol-Gel Science and Technology , vol. 30, pp. 135-140.
Maneeratana, Vasana and Sigmund, Wolfgang M., Continuous Hollow Alumina Gel Fibers by Direct Electrospinning of an Alkoxide-Based Precursor, 2008, Chemical Engineering Journal, vol. 137, pp. 137-143.
Ma, et al., "Photovoltaic Performance of Ultrasmall PbSe Quantum Dots", 2011, ACS Nano, vol. 5, No. 10, pp. 8140-8147.
McDonough, et al., "Carbon Nanofiber Supercapacitors With Large Areal Capacitances", 2009, Applied Physics Letters, vol. 95, pp. 243109-1-243109-3.
Mohan, et al., "Pyrolysis of Wood/Biomass for Bio-oil: A Critical Review", 2006, Energy & Fuels, vol. 20, pp. 848-889.
Mou, et al., "Oriented Contraction: A Facile Nonequilibrium Heat-Treatment Approach for Fabrication of Maghemite Fiber-in-Tube and Tube-in-Tube Nanostructures", 2010, Langmuir Article, DOI: 10.1021/la102830p.
Panda, P.K. and Ramakrishna S., "Electrospinning of Alumina Nanofibers Using Different Precursors", 2007, Journal of Material Science, vol. 42, pp. 2189-2193, DOI 10.10071s10853-007-1581-2.
Park, et al., "Flexible Dimensional Control of High-Capacity Li-Ion-Battery-Ion-BatteryAnodes: From 0D Hollow to 3D Porous Germanium Nanoparticle Assemblies", 2010, Advanced Materials, vol. 22, pp. 415-418.
Park, et al., "Silicon Nanotube Battery Anodes", 2009, Nano Letters, vol. 9, No. 11, pp. 3844-3847.
Park, et al., "Size-Dependent Magnetic Properties of Single-Crystalline Multiferroic BiFeO3 Nanoparticles", 2007, Nano Letters, vol. 7, No. 3, pp. 766-772.

(56) References Cited

OTHER PUBLICATIONS

Peng, et al., "Morphology Control of Layer-Structured Gallium Selenide Nanowires", 2007, Nano Letters, vol. 7, No. 1, pp. 199-203.
Podgorny, Marek, "Electronic Structure of the Ordered Phases of Pt-Fe Alloys", May 1, 1991, Physical Review B, May 1991, vol. 43, No. 13, pp. 11 300-11 318.
Ponhan, Wichaird, and Maensiri, Santi, "Fabrication and Magnetic Properties of Electrospun Copper Ferrite (CuFe2O4) Nanofibers", 2009, Solid State Sciences, vol. 11, pp. 479-484.
International Search Report and Written Opinion Singapore Search Report for Application No. 11201400230S, pp. 1-20, Dated Aug. 30, 2011.

* cited by examiner

PROCESS OF MAKING METAL AND CERAMIC NANOFIBERS

CROSS-REFERENCE

This application claims the benefit of U.S. Provisional Application No. 61/478,082, filed Apr. 22, 2011, which is incorporated herein by reference.

BACKGROUND OF THE INVENTION

Ceramic and metallic nanofibers have potential for applications in a wide variety of fields, including high performance filtration, chemical sensing, biomedical engineering and renewable energy. Previous methods for producing ceramic or metallic nanofibers include the electrospinning of sol-gel precursors with or without a polymer binder. However, the nanofibers produced by the sol-gel method have many disadvantages, such as low performance and poor coherence, which makes them unsuitable for many applications.

SUMMARY OF THE INVENTION

Provided herein are nanofibers and processes for producing nanofibers. In some instances, the nanofibers are metal and/or ceramic nanofibers. In some embodiments, the nanofibers are high quality nanofibers, high performance nanofibers, highly coherent nanofibers, highly continuous nanofibers, or the like. In some embodiments, the nanofibers are coherent, are long, have few voids and/or defects, and/or have other advantageous characteristics such as flexible control of metal and/or ceramic crystal sizes. In some instances, the nanofibers are produced by electrospinning a fluid stock comprising a high concentration of ceramic or metal precursor in the fluid feed stock. In some instances, the fluid stock further comprises well mixed or substantially uniformly distributed precursor in the fluid stock. In some embodiments, the fluid stock is converted to a nanofiber comprising few voids, few defects, long or tunable lengths, and the like.

Described herein are hybrid nanofibers including hollow nanofibers and multi-axial nanofibers comprising more than one material. Provided herein are high quality nanofibers and processes of preparing high quality nanofibers that are suitable for applications such as electrochemical devices (e.g., batteries and solar cells), advanced filtration, catalysis, and the like. In some instances, the nanofibers provided and/or prepared according the processes described herein are prepared at costs low enough to be commercially viable. The present disclosure includes hybrid and hollow nanofibers, use of nanofibers in many types of applications, devices incorporating nanofibers, the use of devices incorporating nanofibers, and the like.

In one aspect, described herein is a process for producing a nanofiber. In some embodiments, the process includes electrospinning a fluid stock. The fluid stock comprises metal and/or ceramic precursor and polymer. In one embodiment, the weight to weight ratio of the precursor to polymer is at least 1:2. In some embodiments, the polymer is water soluble.

In another aspect, described herein is a process for producing nanofibers, the process comprising electrospinning a fluid stock, the fluid stock comprising metal and/or ceramic precursor(s) and polymer. In some embodiments, the fluid stock is (1) a solution; (2) a substantially uniform dispersion; or (3) a substantially homogenous dispersion.

In one aspect, described herein is a fluid stock, a nanofiber, a nanofiber produced by the process, a nanofiber preparable by the process, and a nanofiber having the characteristics of a nanofiber produced by the process.

In one aspect, described herein is a nanofiber mat, a nanofiber mat produced by the process, a nanofiber mat preparable by the process, and a nanofiber mat having the characteristics of a nanofiber mat produced by the process.

In one aspect, described herein is a process for making a fluid stock. In some embodiments, the process comprises uniformly distributing precursor in a first dispersion before combining the first dispersion with a second dispersion comprising polymer.

In one aspect, described herein is a system. In some embodiments, the system comprises a fluid stock, which comprises precursor associated with polymer, where the mass of precursor is greater than the mass of polymer in the fluid stock. In some embodiments, the system also comprises an electrospinner and a nanofiber collection module.

In one aspect, described herein is an electrochemical device comprising the nanofibers described herein, a nanofiber resulting from a process described herein, or comprising a nanofiber resulting from a system described herein.

In one aspect, described herein is a fuel cell comprising the nanofibers described herein, comprising a nanofiber resulting from a process described herein, or comprising a nanofiber resulting from a system described herein.

In one aspect, described herein is a solar cell comprising the nanofibers described herein, comprising a nanofiber resulting from a process described herein, or comprising a nanofiber resulting from a system described herein.

In one aspect, described herein is a battery comprising the nanofibers described herein, comprising a nanofiber resulting from a process described herein, or comprising a nanofiber resulting from a system described herein.

In one aspect, described herein is an ultracapacitor comprising the nanofibers described herein, comprising a nanofiber resulting from a process described herein, or comprising a nanofiber resulting from a system described herein. In yet another aspect, described herein is a process for producing nanofibers suitable for use in an ultracapacitor. In some embodiments, the process comprises electrospinning a fluid stock, wherein the fluid stock comprises precursor molecules bound to a polymer. In some embodiments, the precursor molecules are Ba, St, Ti, or mixtures thereof. In some embodiments, the process also includes thermally treating the spun nanofibers.

In one aspect, described herein is a filter comprising the nanofibers described herein, comprising a nanofiber resulting from a process described herein, or comprising a nanofiber resulting from a system described herein.

In one aspect, described herein is a sensor comprising the nanofibers described herein, comprising a nanofiber resulting from a process described herein, or comprising a nanofiber resulting from a system described herein.

In one aspect, described herein is a catalyst comprising the nanofibers described herein, comprising a nanofiber resulting from a process described herein, or comprising a nanofiber resulting from a system described herein.

In one aspect, described herein is a membrane comprising the nanofibers described herein, comprising a nanofiber resulting from a process described herein, or comprising a nanofiber resulting from a system described herein.

In one aspect, described herein is an electrode comprising the nanofibers described herein, comprising a nanofiber resulting from a process described herein, or comprising a nanofiber resulting from a system described herein.

In one aspect, described herein is a tissue regeneration matrix comprising the nanofibers described herein, comprising a nanofiber resulting from a process described herein, or comprising a nanofiber resulting from a system described herein.

In one aspect, described herein is a method for producing a nanofiber, the method comprising electrospinning a first fluid with a second fluid, at least one of the first or second fluids being an aqueous fluid. In some embodiments, the first and second fluids are electrospun about the same or similar axis. In some embodiments, the first fluid is an aqueous fluid comprising water, a water soluble polymer, and metal and/or ceramic precursor. In some embodiments, the second fluid is a second aqueous fluid, comprising water, a water soluble polymer, and a second metal and/or ceramic precursor, wherein the water soluble polymer of the second fluid is the same or different than the water soluble polymer of the first fluid.

In one aspect, described herein is a method for producing a nanofiber, the method comprising multi-axially electrospinning an aqueous fluid stock and a second fluid. In some embodiments, the aqueous fluid stock comprises water, a water soluble polymer, and metal and/or ceramic precursor. In some embodiments, the second fluid is a second aqueous fluid stock. In some embodiments, the second fluid is a gas. In some embodiments, the second fluid at least partially surrounds the aqueous fluid stock. In some embodiments, the aqueous fluid stock at least partially surrounds the second fluid.

In one aspect, described herein is a process for producing a nanofiber, the process comprising electrospinning a fluid stock comprising metal precursor, ceramic precursor, or combination thereof wherein: (a) the fluid stock is aqueous; (b) the concentration of the precursor in the fluid stock is at least 200 mM; or both (a) and (b).

In some embodiments, the fluid stock further comprises a water-soluble polymer. In some embodiments, the precursor binds to the water-soluble polymer. In some embodiments, the electrospinning step comprises multi-axially electrospinning the fluid stock with a gas or a second fluid stock. In some embodiments, the fluid stock comprises a non-aqueous solvent. In some embodiments, the fluid stock comprises tetrahydrofuran (THF) and polystyrene (PS).

In one aspect, described herein is a process of producing a nanofiber, the process comprising electrospinning a fluid stock into an electrospun material, the fluid stock comprising polymer and precursor, the precursor comprising (i) metal precursor, (ii) ceramic precursor, or (iii) a combination thereof, and: (a) the weight to weight ratio of the precursor to polymer being at least 1:2; (b) the fluid stock is (1) a solution; (2) a substantially uniform dispersion; or (3) a substantially homogenous dispersion; (c) the concentration of the precursor in the fluid stock is at least 200 mM; or (d) a combination thereof.

In some embodiments, the fluid stock is an aqueous fluid stock.

In some embodiments, the process further comprises removing the polymer from the electrospun material.

In some embodiments, the process further comprises calcination of the precursor to metal, metal oxide, metal alloy, ceramic, or a combination thereof.

In some embodiments, calcination of the metal and/or ceramic precursor(s) is performed under inert, oxidative, or reductive conditions.

In some embodiments, the metal is selected from the group consisting of Ag, Cu, Ni, Fe, Co, Pb, Au, Sn, and Al.

In some embodiments, the ceramic or metal oxide is selected from the group consisting of $Al_2O_3$, $ZrO_2$, $Fe_2O_3$, CuO, NiO, ZnO, CdO, C, Ge, Si, $SiO_2$, $TiO_2$, $V_2O_5$, $VO_2$, $Fe_3O_4$, SnO, $SnO_2$, CoO, $CoO_2$, $Co_3O_4$, $HfO_2$, $BaTiO_3$, $SrTiO_3$, and $BaSrTiO_3$.

In some embodiments, the fluid stock comprises the precursor associated with the polymer by covalent or non-covalent interactions.

In some embodiments, the association of the precursor with the polymer provides a fluid stock comprising precursor uniformly dispersed therein.

In some embodiments, the polymer and precursor taken together comprise about 1 weight % to about 20 weight % of the fluid stock.

In some embodiments, the metal precursor comprises a metal-ligand complex.

In some embodiments, the metal-ligand complex is a metal acetate, metal nitrate, metal chloride, or metal alko-oxide.

In some embodiments, the polymer is a thermally degradable or chemically degradable polymer.

In some embodiments, the polymer is polyvinyl alcohol, polyvinyl acetate, polyvinyl ether, polyvinyl pyrrolidone, polyglycolic acid, polyethylene oxide, hydroxyethylcellulose (HEC), ethylcellulose, cellulose ethers, polyacrylic acid, polyisocyanate, or any combination thereof.

In some embodiments, the process of electrospinning the fluid stock comprises electrospinning the fluid stock with a second fluid stock about the same or similar axis to produce a layered nanofiber.

In one aspect, described herein is a nanofiber comprising a metal, a metal oxide, a metal alloy, a ceramic, a metal precursor, a ceramic precursor or a combination thereof, and: (a) the nanofiber is at least 50 µm long on average; (b) the nanofiber has an aspect ratio of at least about 10; (c) the nanofiber comprises a segment comprising a continuous matrix of a metal, a metal oxide, a metal alloy, a ceramic, or a combination thereof; (d) the nanofiber has a specific surface area between 1 $g/m^2$ and about 1000 $g/m^2$; or (e) a combination thereof. In some embodiments, the nanofiber comprises at least 33% (w/w) of a metal, a metal oxide, a metal alloy, a ceramic, a metal precursor, a ceramic precursor or a combination thereof.

In some embodiments, the metal is selected from the group consisting of Ag, Cu, Ni, Fe, Co, Pb, Au, Sn, and Al.

In some embodiments, the ceramic or metal oxide is selected from the group consisting of $Al_2O_3$, $ZrO_2$, $Fe_2O_3$, CuO, NiO, ZnO, CdO, C, Ge, Si, $SiO_2$, $TiO_2$, $V_2O_5$, $VO_2$, $Fe_3O_4$, SnO, $SnO_2$, CoO, $CoO_2$, $Co_3O_4$, $HfO_2$, $BaTiO_3$, $SrTiO_3$, and $BaSrTiO_3$.

In some embodiments, the nanofiber comprises a conductive material, wherein the nanofiber has an conductivity of at least about 10% when compared with the conductivity of the conductive material when formed into a sheet.

In one aspect, described herein is a process for producing a nanofiber, the process comprising electrospinning about the same or similar axis a first fluid stock with a second fluid stock, the first fluid stock being aqueous and comprising a first polymer.

In some embodiments, the first polymer is water soluble.

In some embodiments, the second fluid is aqueous.

In some embodiments, the second fluid stock comprises a second polymer, and the first and second polymers are optionally the same.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
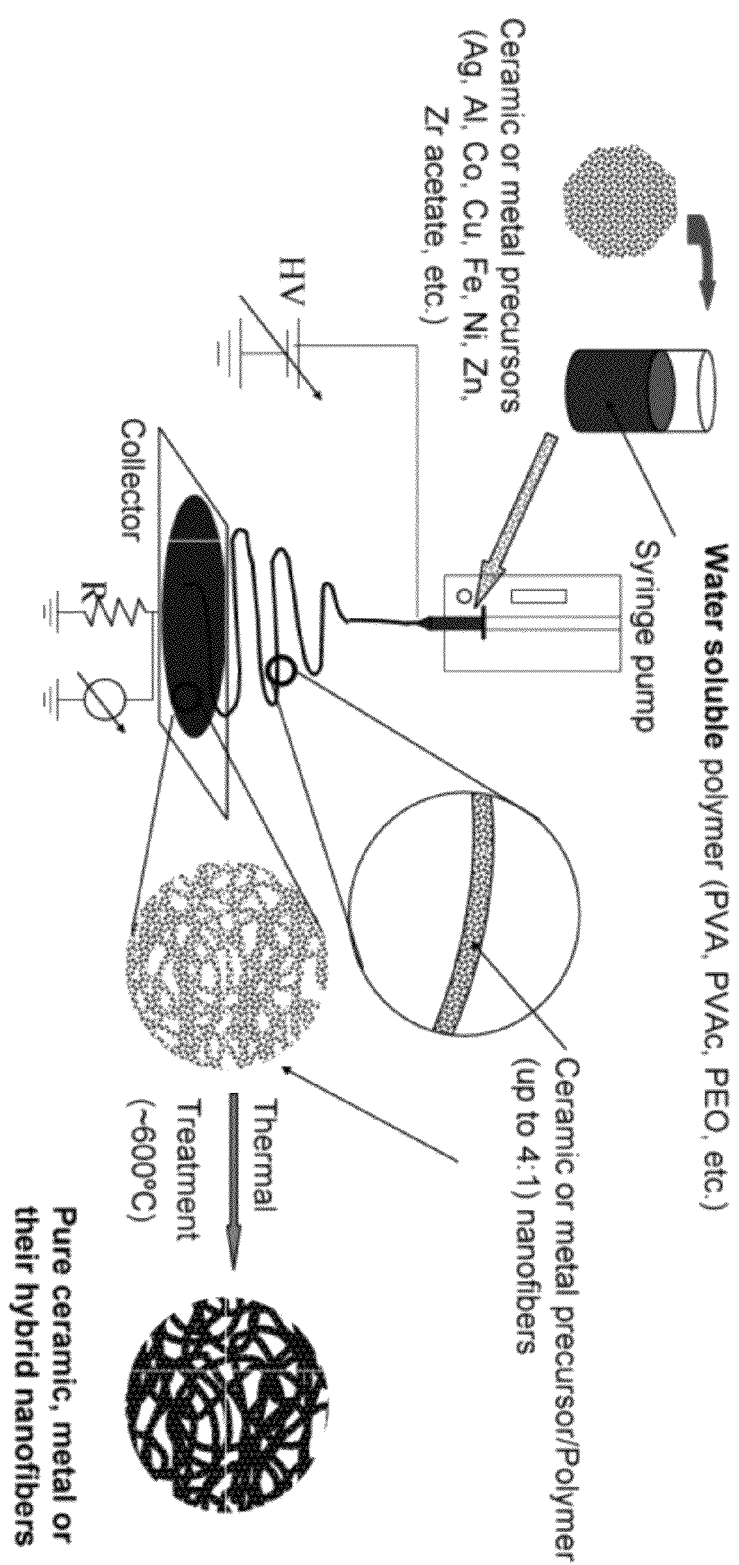
FIG. 1 shows a schematic of the process and system of the disclosure.

Nanotechnology is the manipulation of matter at an atomic and molecular scale and is a diverse field involving many different structures, techniques and potential applications. Of them, one structure is a nanofiber, which generally has a diameter of less than 5,000 nm and has various lengths. There is a need for high quality nanofibers, such as metal nanofibers, ceramic nanofibers, hybrid nanofibers, and the like. Such nanofibers are provided in certain embodiments herein. In some embodiments, provided herein are high quality nanofibers that have good structural integrity, few voids, few structural defects, tunable length, and the like. In some embodiments, the present disclosure includes methods for making long, high quality nanofibers. In some embodiments, the methods provided herein use a fluid stock comprising a precursor and a polymer that interact with each other and/or are compatible with each other such that the polymer facilitates solubilization of the precursor. In one aspect, described herein is a nanofiber comprising a segment comprising a continuous matrix of a metal, a metal oxide, a metal alloy, a ceramic, or a combination thereof.

In some embodiments, provided herein is a process for the conversion of the electrospun fluid stock to a nanofiber, wherein the polymer is removed, optionally leaving defects such as gaps, voids, and the like in the nanofiber. In some embodiments, these defects are reduced by increasing the proportion of nanofiber precursor in the fluid stock relative to the amount of polymer.

In some embodiments, ensuring that the fluid stock is homogenous reduces the voids and/or defects in the nanofiber compared to when the fluid stock is not homogenous. In some instances, when the fluid feed is electrospun and converted to a nanofiber, use of homogenous fluid feed leads to a homogenous nanofiber. In some embodiments, provided herein are methods for creating homogenous fluid stocks. In some embodiments, the precursor is solubilized by associating the precursor with a ligand. In some embodiments, the polymer is water soluble. In some instances, water-based (aqueous) fluid stocks are advantageous over fluid stocks based on other solvents (e.g., where a non-aqueous solvent is toxic). In some embodiments, it is advantageous to perform the process in an aqueous environment.

In some embodiments, associating the precursor with the polymer, such as through a chemical bond between the precursor and polymer results in long, high quality nanofibers with few defects compared to embodiments without an association between the precursor and polymer. In some instances, the precursor is distributed relatively homogenously on the polymer (e.g., such that electrospinning of the fluid stock having such homogenous associations provides nanofibers with few voids and defects). In addition to the association, it is advantageous in some embodiments to first create a homogenous solution of precursor before combining the precursor and polymer.

In some embodiments, the increased proportion of precursor and homogenous distribution of the precursor to create high quality nanofibers results in nanofibers with complex geometries or advanced properties. These geometries include long hollow nanofibers and nanofibers that are hybrids of more than one material. In various embodiments, these materials are without limitation, metals, ceramics, or combinations thereof.

Process

Described herein is a process of producing a nanofiber. In some embodiments, the process comprises associating or binding a metal to a solubilizing ligand to produce a precursor, optionally in an aqueous solution. In some embodiments, the precursor solution is mixed to provide a homogenous precursor solution. In some embodiments, the precursor solution is then combined with a solution of water-soluble polymer to provide a fluid stock. In some embodiments, the precursor molecules associate with, or bind to the polymer. In some embodiments, the fluid stock is mixed to provide a homogenous fluid stock, where the precursor is optionally associated with the polymer substantially evenly. In some embodiments, the fluid stock is then electrospun into an electrospun fluid stock. In some instances, the electrospun fluid stock is then calcinated, optionally by heating. In some embodiments, heating in a reducing environment results in a pure metal nanofiber and heating in an oxidizing environment leads to a ceramic nanofiber.

In some embodiments, the fluid stock comprises a high loading of precursor on the polymer and/or associations between the precursor and polymer. In some instances, the methods for creating a homogenous fluid stock are used to produce structures with geometries other than nanofibers (e.g., nanoparticles, spheres, meshes, thin films, nano-robotic parts such as a gear). As with nanofibers, it is desirable in some embodiments to make these structures with few defects, so are suitable applications of the present disclosure. In one aspect, the present invention includes pure metal, ceramic, or hybrid nanostructures including spheres, meshes, gears and the like.

In some embodiments, the process comprises electrospinning a fluid stock. Any suitable method for electrospinning is used. Exemplary methods for comprise methods for electrospinning at elevated temperatures as disclosed in U.S. Pat. No. 7,326,043 and U.S. Pat. No. 7,901,610. In some embodiments, elevated temperature electrospinning improves the homogeneity of the fluid stock throughout the electrospinning process. In some embodiments, the electrospinning is gas-assisted as described in PCT Patent Application PCT/US2011/024894 ("Electrospinning apparatus and nanofibers produced therefrom"). In gas-assisted embodiments, the gas is optionally air. In some embodiments, gas assistance increases the throughput of the process and/or reduces the diameter of the nanofibers, potentially by accelerating and therefore elongating the jet of fluid stock emanating from the electrospinner. In some embodiments, incorporating a gas stream inside a fluid stock produces hollow nanofibers. In some embodiments, the fluid stock is electrospun using any method known to those skilled in the art.

In some embodiments, nanofibers are produced from an aqueous fluid stock (e.g., comprising water, a water soluble polymer and metal and/or ceramic precursor). In some instances, aqueous fluid stocks are cheaper, more environmentally friendly, avoid the use of organic solvents and/or have other advantages in certain applications. In one embodiment, the use of aqueous fluid stocks is combined with coaxial electrospinning. As described herein, coaxial electrospinning with a second fluid is used to add coatings, make hollow nanofibers, make nanofibers comprising more than one material, and the like. In various embodiments, the second fluid is either outside (i.e., at least partially surrounding) or inside (i.e., at least partially surrounded by) the aqueous fluid stock. In some embodiments, the second fluid is a gas (i.e., gas-assisted electrospinning) As described herein, in some embodiments, gas assistance increases the throughput of the process, reduces the diameter of the nanofibers, and is used to produce hollow nanofibers. In some embodiments, the method for producing nanofibers comprises coaxially electrospinning an aqueous fluid stock and a gas.

In one aspect, described herein is a method for producing a nanofiber, the method comprising electrospinning a first fluid with a second fluid, at least one of the first or second fluids being an aqueous fluid. In various embodiments, the first fluid and second fluid are positioned relative to each other in any suitable orientation and/or shape. In some embodiments, the first fluid and second fluids are next two each other as they exit the electrospinner. In some embodiments, one of either the first fluid or second fluid surrounds the other. In some embodiments, the first and second fluids are electrospun about the same or similar axis.

In some embodiments, the first fluid is an aqueous fluid comprising water, a water soluble polymer, and metal and/or ceramic precursor. In some embodiments, the second fluid is a second aqueous fluid, comprising water, a water soluble polymer, and a second metal and/or ceramic precursor, wherein the water soluble polymer of the second fluid is the same or different than the water soluble polymer of the first fluid.

In some embodiments, the method includes "co-axially" electrospinning, producing "co-axial" hybrid nanofibers, and such. As used herein, co-axial refers to concentric cylinders of material that have the same center axis (e.g., a cylindrical nanofiber with a core material surrounded by one or more coatings or cylindrical layers). Co-axial nanofibers are hollow in some embodiments. There is no limit to the number of layers of material (i.e., co-axial does not imply two layers). The terms "co-axial" and "multi-axial" are used interchangeably.

In some embodiments, the use of metal precursors increases the electrical conductivity, which leads to more vigorous whipping of the electrospinning filament. Increasing the electrical conductivity of the fluid stock through choice of precursor for example, also increases the productivity of the process in some instances. Increased productivity is achieved by increasing the conductivity of the fluid stock because increased conductivity causes more repulsion by the jets emanating from adjacent spinnerets. In some instances, the jets are less likely to touch each other prematurely because of this increased repulsion, which allows the practitioner to space the spinnerets more closely together. More closely spaced spinnerets generally results into increased overall productivity (as long as the productivity per spinneret is not substantially reduced).

The electrospinning process described herein keeps the fluid stock relatively evenly dispersed. In some embodiments, the fluid stock is heated, especially if the fluid stock solidifies at ambient temperature. In some embodiments, the fluid stock is agitated, optionally in combination with heating. Agitation includes but is not limited to stirring, mixing, sonicating, vortexing, and the like and creates or maintains a substantially homogenous fluid stock. In some instances, the fluid stock is stirred continuously during the electrospinning process. In one particular embodiment, the fluid stock is stirred for about an hour to get a homogenous dispersion.

In some embodiments, the procedure for forming the nanofiber is not electrospinning Electrospinning is but one method of producing nanofibers. Other suitable methods include the sol-gel technique or interfacial polymerization or "fast mixing" techniques (Huang, Pure Appl. Chem., Vol. 78, No. 1, pp. 15-27, 2006). The present disclosure further includes methods for making nano-geometries other than fibers such as for making nano-spheres by electrospraying. The composition of the fluid stock and methods for making same are agnostic to the particular geometry (i.e., are applicable to any geometry) and method for producing the geometry.

In some examples, high loading of precursor on the polymer in the fluid stock is beneficial for obtaining pure and/or uniform nanofibers. As described herein, few defects and/or voids are created in the nanofiber when the polymer is removed compared to the number of defects and/or voids created when having lower precursor loading. Loading is represented as the weight ratio of the precursor to polymer in the fluid stock. The weight ratio of the precursor to polymer is any value resulting in a nanofiber with suitable properties in a given embodiment. The weight ratio of the precursor to polymer is at least 1:2 in some embodiments. In other embodiments, the ratio is at least 1:9, at least 1:8, at least 1:7, at least 1:6, at least 1:5, at least 1:4, at least 1:3, at least 1:2, at least 1:1.75, at least 1:1.5, or at least 1:1.25. In other embodiments there is about equal weights of precursor and polymer. In some embodiments, there is more precursor than polymer by weight. In some embodiments, the weight ratio of the precursor to polymer is at least 1.25:1, at least 1.5:1, at least 1.75:1, at least 2:1, at least 3:1, at least 4:1, at least 5:1, at least 6:1, at least 7:1, at least 8:1, at least 9:1, at least 10:1, at least 15:1, at least 20:1, at least 30:1, at least 40:1, at least 50:1, or at least 100:1. In some embodiments, the weight ratio of the precursor to polymer is about 1.25:1, about 1.5:1, about 1.75:1, about 2:1, about 3:1, about 4:1, about 5:1, about 6:1, about 7:1, about 8:1, about 9:1 about 10:1, about 15:1, about 20:1, about 30:1, about 40:1, about 50:1, or about 100:1. In yet other embodiments, the weight ratio of precursor to polymer is between about 1:2 and 10:1, between 1:1 and 4:1, between about 2:1 and 10:1, or between about 3:1 and 8:1.

In some embodiments, the fluid stock includes metal and/or ceramic precursor and polymer. In some embodiments, the nanofiber comprises metal or ceramic precursor and polymer. In some embodiments, the precursor and/or nanofiber is not metal and/or ceramic. The methods described herein are used to make nano-structures that have few voids or defects in some instances (e.g., no matter the material). The methods for making a substantially uniform fluid feed described herein (e.g., by associating precursor substantially uniformly on a polymer) are applicable to materials other than metals and/or ceramics.

Nanofiber Processing

In some embodiments, the process comprises one or more processes for converting the electrospun fluid stock into a nanofiber. One or all of these processes are collectively referred to as "calcinations". In order to produce a pure metal and/or ceramic nanofiber for example, it is necessary to remove the polymer from the electrospun fluid stock. In some embodiments, calcination includes removing the polymer (e.g., optionally thermally or chemically removing the polymer). In some embodiments, removing the polymer creates voids and/or defects in the nanofiber. In some instances, it is an object of the disclosure to reduce the amount of polymer in the fluid stock, and/or to employ calcination procedures that lead to few voids or defects. In some instances, the polymer is removed in a substantially unmodified state. In some instances, the polymer is degraded by any suitable means (e.g., degraded by heat, evaporated, or sublimated). In some instances, the polymer is removed by chemical means (e.g., by solubilizing the polymer or chemically degrading the polymer). In some embodiments, the polymer is chemically degraded in a strong acid or base. In some embodiments, calcination includes removal of the ligand that is optionally a component of the precursor. In various embodiments, the ligand is degraded or removed whole, removed by heat or chemicals, and the like.

In some embodiments, the process comprises converting the precursor(s) to a nanofiber. Such a conversion is also encompassed by the term "calcination". An exemplary calcination is the conversion of metal and/or ceramic precursors into a metal and/or ceramic nanofiber. In some embodiments, the conversion of precursors to nanofiber occurs simultaneously with the removal of the polymer. In some embodiments, the conversion of precursors to nanofiber and the removal of the polymer occur at different times. In various embodiments, polymer removal and precursor conversion occur under the same conditions, or under different conditions.

In some embodiments, calcination is performed in a gaseous environment. In some embodiments (e.g., if one does not want oxidation reactions to proceed), the gaseous environment is inert (i.e., consisting of non-reactive gases) The noble gases are unreactive. The noble gases include helium (He), neon (Ne), argon (Ar), krypton (Kr), xenon (Xe), radon (Rn), or mixtures thereof. Another suitable inert gas is nitrogen ($N_2$) gas.

In some embodiments, certain chemical reactions occur upon calcination, optionally oxidation reactions. In some instances, oxidation converts metal precursors to metal oxide or ceramic nanofibers. In some embodiments, oxidative reactions are performed in an oxygen-rich environment, such as air. In one particular example (e.g., where the nanofiber is a ceramic nanofiber), calcination is performed in air at about 600° C. for about 2 hours.

Reduction is the gain of electrons, which is the opposite reaction from oxidation. In some instances (e.g., such as in the production of pure metal nanofibers), reducing environments are employed. Here for example, the reductive environment prevents the conversion of metal precursors to metal oxides. In some embodiments, the reductive environment is a mixture of inert gas and hydrogen gas ($H_2$). In some embodiments, the strength of the reductive environment is varied by blending $H_2$ with an inert gas in various proportions. The present disclosure encompasses hydrogen-nitrogen mixtures and the like. In some embodiments, the reductive environment is any environment in which oxidation is prevented (e.g., an environment substantially devoid of oxygen). In one particular instance, calcination is performed under a mixture of argon and hydrogen at about 800° C. for about 2 hours to produce a pure metal nanofiber.

In some embodiments, calcination is performed in a liquid environment. The liquid environment is aqueous or is in a different solvent than water, such as an organic solvent in various embodiments. Oxidative, reductive, or inert conditions are created in liquid environments. An exemplary liquid-based reducing environment is a solution of NaOH or $NaBH_4$. An exemplary oxidizing solution comprises hydrogen peroxide $H_2O_2$. In some embodiments, calcination uses a catalyst (i.e., whether conducted in the gas phase or liquid phase).

Calcination is performed at any suitable temperature for any suitable amount of time. In some instances, higher temperature calcinations produce nanofibers of a smaller diameter. Without being bound by theory, the temperature and/or duration of calcinations is believed to govern the size and type of crystals in the nanofiber. Low temperature and/or short time usually generates small crystal domains in amorphous metal or metal oxides, while high temperature calcination generally leads to nanofibers with pure metal or pure metal oxide crystals. Without being bound by theory, crystal size is thought to govern properties such as electric conductivity or magnetic properties. In some instances, low temperature calcination of magnetically active metal or metal oxides generate superparamagnetic nanofibers. In some instances, high temperature calcination produces metal nanofibers with increased electric conductivity.

In some embodiments, calcination is performed at about 100° C., about 150° C., about 200° C., about 300° C., about 400° C., about 500° C., about 600° C., about 700° C., about 800° C., about 900° C., about 1,000° C., about 1,500° C., about 2,000° C., and the like. In some embodiments, calcination is performed at a temperature of at least 100° C., at least 150° C., at least 200° C., at least 300° C., at least 400° C., at least 500° C., at least 600° C., at least 700° C., at least 800° C., at least 900° C., at least 1,000° C., at least 1,500° C., at least 2,000° C., and the like. In some embodiments, calcination is performed at a temperature of at most 100° C., at most 150° C., at most 200° C., at most 300° C., at most 400° C., at most 500° C., at most 600° C., at most 700° C., at most 800° C., at most 900° C., at most 1,000° C., at most 1,500° C., at most 2,000° C., and the like. In some embodiments, calcination is performed at a temperature of between about 300° C. and 800° C., between about 400° C. and 700° C., between about 500° C. and 900° C., between about 700° C. and 900° C., between about 800° C. and 1,200° C., and the like.

In some embodiments, calcination is performed at a constant temperature. In some embodiments, the temperature changes over time. In some embodiments, the temperature increases from a first temperature (e.g., the temperature of the electrospinning process, optionally room temperature) to a second temperature. In some embodiments, calcination then proceeds for a given time at the second temperature. In some embodiments, the temperature continues to vary. The rate of increase in temperature during calcination is varied in certain instances. Any suitable rate of increase is permissible, whereby a nanofiber of the desired properties is obtained. In certain embodiments, the rate of temperature increase is about 0.1° C./min, about 0.3° C./min, about 0.5° C./min, about 0.7° C./min, about 1.0° C./min, about 1.5° C./min, about 2° C./min, about 2.5° C./min, about 3° C./min, about 4° C./min, about 5° C./min, about 10° C./min, about 20° C./min, and the like. In certain embodiments, the rate of temperature increase is at least about 0.1° C./min, at least about 0.3° C./min, at least about 0.5° C./min, at least about 0.7° C./min, at least about 1.0° C./min, at least about 1.5° C./min, at least about 2° C./min, at least about 2.5° C./min, at least about 3° C./min, at least about 4° C./min, at least about 5° C./min, at least about 10° C./min, at least about 20° C./min, and the like. In some embodiments, the rate of temperature increase is at most about 0.1° C./min, at most about 0.3° C./min, at most about 0.5° C./min, at most about 0.7° C./min, at most about 1.0° C./min, at most about 1.5° C./min, at most about 2° C./min, at most about 2.5° C./min, at most about 3° C./min, at most about 4° C./min, at most about 5° C./min, at most about 10° C./min, at most about 20° C./min, and the like. In yet other embodiments, the rate of temperature increase is between about 0.1° C./min and 0.5° C./min, between about 0.5° C./min and 2° C./min, between about 2° C./min and 10° C./min, between about 0.1° C./min and 2° C./min, and the like.

Calcination is performed for any suitable amount of time (e.g., as necessary to arrive at a nanofiber with the desired properties). In some embodiments, the time and temperature of calcination are related to each other. For example, choice of a higher temperature reduces the amount of time needed to produce a nanofiber with a given property. The converse is also true; increasing the time of calcination reduces the necessary temperature, which is advantageous if the nanofiber includes temperature-sensitive materials for example. In some embodiments, calcination is performed for about 5 minutes, about 15 minutes, about 30 minutes, about 1 hour, about 2 hours, about 3 hours, about 4 hours, about 8 hours, about 12 hours, about 1 day, about 2 days, and the like. In some embodiments, calcination is performed for at least 5 minutes, at least 15 minutes, at least 30 minutes, at least 1 hour, at least 2 hours, at least 3 hours, at least 4 hours, at least 8 hours, at least 12 hours, at least 1 day, at least 2 days, and the like. In some embodiments, calcination is performed for at most 5 minutes, at most 15 minutes, at most 30 minutes, at most 1 hour, at most 2 hours, at most 3 hours, at most 4 hours, at most 8 hours, at most 12 hours, at most 1 day, at most 2 days, and the like. In yet other embodiments, calcination is performed for between about 10 minutes and 60 minutes, between about 1 hour and about 5 hours, between about 5 hours and 1 day, and the like.

In some instances, calcination results in a nanofiber (e.g., a pure metal or pure ceramic nanofiber). In some embodiments, the nanofiber consists essentially of pure metal or ceramic (i.e., optionally including small amounts of other materials). In some embodiments, the other materials are residual polymer or other components of the fluid stock.

In one aspect, the process has a high yield (e.g., which is desirable for embodiments in which the precursor is expensive. Yield is quantified by comparing the moles of precursor molecules in the nanofiber to the moles of precursor molecules that get converted into their final form and are incorporated in the nanofiber. Without being bound by theory, higher loading of precursor on the polymer generally results in higher yield. For example, in one trial loading precursor to polymer at a ratio of 4:1 resulted in an 80% yield. In some embodiments, the moles of precursor molecules in the nanofiber are about 10%, about 20%, about 30%, about 33%, about 40%, about 50%, about 60%, about 70%, about 80%, about 90%, about 95%, about 98%, or about 100% of the moles of precursor molecules in the fluid stock. In some embodiments, the moles of precursor molecules in the nanofiber are at least 10%, at least 20%, at least 30%, at least 33%, at least 40%, at least 50%, at least 60%, at least 70%, at least 80%, at least 90%, at least 95%, at least 98%, or at least 99% of the moles of precursor molecules in the fluid stock. In some embodiment, the moles of precursor molecules in the nanofiber are between about 10% and about 40%, between about 20% and about 50%, or between about 50% and about 100% of the moles of precursor molecules in the fluid stock.

Fluid Stock

Described herein are fluid stocks, fluid stocks having certain characteristics, fluid stocks prepared according to the methods herein disclosed, fluid stocks preparable by the methods herein disclosed, fluid stocks incorporating the precursors herein disclosed, fluid stocks incorporating the polymers herein disclosed, and fluid stocks suitable for the methods and systems herein disclosed. The present disclosure also includes methods for using the fluid stocks, and the like.

In some instances, increasing the amount of precursor relative to the amount of polymer and/or distributing the precursor relatively uniformly in the fluid stock produces nanofibers with reduced voids and/or fewer defects relative to nanofibers where the amount of precursor is lower or the fluid stock is not uniform.

In some embodiments, the fluid stock is a solution, optionally an aqueous solution. In some embodiments, the polymer is water soluble and the precursor is solubilized by associating with a ligand. In some embodiments, one or more components are not fully dissolved and the fluid stock is a dispersion. In some instances, the fluid stock is uniform or homogenous (e.g., no matter whether the fluid stock is a solution or dispersion).

In some embodiments, the fluid stock is kept uniform or homogenous by agitating. Methods of agitating include mixing, stirring, shaking, sonicating, or otherwise inputting energy to prevent or delay the formation of more than one phase in the fluid stock. Any of these methods or equivalents are employed in various embodiments. In some embodiments, the fluid stock is continually agitated. In some embodiments, the fluid stock is agitated to create a uniform dispersion or solution, which is then used in an electrospinning step before the dispersion or solution separates into more than one phase. Exemplary phases are an aqueous phase and an oil phase, or an aqueous phase and a phase that includes polymer or precursor for example.

In some embodiments, a uniform fluid stock is made by first agitating a solution of precursor or uniform dispersion of precursor. In some embodiments, the fluid stock is made by uniformly distributing precursor in a first dispersion before combining the first dispersion with a second dispersion (e.g., which includes polymer). The precursor solution or uniform dispersion is continually agitated in some embodiments, optionally mixed while being combined with the polymer dispersion to create the fluid stock.

In some embodiments, the fluid stock is an aqueous fluid stock and/or comprises polymer dissolved in water. In some embodiments, the continuous phase of the fluid stock is water (e.g., when the fluid stock is a dispersion). In some embodiments, the solvent is water (e.g., when the fluid stock is a solution). In various embodiments, the solution or dispersion of precursor is aqueous, the solution or dispersion of polymer is aqueous, or both solutions or dispersions are aqueous.

In some embodiments, the fluid stock is heated (e.g., optionally in combination with agitation) to create a substantially uniform or substantially homogenous dispersion or solution. In some embodiments, the fluid stock is made by uniformly distributing precursor in a first dispersion before combining the first dispersion with a second dispersion (e.g., which includes polymer). In some embodiments, the first dispersion is heated, optionally in combination with agitation.

In some embodiments, the polymer concentration in the fluid stock is related to (e.g., proportional to) the average molecular weight of the polymer. For example, in some embodiments when the polymer has a molecular weight of about 1,000,000 atomic mass units, the polymer is present at about 1% of the fluid stock by weight. In another example, when the polymer has a molecular weight of about 50,000 atomic mass units, the polymer is present at 20% of the fluid stock by weight. In general, the higher the molecular weight of the polymer, the lower the required concentration of polymer in the fluid stock to achieve high quality metal and/or ceramic nanofibers.

The fluid stock contains any suitable amount of polymer. The weight percent of polymer in the fluid stock is represented as the weight percent of polymer alone, or as the combined weight percent of polymer with associated precursor. In some embodiments, the fluid stock is about 10 weight % polymer or polymer associated with precursor. In other embodiments, the fluid stock comprises about 0.5 weight %, about 1 weight %, about 2 weight %, about 3 weight %, about 4 weight %, about 5 weight %, about 6 weight %, about 7 weight %, about 8 weight %, about 9 weight %, about 10 weight %, about 12 weight %, about 14 weight %, about 16 weight %, about 18 weight %, about 20 weight %, about 30 weight %, or about 40 weight % polymer or polymer associated with precursor. In some embodiments, the fluid stock comprises at least about 0.5 weight %, at least about 1 weight %, at least about 2 weight %, at least about 3 weight %, at least about 4 weight %, at least about 5 weight %, at least about 6 weight %, at least about 7 weight %, at least about 8 weight %, at least about 9 weight %, at least about 10 weight %, at least about 12 weight %, at least about 14 weight %, at least about 16 weight %, at least about 18 weight %, at least about 20 weight %, at least about 30 weight %, or at least about 40 weight % polymer or polymer associated with precursor. In some embodiments, the fluid stock comprises at most about 0.5 weight %, at most about 1 weight %, at most about 2 weight %, at most about 3 weight %, at most about 4 weight %, at most about 5 weight %, at most about 6 weight %, at most about 7 weight %, at most about 8 weight %, at most about 9 weight %, at most about 10 weight %, at most about 12 weight %, at most about 14 weight %, at most about 16 weight %, at most about 18 weight %, at most about 20 weight %, at most about 30 weight %, or at most about 40 weight % polymer or polymer associated with precursor. In some embodiments, the fluid stock comprises from about 1 weight % to about 20 weight % polymer or polymer associated with precursor. In some embodiments, the fluid stock comprises from about 1 weight % to about 10 weight %, from about 1 weight % to about 5 weight %, from about 5 weight % to about 20 weight %, from about 5 weight % to about 10 weight %, from about 10 weight % to about 15 weight %, or from about 15 weight % to about 20 weight % polymer or polymer associated with precursor.

Precursor

In some embodiments, the process includes electrospinning a fluid stock that comprises a precursor. In some embodiments, the precursor is any molecule or molecules convertible into a nanofiber. In some embodiments, the precursor is any molecule or molecules that associate with the polymers. In some embodiments, the precursor is any molecule or molecules that distribute substantially uniformly along the polymers or within the fluid stock. In some embodiments, an increased weight ratio of precursor in the fluid stock and distribution of the precursor uniformly in the fluid stock results in high quality nanofibers with few voids and/and defects (e.g., compared with a nanofiber where the weight ratio is lower or the fluid stock is not uniform).

Described herein is precursor, precursor having certain characteristics, precursor prepared according to the methods herein disclosed, precursor preparable by the methods herein disclosed, precursor incorporating the ligands herein disclosed, precursor incorporating the metals herein disclosed, and precursor suitable for the methods and systems herein disclosed. Also described herein are methods for using the precursor to produce nanofibers, includes the nanofibers prepared by the precursors, and the like.

In one aspect, the concentration of the precursor in the fluid stock is high. The concentration is any suitable concentration. In some embodiments, the concentration of the precursor in the fluid stock is about 5 mM, about 10 mM, about 20 mM, about 40 mM, about 60 mM, about 80 mM, about 100 mM, about 150 mM, about 200 mM, about 250 mM, about 300 mM, about 350 mM, about 400 mM, about 500 mM, about 700 mM, about 900 mM, about 1.2 M, about 1.5 M, about 2 M, about 5 M, and the like. In some embodiments, the concentration of the precursor in the fluid stock is at least 5 mM, at least 10 mM, a at least 20 mM, at least 40 mM, at least 60 mM, at least 80 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the precursor in the fluid stock is at most 5 mM, at most 10 mM, a at most 20 mM, at most 40 mM, at most 60 mM, at most 80 mM, at most 100 mM, at most 150 mM, at most 200 mM, at most 250 mM, at most 300 mM, at most 350 mM, at most 400 mM, at most 500 mM, at most 700 mM, at most 900 mM, at most 1.2 M, at most 1.5 M, at most 2 M, at most 5 M, and the like. In some embodiments, the concentration of the precursor in the fluid stock is between 5 mM and 5 mM, between 20 mM and 1 M, between 100 mM and 700 mM, between 100 mM and 300 mM, and the like.

In some embodiments, the precursor is a molecule that is substantially identical to the material comprising the nanofiber, optionally a metal. In some embodiments, the precursor is convertible to the material comprising the nanofiber. The precursor is converted by performing the calcination procedures disclosed herein. For example, metal precursors in complex with a ligand are converted to metal oxide nanofibers by employing oxidizing conditions and heat. In another example, precursors of metal in complex with a ligand are converted to a metal nanofiber by calcinating in reducing conditions and heat.

In some embodiments, pure metal or ceramic nanofibers have attractive properties such as high conductivity for use in devices such as batteries, ultracapacitors, solar cells, and the like. In some embodiments, nanofibers are also useful in the field of catalysis on account of the high surface area to volume ratio. In some embodiments, the precursor comprises a metal. In various instances, the metal is a transition metal, alkali metal, alkaline earth metal, post-transition metal, lanthanide, or actinide. Transition metals include: scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), and hasium (Hs). Alkali metals include: lithium (Li), sodium (Na), potassium (K), rubidium (Rb), cesium (Cs) and francium (Fr). Alkaline earth metals include: beryllium (Be), magnesium (Mg), calcium (Ca), strontium (Sr), barium (Ba), and radium (Ra). Post-transition metals include: aluminum (Al), gallium (Ga), indium (In), tin (Sn), thallium (Tl), lead (Pb), and bismuth (Bi). Lanthanides include the elements with atomic number 57 to 71 on the periodic table. Actinides include the elements with atomic number 89 to 103 on the periodic table. In addition, silicon (Si), germanium (Ge), antimony (Sb) and polonium (Po) are considered metals for the purposes of the present disclosure. In some embodiments, silicon is used in the process described herein to produce silicon nanofibers.

In some embodiments, the precursor is a metal oxide. An oxide is an anion of oxygen in the oxidation state of negative 2 or a compound containing oxygen in this state. The metal atom of the metal oxide is any metal. Exemplary metal oxides include $Al_2O_3$, $ZrO_2$, $Fe_2O_3$, $CuO$, $NiO$, $ZnO$, $CdO$, $SiO_2$, $TiO_2$, $V_2O_5$, $VO_2$, $Fe_3O_4$, $SnO$, $SnO_2$, $CoO$, $CoO_2$, $CO_3O_4$, $HfO_2$, $BaTiO_3$, $SrTiO_3$, and $BaSrTiO_3$. In some embodiments, metal oxide precursors crystallize and convert to a ceramic upon calcination, therefore "ceramic precursors" are synonymous with metal oxide precursors in some instances.

In some embodiments, the precursor comprises mixtures or combinations of precursors (e.g., optionally metal or metal oxide precursors). In some embodiments, mixtures of metal precursors are used to form metal alloy nanofibers. In some embodiments, metal alloy nanofibers are made from precursors that are alloys of metal. Exemplary metal alloys include CdSe, CdTe, PbSe, PbTe, FeNi (perm alloy), Fe—Pt intermetallic compound, Pt—Pb, Pt—Pd, Pt—Bi, Pd—Cu, and Pd—Hf.

Ligands

In some embodiments, precursor molecules do not have a high solubility in the fluid stock (e.g., optionally not a high solubility in an aqueous fluid stock). In some instances, a poor solubility of precursor prevents achieving each of (a) an increased weight ratio of precursor in the fluid stock and (b) a substantially uniform distribution of precursor in the fluid stock. In some embodiments, the precursor is solubilized. In some embodiments, the precursor molecules comprise a metal atom conjugated with a solvating molecule. In some embodiments, the solvating molecule associates with the polymer in the fluid stock. Optionally, the solvating molecule is substantially similar to the monomers of the polymer (e.g., ligand is acetate and polymer is polyvinyl acetate). In some embodiments (e.g., where the polymer is soluble in the fluid stock), solubility and uniform distribution of the precursor is achieved by associating the solvating molecule to both the precursor and the polymer.

In some embodiments, the solvating molecule is a ligand. The optional ligand is suitable for solubilizing or improving the dispersibility of a metal or metal oxide, optionally in an aqueous solution, optionally in the fluid stock. The present disclosure includes achieving a more uniform fluid stock by first solubilizing or distributing the precursor in a first solution. In some embodiments, the solvating molecule or ligand also improves the solubility or dispersibility of the precursor in a first solution (i.e., that is mixed with at least one second solution to make a fluid stock).

Some embodiments comprise solubilizing the precursor by associating it with a ligand, optionally complexing the precursor with a ligand. In some embodiments, the precursor is a metal precursor. In such an embodiment, the metal-ligand complex is heretofore referred to as the "precursor". In some embodiments, the precursor consists of a single molecule. In some embodiments, the precursor consists of more than one molecule in association (e.g., the association optionally being a chemical bond or complex). In some embodiments, the precursor is a metal-ligand complex. In some embodiments, the precursor is a metal or metal oxide.

The association between the solvating molecule or ligand and the precursor is any physical, chemical, or electromagnetic force known in the art of chemistry. An example of an association is a chemical bond. Examples of bonds are covalent bonds, non-covalent bonds, ionic bonds, hydrogen bonds, and the like. Further examples of associations are hydrophilic interactions and hydrophobic interactions. The skilled practitioner will be aware of many other types of interactions or associations that may be employed such as a Lewis acid-Lewis base interaction between the precursor and the solvating molecule or ligand. In this embodiment, the ligand is generally the "Lewis base", meaning that it furnishes an electron pair to share with a Lewis acid.

In some embodiments, the association is a metal-ligand complex. Metal-ligand complexes are also known as "coordination complexes", "metal complexes" or "chelation complexes". These complexes generally include a central atom or ion (usually metallic), bonded to a surrounding array of molecules or anions, which in turn are known as ligands or complexing agents. In nature, most compounds containing metals consist of coordination complexes. The association between the metal and ligand is strong or weak in various embodiments.

There are any suitable number of ligands per metal or metal oxide (e.g., optionally a number suitable to solvate the metal or metal oxide). The number of ligands per metal atom is referred to as the "coordination number". In some embodiments, the coordination numbers is between two and nine. Large numbers of ligands are not uncommon for the lanthanides and actinides. In various embodiments, the number of bonds depends on the size, charge, and electron configuration of the metal ion and the ligands. Metal ions may have more than one coordination number.

In some examples there are at least 2 ligand molecules for every metal atom. In other examples, there are at least 3 ligands per metal atom. In some embodiments, the precursor is essentially saturated with ligand. One may determine if the precursor is essentially saturated with ligand by titrating successively more ligand into the metal and determining the amount of ligand complexed by any suitable method known to those in the art of analytical chemistry. In some embodiments, one determines if the precursor is essentially saturated with ligand by waiting successively longer times and determining the amount of ligand complexed by any suitable method known to those in the art of analytical chemistry. The precursor is substantially saturated when no more ligand complexes with the metal precursor at successively higher amounts of ligand or at successively longer times.

In one example, the ligand is acetate. In some embodiments, the precursor molecules are metal acetates and the polymer is polyvinyl acetate. In another embodiment, the precursor molecules are metal acetates and the polymer is polyvinyl alcohol.

There are many ligands known to those skilled in the art, any of which are utilized. Further examples include iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrite, triphenylphosphate, cyanide, carbon monoxide, or alko-oxide. In some examples, the precursor is a metal complex such as metal acetate, metal chloride, metal nitrate, or metal alko-oxide.

In various embodiments, metal and/or ceramic precursors are metal atoms complexed with a ligand. Exemplary metal and/or ceramic precursors include nickel acetate, copper acetate, iron acetate, nickel nitrate, copper nitrate, iron alko-oxide, and the like.

The present disclosure also encompasses the use of combinations of ligands. In one example, a first ligand imparts increased solubility to the precursor, while a second ligand preferentially associates with the polymer.

Polymers

In some embodiments, the electrospinning methods described herein comprise a polymer in the fluid stock. The methods described herein optionally utilize an aqueous fluid stock. In some applications, a water-based process is desirable, for instance if one wants to avoid potential health, environmental, or safety problems associated with organic solvents. As described herein, in some embodiments it is advantageous to electrospin a fluid stock that is homogenous. In some embodiments, the fluid stock is homogenous (e.g., which comprises a water-soluble polymer).

In some aspects, the polymer is soluble in water, meaning that it forms a solution in water. In other embodiments, the polymer is swellable in water, meaning that upon addition of water to the polymer the polymer increases its volume up to a limit. Water soluble or swellable polymers are generally hydrophilic. Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, and the like. In some embodiments, the polymer is isolated from biological material. In some embodiments, the polymer is starch, chitosan, xanthan, agar, guar gum, and the like.

In some embodiments, the polymer imparts a suitable elongational viscosity to the fluid stock for electrospinning nanofibers. In some embodiments, low shear viscosity leads to beaded nanofibers. In one aspect, uniform distribution of the precursor in the fluid feed helps to maintain a suitably high elongational viscosity.

Viscosity is a measure of the resistance of a fluid which is being deformed by either shear stress or tensile stress. Viscosity is measured in units of poise. In various embodiments, the viscosity of the polymer or fluid stock is measured with or without associated precursor. The polymer or fluid stock has any suitable elongational viscosity. In some embodiments, the polymer or fluid stock has an elongational viscosity of about 50 poise, about 100 poise, about 200 poise, about 300 poise, about 400 poise, about 500 poise, about 600 poise, about 800 poise, about 1000 poise, about 1500 poise, about 2000 poise, about 2500 poise, about 3000 poise, about 5,000 poise, and the like. In some embodiments, the polymer or fluid stock has an elongational viscosity of at least 50 poise, at least 100 poise, at least 200 poise, at least 300 poise, at least 400 poise, at least 500 poise, at least 600 poise, at least 800 poise, at least 1,000 poise, at least 1,500 poise, at least 2,000 poise, at least 2,500 poise, at least 3,000 poise, at least 5,000 poise, and the like. In some embodiments, the polymer or fluid stock has an elongational viscosity of at most 50 poise, at most 100 poise, at most 200 poise, at most 300 poise, at most 400 poise, at most 500 poise, at most 600 poise, at most 800 poise, at most 1,000 poise, at most 1,500 poise, at most 2,000 poise, at most 2,500 poise, at most 3,000 poise, at most 5,000 poise, and the like. In some embodiments, the polymer or fluid stock has an elongational viscosity of between about 100 and 3,000 poise, or between about 1,000 and 5,000 poise, and the like.

Molecular weight is related to the mass of the monomers comprising the polymer and the degree of polymerization. In some embodiments, molecular weight is a factor that affects viscosity. The polymer has any suitable molecular weight. In some embodiments, the polymer has a molecular weight of at least 20,000 atomic mass units ("amu"), at least 50,000 amu, at least 100,000 amu, at least 200,000 amu, at least 300,000 amu, at least 400,000 amu, at least 500,000 amu, at least 700,000 amu, or at least 1,000,000 amu and the like. In some embodiments, the polymer has a molecular weight of at most 20,000 amu, at most 50,000 amu, at most 100,000 amu, at most 200,000 amu, at most 300,000 amu, at most 400,000 amu, at most 500,000 amu, at most 700,000 amu, or at most 1,000,000 amu and the like. In some embodiments, the polymer has a molecular weight of about 20,000 amu, about 50,000 amu, about 100,000 amu, about 200,000 amu, about 300,000 amu, about 400,000 amu, about 500,000 amu, about 700,000 amu, or about 1,000,000 amu and the like. In yet other embodiments, the polymer has a molecular weight of from about 50,000 amu to about 1,00,000 amu, from about 100,000 amu to about 500,000 amu, from about 200,000 amu to about 400,000 amu, or from about 500,000 amu to about 1,00,000 amu and the like.

The polydispersity index ("PDI") is a measure of the distribution of molecular mass in a given polymer sample. The PDI is the weight average molecular weight divided by the number average molecular weight, which is calculated by formula known to those skilled in the art of polymer science. The polymer has any suitable polydispersity index. In some embodiments, the polymer has a polydispersity index of about 1, about 2, about 3, about 4, about 5, about 6, about 7, about 8, about 9, about 10, about 15, about 20, and the like. In some embodiments, the polymer has a polydispersity index of at least 1, at least 2, at least 3, at least 4, at least 5, at least 6, at least 7, at least 8, at least 9, at least 10, at least 15, at least 20, and the like. In some embodiments, the polymer has a polydispersity index of at most 1, at most 2, at most 3, at most 4, at most 5, at most 6, at most 7, at most 8, at most 9, at most 10, at most 15, at most 20, and the like. In some embodiments, the polymer has a polydispersity index of about 1 to about 10, about 2 to about 5, and the like.

The present disclosure includes polymers, includes polymers having the characteristic herein disclosed, includes polymers prepared according to the methods herein disclosed, includes polymers preparable by the methods herein disclosed, includes polymers incorporating the precursor herein disclosed, and includes polymers suitable for the methods and systems herein disclosed. The present disclosure also includes methods for using the polymers, and the like.

In some embodiments, the fluid stock comprises mixtures or combinations of polymers. For example, a first polymer binds to a first precursor and a second polymer binds to a second precursor. In another example, a first polymer associates with a high amount of precursor and a second polymer is chosen to create high quality nanofibers when electrospun (e.g., elongational viscosity). In some embodiments, the fluid stock includes a high-precursor loading polymer and a highly spinnable polymer.

In some embodiments, the fluid stock comprises co-polymers including block co-polymers. In some embodiments, the co-polymer comprises at least one vinylpyrrolidone, dimethylacrylamide, and/or polyacrylamide block. In some embodiments, the various blocks of the co-polymer associate with different precursors. In one example, a first polymer block associates with nickel precursor and a second polymer block associates with iron precursor (i.e., a nanofiber is created that has nano-domains of nickel interspersed with nano-domains of iron corresponding to the distribution of the blocks of their respective polymer associations). In some embodiments, such a nanofiber has different properties than a nickel-iron alloy nanofiber (i.e., where the nickel and iron are substantially uniformly mixed on the molecular level).

In some embodiments, the polymer is removed from the nanofiber following electrospinning (e.g., by the calcination methods herein disclosed). In some embodiments, calcination degrades the polymer. In some embodiments, the fluid stock comprises degradable polymers (e.g., polymers removable by the calcination methods herein disclosed). The polymer is optionally degraded or removed by any suitable means including, but not limited to thermal degradation, chemical degradation, sublimation, evaporation, and the like. In some embodiments, lower molecular weight polymers are easier to remove by evaporation or sublimation.

Polymer—Precursor Associations

In some embodiments, associating the precursor with the polymer achieves at least one of a high proportion of precursor in the fluid stock and a uniform distribution of precursor in the fluid stock. In some instances the association reduces the amount of voids or defects in the nanofiber. In some embodiments, associating the precursor with the polymer increases the solubility of one or more of the precursor and the polymer in the fluid stock. The present disclosure encompasses precursor in association with polymer and encompasses methods for associating precursor with polymer.

In some embodiments, the precursor associates with the polymer in the fluid stock. In some embodiments, the process described herein utilizes an association of the precursor with the polymer to provide a fluid stock wherein precursor is uniformly distributed in the fluid stock. In various embodiments, the fluid stock remains a solution or substantially uniform dispersion (e.g., in part because the precursor associates with the polymer in the fluid stock). In various embodiments, the association is a physical, chemical, or electromagnetic force between the precursor and the polymer. Examples of associations are chemical bonds. Examples of bonds are covalent bonds, non-covalent bonds, ionic bonds, hydrogen bonds, and the like. Further examples of associations are hydrophilic interactions and hydrophobic interactions. Other types of suitable interactions or associations are a Lewis acid-Lewis base interaction between the precursor and the polymer. In some embodiments, the association is a metal-ligand complex.

In some embodiments, the monomers along the polymer chain provide sites to which precursor associates. In some embodiments, these sites are chemical groups including but not limited to hydroxyl groups, carbonyl groups, aldehyde groups, esters, amines, coarboxyamide, imines, nitrates and the like. In some embodiments, groups contain hydrocarbons, halogens, oxygen, nitrogen, sulfur, phosphorus and the like. Those skilled in the art will be familiar with chemical groups. Chemical groups are also known as "functional groups". In some embodiments, precursors associate with chemical groups on the polymer through chemical bonds.

In some aspects, the polymer comprises a plurality of moieties. In some embodiments, these moieties are chemical groups, optionally chemical groups of the monomers bound along the polymer chain. In some embodiments, the moieties complex or bind with precursors, including metals. In some embodiments, the moieties displace the ligand of a metal-ligand precursor. In some embodiments, the polymer includes on average at least 100 functional groups, chemical groups, or moieties per polymer molecule that are capable of associating with a precursor (e.g., optionally with a metal precursor).

In one example, the precursors are iron acetates (a metal ligand complex) and the polymer is polyvinyl alcohol. In this example, the moiety or functional group is an alcohol group. The polymer has a plurality of alcohol groups along its backbone suitable for associating with the iron acetate. In this example, the acetate either binds to the alcohol groups while still being complexed with the iron, or the alcohol groups displace the acetate ligand and associate directly with the iron.

In some embodiments, the amount of precursor associated or loaded onto the polymer is high. In some embodiments, higher loading is related to the number of functional groups in the polymer (which depends in part on the molecular weight of the polymer and concentration of the functional groups). In some instances, more functional groups provide more sites for precursor to associate, thereby enabling higher precursor loading.

In some instances, the quantity of precursor associated with the polymer is determined at least in part by the number of ligands per precursor. In some embodiments, more ligands per metal increases the probability of a ligand associating with a functional group on the polymer. In one example, there are three acetate ligands per aluminum in the precursor.

In some embodiments, the polymer is essentially saturated with precursor molecules, meaning that substantially no more precursor will associate with the polymer. In some embodiments, the saturation is determined by adding an excess of precursor to the polymer, separating the polymer from the precursor and determining what quantity of precursor bound to the polymer. The amount of precursor is measured using any suitable technique known in the art of analytical chemistry. In some instances, following separation, the practitioner determines the amount of unassociated precursor, the amount precursor associated with the polymer, or both the amount of unassociated precursor and the amount precursor associated with the polymer. Tests of this nature are conducted with progressively more precursor added to the fluid stock until no more precursor binds to the polymer, indicating that the precursor is present in excess amount and the polymer is saturated. In some instances, measurements are conducted over progressively longer time periods of contact between the precursor and the polymer to verify that no more precursor associates with the polymer at longer times, and the polymer is saturated with precursor. Another suitable method for determining saturation is to calculate the stoichiometry of the association. For example in some instances, one compares the moles of chemical groups on the polymer in the fluid stock and the moles of precursor molecules associated with those functional groups. If one precursor associates with one chemical group, the polymer is saturated when the moles of precursor is substantially equal to the moles of chemical groups.

In some embodiments, the polymer is saturated with precursor up to any suitable level. In some instances, various samples of polymer have a distribution of precursor saturation levels. Individual polymer samples accordingly exceed or fall short of the average precursor saturation. In some embodiments, the polymer is on average less than 100% saturated with precursor. For example, the polymer is on average at least 20%, at least at least 30%, at least 40%, at least 50%, at least 60%, at least 70%, at least 75%, at least 80%, at least 85%, at least 85%, at least 90%, at least 95%, at least 96%, at least 97%, at least 98%, or at least 99% saturated. In some instances, the polymer is on average between about 50% and 100%, between about 70% and 100%, between about 90% and 100%, between about 50% and 90%, between about 60% and 80%, or between about 20% and 50% saturated.

Nanofibers

Provided in certain embodiments herein are nanofibers, e.g., nanofibers having any one or more of the characteristics herein disclosed, nanofibers prepared according to the methods described herein, and nanofibers preparable by the methods described herein. Also provided herein are processes for using the nanofibers, devices comprising the nanofibers and the like.

In some embodiments, the nanofibers have few defects and/or voids. In some embodiments, there are about 1, about 5, about 10, about 50, about 100, and the like defects per linear mm of nanofiber. In some embodiments, there are at most about 1, at most about 5, at most about 10, at most about 50, at most about 100, and the like defects per linear mm of nanofiber. In other embodiments, the nanofibers have fewer defects and/or voids, wherein the number of defects and/or voids in the nanofiber is in comparison to a nanofiber not produced by the methods of the disclosure (for example with a low loading of precursor).

Provided in various embodiments herein are pure metal nanofibers, nanofibers comprising metal, or nanofibers substantially comprised of metal. Pure metal nanofibers have any suitable percent composition of metal. In some embodiments, the metal nanofiber comprises about 99.99%, about 99.95%, about 99.9%, about 99%, about 98%, about 97%, about 96%, about 95%, about 90%, about 80%, and the like of metal by mass. In some embodiments, the metal nanofiber comprises at least about 99.99%, at least about 99.95%, at least about 99.9%, at least about 99%, at least about 98%, at least about 97%, at least about 96%, at least about 95%, at least about 90%, at least about 80%, and the like of metal by mass.

The metal is any metal, including: transition metal, alkali metal, alkaline earth metal, post-transition metal, lanthanide, or actinide. Suitable transition metals include: scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), and hasium (Hs). Suitable alkali metals include: lithium (Li), sodium (Na), potassium (K), rubidium (Rb), cesium (Cs) and francium (Fr). Suitable alkaline earth metals include: beryllium (Be), magnesium (Mg), calcium (Ca), strontium (Sr), barium (Ba), and radium (Ra). Suitable post-transition metals include: aluminum (Al), gallium (Ga), indium (In), tin (Sn), thallium (Tl), lead (Pb), and bismuth (Bi). Suitable lanthanides include the elements with atomic number 57 to 71 on the periodic table. Suitable actinides include the elements with atomic number 89 to 103 on the periodic table. In some embodiments, the nanofiber is germanium (Ge), antimony (Sb) and polonium (Po), or silicon (Si). Methods for producing metal nanofibers are disclosed herein and optionally include calcination under reducing conditions.

Provided in various embodiments herein are pure ceramic nanofibers, nanofibers comprising ceramic, or nanofibers substantially comprised of ceramic. In some embodiments, the ceramic nanofiber comprises about 99.99%, about 99.95%, about 99.9%, about 99%, about 98%, about 97%, about 96%, about 95%, about 90%, about 80%, and the like of ceramic by mass. In some embodiments, the ceramic nanofiber comprises at least about 99.99%, at least about 99.95%, at least about 99.9%, at least about 99%, at least about 98%, at least about 97%, at least about 96%, at least about 95%, at least about 90%, at least about 80%, and the like of ceramic by mass.

In some embodiments, ceramics are metal oxide. Exemplary ceramics include but are not limited to $Al_2O_3$, $ZrO_2$, $Fe_2O_3$, CuO, NiO, ZnO, CdO, $SiO_2$, $TiO_2$, $V_2O_5$, $VO_2$, $Fe_3O_4$, SnO, $SnO_2$, CoO, $CoO_2$, $Co_3O_4$, $HfO_2$, $BaTiO_3$, $SrTiO_3$, and $BaSrTiO_3$. Methods for producing ceramic nanofibers are disclosed herein and optionally include calcination under oxidizing conditions.

Provided in various embodiments herein are pure metal alloy nanofibers, nanofibers comprising metal alloy, or nanofibers substantially comprised of metal alloy. The metal alloy is any suitable metal alloy including: transition metal, alkali metal, alkaline earth metal, post-transition metal, lanthanide, or actinide, additionally, germanium (Ge), antimony (Sb) and polonium (Po), and silicon (Si). Exemplary metal alloys include, but are not limited to CdSe, CdTe, PbSe, PbTe, FeNi (perm alloy), Fe—Pt intermetallic compound, Pt—Pb, Pt—Pd, Pt—Bi, Pd—Cu, and Pd—Hf. Methods for producing metal alloy nanofibers are disclosed herein and optionally include electrospinning a fluid stock comprising a mixture of the metal precursors of the alloy and calcinating under reducing conditions. For example, a CdSe alloy nanofiber is produced by electrospinning a fluid stock comprising a mixture of cadmium acetates and selenium acetates, followed by calcinating under reducing conditions.

In one aspect, in addition to metal, ceramic, or alloy nanofibers, a nanofiber of virtually any material is produced using the methods described herein (e.g., as long as the material is convertible from suitable precursors distributed substantially evenly and in a high proportion of the fluid stock). In some embodiments, the nanofiber is a calcium phosphate (Ca—P) nanofiber. In some embodiments, the methods of the present disclosure produce high quality Ca—P nanofibers, optionally wherein the nanofiber is at least 50 μm long on average.

In some embodiments, the methods of the present disclosure are combined with other methods to produce yet more embodiments. For example, the nanofibers undergo further modifications following their synthesis. As disclosed in U.S. patent application Ser. No. 12/439,398 for example, biologically functional additives are added to calcium phosphate nanofibers for culturing bone and dental cells or as implants to treat bone, dental or periodontal diseases and defects.

In some embodiments, the nanofibers are surface-modified. For example, enzymes are immobilized on the nanofiber surface to create a biological catalyst. In another example, doping processes from the semiconductor industry are employed to introduce impurities into a pure semiconductor nanofiber (e.g., for the purpose of modulating its electrical properties).

In one aspect, described herein is a nanofiber comprising a segment comprising a continuous matrix of a metal, a metal oxide, a metal alloy, a ceramic, or a combination thereof. In some instances, a continuous matrix is conductive from one end of the segment to the other end of the segment. In some instances, a continuous matrix defines a single unified volume of the metal, metal oxide, metal alloy, ceramic, or a combination thereof. In some instances, the metal, metal oxide, metal alloy, ceramic, or a combination thereof is in contact with metal, metal oxide, metal alloy, ceramic, or a combination thereof all along the length of the continuous matrix. The segment or plurality of segments comprise any suitable proportion of the nanofiber, including about 5%, about 10%, about 20%, about 30%, about 40%, about 50%, about 60%, about 70%, about 80%, about 90%, about 95%, and the like of the length of the nanofiber. In some embodiments, the segment or segments comprise at most 5%, at most 10%, at most 20%, at most 30%, at most 40%, at most 50%, at most 60%, at most 70%, at most 80%, at most 90%, at most 95%, and the like of the length of the nanofiber. In some embodiments, the segment or segments comprise at least 5%, at least 10%, at least 20%, at least 30%, at least 40%, at least 50%, at least 60%, at least 70%, at least 80%, at least 90%, at least 95%, and the like of the length of the nanofiber.

Hybrid Nanofibers

Previous methods for producing nanofibers (e.g., the sol-gel method) do not generally produce nanofibers of a high enough quality to be any form other than a solid monolithic cylinder. In some instances, by employing the methods disclosed herein, the number and size of voids and defects in nanofibers are substantially reduced, allowing more complex geometries such as hollow nanofibers and composite or hybrid nanofibers made of more than one material. In some instances, the hybrid or hollow nanofibers are suitably long and continuous (i.e., high quality).

Described herein are methods for producing hybrid nanofibers, methods for using hybrid nanofibers, devices comprising hybrid nanofibers, and the hybrid nanofibers themselves. As disclosed herein, hybrid nanofibers are useful in flexible solar cells for example. "Hybrid" is used interchangeably with "composite" and means that the nanofiber comprises at least two materials. The materials are found in distinct locations on or in the nanofiber. Such locations are arranged in any suitable geometric matter.

Figure 35:
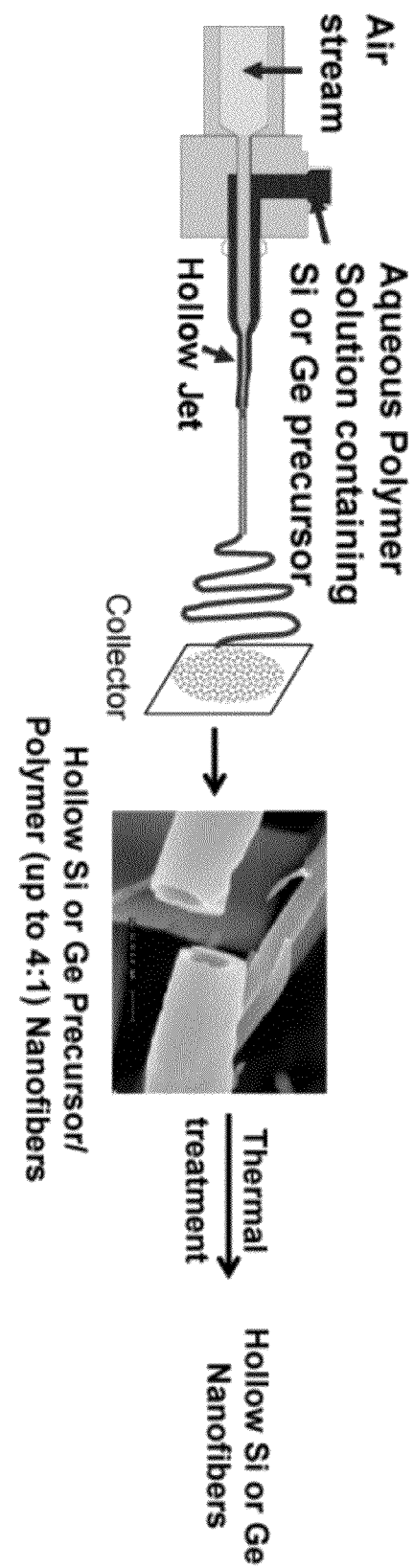
FIG. 35 shows a schematic of the process and system for producing hollow Si or Ge nanofibers suitable for use in lithium ion batteries and a micrograph of hollow Si or Ge electrospun fluid stock.

One exemplary geometry is a fiber with various annular rings or layers made of different materials. In some embodiments, each layer is coaxial. In some embodiments, coaxial hybrid nanofibers are produced by the methods described herein. In some embodiments, the spinneret is modified to comprise a first conduit containing a first fluid stock surrounded by a second conduit containing a second fluid stock (FIG. 35). In some instances, the fluid stocks are drawn or forced through the conduits. Such a configuration produces an annular fluid jet with the second fluid stock surrounding the first fluid stock. In some embodiments, as the jet dries and is then calcified, the first and second fluid stocks do not substantially mix, so are converted into different materials in the nanofiber.

In some embodiments of a hybrid nanofiber (e.g., including a coaxial nanofiber), various layers are any material suitable. In some embodiments, the coaxial layers are referred to in any manner unless the context clearly indicates otherwise. For example, for a nanofiber consisting of two coaxial layers, the first layer may surround the second layer or the second layer may surround the first layer. In some embodiments, the first coaxial layer comprises a ceramic. In some embodiments the second coaxial layer comprises a ceramic. In some embodiments, the first coaxial layer comprises a metal. In some embodiments the second coaxial layer comprises a metal. In various embodiments, the hybrid nanofiber is metal-on-metal, ceramic-on-metal, ceramic-on-ceramic, or metal-on-ceramic. In some embodiments, the hybrid nanofiber has at least 3 components, including any integer with all types of materials in all types of combinations.

In some embodiments, a metal like Ag, Cu, Ni, Fe, Co, Pb, Au, Sn, Al, is hybridized with a ceramic like $Al_2O_3$, $ZrO_2$, $Fe_2O_3$, CuO, NiO, ZnO, CdO, $SiO_2$, $TiO_2$, $V_2O_5$, $VO_2$, $Fe_3O_4$, SnO, $SnO_2$, CoO, $CoO_2$, $Co_3O_4$, $HfO_2$, $BaTiO_3$, $SrTiO_3$, $BaSrTiO_3$. In some embodiments, a first co-axial layer comprises Ni or Fe. In some embodiments, a second co-axial layer comprises $Al_2O_3$, $ZrO_2$, $SiO_2$ or $TiO_2$. In one embodiment, a first co-axial layer comprises Ni and a second co-axial layer comprises $ZrO_2$. In one embodiment, a first coaxial layer comprises $Al_2O_3$, and a second co-axial layer comprises ITO. In another embodiment, a first coaxial layer comprises $ZrO_2$ and a second co-axial layer comprises ZnO.

Complex geometries other than coaxial fibers are also described herein. For example in one arrangement, a first and a second material are disposed along different parts of the length of the nanofiber. In some embodiments, such a nanofiber is produced by alternating the fluid stock between a first fluid stock comprising a first material and a second fluid stock comprising a second material in the electrospinning process. In such an embodiment, upon calcination a nanofiber is produced that alternates along its length between a first material and a second material. The first and second materials are any suitable material, including ceramics and metals.

In some embodiments, the nanofiber is a hybrid of both metal and ceramic. In these embodiments, the mass percentages of the metal and ceramic components of the nanofiber are added and comprise about 99.99%, about 99.95%, about 99.9%, about 99%, about 98%, about 97%, about 96%, about 95%, about 90%, about 80%, and the like of the nanofiber. In other embodiments, the sum of the metal and ceramic components of the nanofiber are at least about 99.99%, at least about 99.95%, at least about 99.9%, at least about 99%, at least about 98%, at least about 97%, at least about 96%, at least about 95%, at least about 90%, at least about 80%, and the like of the nanofiber.

Hollow Nanofibers

The present disclosure encompasses methods for producing hollow nanofibers, methods for using hollow nanofibers, devices incorporating hollow nanofibers, and the hollow nanofibers themselves. As disclosed herein, hollow nanofibers are useful in lithium ion batteries in some instances.

In some embodiments, hollow nanofibers are produced using a spinneret that comprises a first conduit containing a first fluid surrounded by a second conduit containing a second fluid. In some instances, the first fluid is any fluid that does not become an integral part of the nanofiber (e.g., a gas). In some embodiments, the first fluid is inert.

In some embodiments, the first fluid is a gas, optionally air. In some instances, there are certain advantages to using a gas as the inner annular fluid as described in the gas-assisted electrospinning technique as disclosed in PCT Patent Application PCT/US2011/024894 ("Electrospinning apparatus and nanofibers produced therefrom"). In some embodiments, the gas jet accelerates and elongates the fluid stock stream emanating from the electrospinner, leading to thinner fibers. In some instances, the methods disclosed herein lead to thinner nanofibers (e.g., when using the gas-assisted method) and nanofibers that have few defects (e.g., so are therefore high quality).

In some embodiments, the first (inert) fluid is a liquid, optionally mineral oil for example. In embodiments where the outer fluid stock is aqueous, the mineral oil core does not mix with the electrospun fluid stock. In some embodiments, the mineral oil core is removed following calcination to leave a hollow nanofiber.

In some embodiments, hollow nanofibers are produced without an inert inner annular fluid. For example, a coaxial hybrid nanofiber is produced, then the inner annual material is removed, leaving a hollow nanofiber. The inner material is removed by any suitable technique including dissolving, subliming, evaporating, degrading, etching, or equivalents that result in a hollow nanofiber.

The hollow core of the nanofiber has any suitable diameter. In some embodiments, a given collection of nanofibers comprise nanofibers that have a distribution of fibers with various diameters of the hollow core. In some embodiments, a single nanofiber has a hollow core diameter that varies along its length. In some embodiments, certain fibers of a population or portions of a fiber exceed or fall short of the average inner diameter. In some embodiments, the diameter of the hollow core is on average about 1 nm, about 2 nm, about 3 nm, about 4 nm, about 5 nm, about 6 nm, about 7 nm, about 8 nm, about 9 nm, about 10 nm, about 15 nm, about 20 nm, about 40 nm, about 60 nm, about 80 nm, about 100 nm, about 200 nm, about 300 nm, about 400 nm, about 500 nm, and the like. In some embodiments, the diameter of the hollow core is on average at most about 1 nm, at most about 2 nm, at most about 3 nm, at most about 4 nm, at most about 5 nm, at most about 6 nm, at most about 7 nm, at most about 8 nm, at most about 9 nm, at most about 10 nm, at most about 15 nm, at most about 20 nm, at most about 40 nm, at most about 60 nm, at most about 80 nm, at most about 100 nm, at most about 200 nm, at most about 300 nm, at most about 400 nm, at most about 500 nm, and the like. In some embodiments, the diameter of the hollow core is on average at least about 1 nm, at least about 2 nm, at least about 3 nm, at least about 4 nm, at least about 5 nm, at least about 6 nm, at least about 7 nm, at least about 8 nm, at least about 9 nm, at least about 10 nm, at least about 15 nm, at most least 20 nm, at least about 40 nm, at least about 60 nm, at least about 80 nm, at least about 100 nm, at least about 200 nm, at least about 300 nm, at least about 400 nm, at least about 500 nm, and the like. In some embodiments, the diameter of the hollow core is on average between about 1 nm and 10 nm, between about 5 nm and 20 nm, between about 5 nm and 10 nm, between about 10 nm and 50 nm, between about 20 nm and 50 nm, between about 1 nm and 50 nm, between about 100 nm and 500 nm, and the like.

Nanofiber Properties

In one aspect, the nanofibers described herein are unique compositions of matter, having never before been described. In one aspect, described herein are nanofibers having certain novel properties. In various embodiments, these nanofibers have certain dimensions, aspect ratios, specific surface areas, porosities, conductivities, flexibilities, and the like that are beyond what was previously achievable. In some embodiments, the nanofibers described herein offer improvement upon devices that comprise the nanofibers. For example, the metal nanofibers described herein have an electrical conductivity that is at least 70% of the conductivity of the material when formed into a sheet in some instances. In some embodiments, high conductivity improves the function of solar cells based on the novel metal nanofibers.

In some embodiments, certain applications favor smaller diameter nanofibers (e.g., which are achieved without sacrificing quality by practicing the methods described herein). For example, gas-assisted electrospinning techniques are utilized to create thin nanofibers (i.e., by accelerating the jet stream of fluid stock leaving the electrospinner). In some embodiments, the diameter of the nanofiber changes upon calcination, optionally shrinking. In one example, copper nanofibers were 600 to 800 nm in diameter when electrospun and 300 to 500 nm after calcination. In some embodiments, the loading of precursor on the polymer affects the diameter of the nanofiber. In some embodiments, thicker nanofibers result from higher precursor loadings (e.g., because there is more precursor material converted into the nanofiber). Methods for measuring the diameter of a nanofiber include, but are not limited to microscopy, optionally transmission electron microscopy ("TEM") or scanning electron microscopy ("SEM").

The nanofiber has any suitable diameter. In some embodiments, a given collection of nanofibers comprise nanofibers that have a distribution of fibers of various diameters. In some embodiments, a single nanofiber has a diameter that varies along its length. In some embodiments, certain fibers of a population or portions of a fiber exceed or fall short of the average diameter. In some embodiments, the nanofiber has on average a diameter of about 20 nm, about 30 nm, about 40 nm, about 50 nm, about 60 nm, about 70 nm, about 80 nm, about 90 nm, about 100 nm, about 130 nm, about 150 nm, about 200 nm, about 250 nm, about 300 nm, about 400 nm, about 500 nm, about 600 nm, about 700 nm, about 800 nm, about 900 nm, about 1,000 nm, about 1,500 nm, about 2,000 nm and the like. In some embodiments, the nanofiber has on average a diameter of at most 20 nm, at most 30 nm, at most 40 nm, at most 50 nm, at most 60 nm, at most 70 nm, at most 80 nm, at most 90 nm, at most 100 nm, at most 130 nm, at most 150 nm, at most 200 nm, at most 250 nm, at most 300 nm, at most 400 nm, at most 500 nm, at most 600 nm, at most 700 nm, at most 800 nm, at most 900 nm, at most 1,000 nm, at most 1,500 nm, at most 2,000 nm and the like. In some embodiments, the nanofiber has on average a diameter of at least 20 nm, at least 30 nm, at least 40 nm, at least 50 nm, at least 60 nm, at least 70 nm, at least 80 nm, at least 90 nm, at least 100 nm, at least 130 nm, at least 150 nm, at least 200 nm, at least 250 nm, at least 300 nm, at least 400 nm, at least 500 nm, at least 600 nm, at least 700 nm, at least 800 nm, at least 900 nm, at least 1,000 nm, at least 1,500 nm, at least 2,000 nm and the like. In yet other embodiments, the nanofiber has on average a diameter between about 50 nm and about 300 nm, between about 50 nm and about 150 nm, between about 100 nm and about 400 nm, between about 100 nm and about 200 nm, between about 500 nm and about 800 nm, between about 60 nm and about 900 nm, and the like.

In some embodiments, the nanofiber is long. In some instances, the methods of the present disclosure produce long nanofibers (e.g., because the high loading and uniform distribution of precursor creates nanofibers that are highly "continuous" or "coherent", meaning that they have few defects). In some embodiments, such high quality nanofibers are statistically more likely to be long because the probability is reduced that there is a defect along any particular length that is severe enough to define an end of the nanofiber. Methods for measuring the length of a nanofiber include, but are not limited to microscopy, optionally transmission electron microscopy ("TEM") or scanning electron microscopy ("SEM").

The nanofibers have any suitable length. In some instances, a given collection of nanofibers comprise nanofibers that have a distribution of fibers of various lengths. In some embodiments, certain fibers of a population exceed or fall short of the average length. In some embodiments, the nanofiber has an average length of about 20 μm, about 50 μm, about 100 μm, about 500 μm, about 1,000 μm, about 5,000 μm, about 10,000 μm, about 50,000 μm, about 100,000 μm, about 500,000 μm, and the like. In some embodiments, the nanofiber has an average length of at least about 20 μm, at least about 50 μm, at least about 100 μm, at least about 500 μm, at least about 1,000 μm, at least about 5,000 μm, at least about 10,000 μm, at least about 50,000 μm, at least about 100,000 μm, at least about 500,000 μm, and the like.

"Aspect ratio" is the length of a nanofiber divided by its diameter. In some instances, aspect ratio is a useful metric for quantifying the coherence of a nanofiber, with higher aspect ratios indicating that a nanofiber or population of nanofibers have few voids or defects. In some embodiments, aspect ratio refers to a single nanofiber. In some embodiments, aspect ratio refers to a plurality of nanofibers and is reported as a single average value (i.e., the aspect ratio being the average length of the nanofibers of a sample divided by their average diameter). In some instances, diameters and/or lengths are measured by microscopy. The nanofibers have any suitable aspect ratio. In some embodiments, the nanofiber has an aspect ratio of about 10, about $10^2$, about $10^3$, about $10^4$, about $10^5$, about $10^6$, about $10^7$, about $10^8$, about $10^9$, about $10^{10}$, about $10^{11}$, about $10^{12}$, and the like. In some embodiments the nanofiber has an aspect ratio of at least 10, at least $10^2$, at least $10^3$, at least $10^4$, at least $10^5$, at least $10^6$, at least $10^7$, at least $10^8$, at least $10^9$, at least $10^{10}$, at least $10^{11}$, at least $10^{12}$, and the like. In some embodiments, the nanofiber is of substantially infinite length and has an aspect ratio of substantially infinity.

In some embodiments, the nanofibers have a high surface area. In some embodiments, the nanofiber is used as a catalyst where reactions take place on the surface of the nanofiber. In these catalyst embodiments, a high surface area reduces the size of the process equipment and/or reduces the amount of expensive material required in the catalyst.

The "specific surface area" is the mass of at least one fiber divided by the surface area of at least one fiber. In various instances, the specific surface area is calculated based on a single nanofiber, or based on a collection of nanofibers and reported as a single average value. Techniques for measuring mass are known to those skilled in the art. In some instances, the surface area is calculated by measuring the diameter and length of nanofiber in the sample and applying the equation for the surface area of a cylinder (i.e., 2 times pi times half of the diameter of the nanofiber times the sum of the length of the nanofiber and half of the diameter of the nanofiber). In some instances, the surface area is measured by physical or chemical methods, for example by the Brunauer-Emmett, and Teller (BET) method where the difference between physisorption and desorption of inert gas is utilized. In some embodiments, the surface area is measured by titrating certain chemical groups on the nanofiber to estimate the number of groups on the surface, which is related to the surface area by a previously determined titration curve. Those skilled in the art of chemistry will be familiar with methods of titration.

The nanofiber has any suitable specific surface area. In some embodiments, the specific surface area is about 0.1 $g/m^2$, about 0.5 $g/m^2$, about 1.0 $g/m^2$, about 5 $g/m^2$, about 10 $g/m^2$, about 40 $g/m^2$, about 60 $g/m^2$, about 80 $g/m^2$, about 100 $g/m^2$, about 200 $g/m^2$, about 400 $g/m^2$, about 600 $g/m^2$, about 800 $g/m^2$, about 1,000 $g/m^2$, about 1,500 $g/m^2$, about 2,000 $g/m^2$, and the like. In some embodiments, the specific surface area is at least 0.1 $g/m^2$, at least 0.5 $g/m^2$, at least 1.0 $g/m^2$, at least 5 g/m², at least 10 g/m², at least 40 g/m², at least 60 g/m², at least 80 g/m², at least 100 g/m², at least 200 g/m², at least 400 g/m², at least 600 g/m², at least 800 g/m², at least 1,000 g/m², at least 1,500 g/m², at least 2,000 g/m², and the like. In some embodiments, the specific surface area is between about 0.1 g/m² and 1 g/m², between about 1 g/m² and 1,000 g/m², between about 10 g/m² and 100 g/m², between about 600 g/m² and 2,000 g/m², between about 10 g/m² and 1,000 g/m², between about 100 g/m² and 600 g/m², between about 300 g/m² and 500 g/m², and the like.

In some instances, methods disclosed herein (e.g., including using a high loading of uniformly distributed precursor) reduce the number and size of pores. Porosity is also called "void fraction" and is a measure of the void spaces in a material. In some embodiments, porosity is a fraction of the volume of voids over the total volume and is reported as a percentage between 0% and 100%. In various embodiments, the porosity depends on many factors including loading and distribution of precursor in the fluid stock, calcination conditions, and the like.

Methods for measuring or estimating porosity include microscopy. Methods also include first measuring the surface area of a sample of nanofibers by any direct or indirect method, then comparing the measured surface area with the surface area of an idealized cylinder having the average length and diameter of the nanofibers in the sample. In some embodiments, the difference between the measured and expected surface area is converted to a volume, then to a volume fraction by assuming that the pores are in the shape of spheres or cylinders having an average diameter. In some embodiments, the porosity is measured by immersing the nanofibers in a fluid that penetrates the pores. In such an embodiment, the porosity is estimated by comparing the total volume of nanofiber plus fluid with the volume that would be obtained from immersing a collection of idealized non-porous cylinders having the diameter and length of the nanofibers. The void volume is the difference between these volumes, which is converted to porosity by dividing the void volume by the volume of the idealized cylinders.

The nanofibers have any suitable porosity. In some embodiments, the porosity is about 1%, about 2%, about 4%, about 6%, about 8%, about 10%, about 15%, about 20%, about 25%, about 30%, about 40%, about 50%, about 60%, about 70% and the like. In some embodiments, the porosity is at most 1%, at most 2%, at most 4%, at most 6%, at most 8%, at most 10%, at most 15%, at most 20%, at most 25%, at most 30%, at most 40%, at most 50%, at most 60%, at most 70% and the like. In some embodiments, the porosity is at least 1%, at least 2%, at least 4%, at least 6%, at least 8%, at least 10%, at least 15%, at least 20%, at least 25%, at least 30%, at least 40%, at least 50%, at least 60%, at least 70% and the like. In some embodiments, the porosity is between about 1% and 10%, between about 10% and 50%, between about 20% and 30%, between about 30% and 70%, between about 1% and 50%, between about 5% and 20%, and the like.

In some embodiments, applications of the nanofibers described herein benefit from nanofibers having a high conductivity. In some instances, a high electrical conductivity is desirable in energy generation applications that involve moving electrons through the nanofiber (e.g., as an electrode of a battery). In some embodiments, nanofibers that are long and continuous with a reduced number or size of defects have a higher conductivity.

In various embodiments, conductivity means either "thermally conductivity", "electrically conductivity", or both thermally and electrically conductivity unless context clearly dictates otherwise. Electrical conductivity is a measure of a material's ability to conduct electric current. Electrical conductivity is measured in units of Siemens per length (e.g., S/cm). The reciprocal of conductivity is resistivity. Electrical resistivity is a measure of how strongly a material opposes the flow of electric current and is reported in units of ohm meter ($\Omega$m). In some instances, thermal conductivity is reported in units of watts per meter Kelvin (W/m/K). Thermal resistivity is the reciprocal thereof. Inspection of the units indicates whether the value is electrical or thermal conductivity.

In one aspect, the nanofiber has a conductivity (e.g., electrical or thermal) which is compared to a thin sheet of the material from which the nanofiber is made. For example, a copper nanofiber is compared with a thin sheet of copper. The nanofibers have any suitable conductivity as a percentage of the conductivity of the material is formed into a sheet. In some embodiments, the conductivity is variable over different portions of a collection of nanofibers, or along different directions. In various embodiments, conductivity is reported as either an average value, or a value specific to a certain condition or direction of measurement (i.e., for anisotropic materials).

In some embodiments, the nanofiber has a conductivity of about 5%, about 10%, about 20%, about 30%, about 40%, about 50%, about 60%, about 70%, about 80%, about 90%, about 95%, or about 100% when compared with the conductivity of the material when formed into a sheet. In some embodiments, the nanofiber has a conductivity of at least about 5%, at least about 10%, at least about 20%, at least about 30%, at least about 40%, at least about 50%, at least about 60%, at least about 70%, at least about 80%, at least about 90%, at least about 95%, or at least about 100% when compared with the conductivity of the material when formed into a sheet. In some embodiments, the nanofiber has a conductivity of at most about 5%, at most about 10%, at most about 20%, at most about 30%, at most about 40%, at most about 50%, at most about 60%, at most about 70%, at most about 80%, at most about 90%, at most about 95%, or at most about 100% when compared with the conductivity of the material when formed into a sheet. In some embodiments, the nanofiber has a conductivity of between about 5% and 10%, between about 10% and 20%, between about 20% and 30%, between about 30% and 40%, between about 40% and 50%, between about 50% and 60%, between about 60% and 70%, between about 70% and 80%, between about 80% and 90%, between about 90% and 95%, between about 95% and 100%, when compared with the conductivity of the material when formed into a sheet.

In some instances, conductivity is reported without reference to the conductivity of the material when formed into a sheet. For example in some embodiments, electrical conductivity is reported on an absolute, rather than relative basis. Electrical conductivity is measured by any suitable method known to those skilled in the art. For example in some embodiments, conductivity is measured by first measuring the resistance and calculating the reciprocal. In one instance, one hooks up a sample of nanofibers to be tested to a voltage source and measures the current going through the sample and the voltage across the sample. In some instances, the resistance is calculated from Ohm's law (i.e., R=E/I where R is resistance in ohms, E is voltage in volts and I is current in amperes). Once one has resistance, one can calculate resistivity. Resistivity is a factor, which when multiplied by the length of the sample and divided by its cross-sectional area, yields the resistance. Conductivity is the reciprocal of the resistivity.

The nanofibers have any suitable electrical conductivity. In various embodiments, electrical conductivity is measured as an average value, at a specific condition, or along a specific direction of the nanofiber sample. In some embodiments, the conductivity is about 1 S/cm, about 10 S/cm, about 100 S/cm, about $10^3$ S/cm, about $10^4$ S/cm, about $10^5$ S/cm, about $10^6$ S/cm, about $10^7$ S/cm, about $10^8$ S/cm, and the like. In some embodiments, the conductivity is at least 1 S/cm, at least 10 S/cm, at least 100 S/cm, at least $10^3$ S/cm, at least $10^4$ S/cm, at least $10^5$ S/cm, at least $10^6$ S/cm, at least $10^7$ S/cm, at least $10^8$ S/cm, and the like. In some embodiments, the conductivity is at most 1 S/cm, at most 10 S/cm, at most 100 S/cm, at most $10^3$ S/cm, at most $10^4$ S/cm, at most $10^5$ S/cm, at most $10^6$ S/cm, at most $10^7$ S/cm, at most $10^8$ S/cm, and the like. In some embodiments, the conductivity is between about 1 S/cm and 10 S/cm, between about 10 S/cm and 100 S/cm, between about 100 S/cm and 1,000 S/cm, between about 1,000 S/cm and $10^4$ S/cm, between about $10^4$ S/cm and $10^5$ S/cm, between about $10^5$ S/cm and $10^6$ S/cm, between about $10^6$ S/cm and $10^7$ S/cm, between about $10^7$ S/cm and $10^8$ S/cm, between about $10^5$ S/cm and $10^8$ S/cm, and the like.

In some embodiments, the nanofibers or collections of nanofibers of the present disclosure are flexible. In some instances, flexible nanofibers are advantageous in applications such as in the manufacture of flexible solar panels. In some instances, flexibility is quantified by the Young's modulus, which is the slope of the initial linear portion of a stress-strain curve. The Young's modulus has units of pressure, such as mega Pascals (MPa). In some embodiments, flexibility is different along different directions of the material, so may be reported with respect to a certain direction, or is reported as an average value.

In one aspect, the flexibility is at least partially determined by the calcination temperature. In one example, when the calcination temperature is about 200° C. the Young's modulus is at least 100 MPa. In some instances, lower calcination temperatures lead to a significantly higher fraction of amorphous metal or ceramic in the nanofiber, which results in higher flexibility.

The nanofibers have any suitable flexibility. In some embodiments, the nanofiber has a Young's modulus of about 10 MPa, about 20 MPa, about 40 MPa, about 60 MPa, about 80 MPa, about 100 MPa, about 150 MPa, about 200 MPa, about 250 MPa, about 300 MPa, about 400 MPa, about 1,000 MPa, and the like. In some embodiments, the nanofiber has a Young's modulus of at least about 10 MPa, at least about 20 MPa, at least about 40 MPa, at least about 60 MPa, at least about 80 MPa, at least about 100 MPa, at least about 150 MPa, at least about 200 MPa, at least about 250 MPa, at least about 300 MPa, at least about 400 MPa, at least about 1,000 MPa, and the like.

Nanofiber Mats

In some embodiments, the nanofibers described herein are collected or formed into any suitable structure (e.g., suitable for the desired application). Structures include, but are not limited to spheres, cones, cylinders, slabs, helixes, polygons, and the like. For simplicity of terminology, all possible shapes or assemblage of nanofibers are herein referred to as a "mat". In various embodiments, nanofiber mats comprise nanofibers of a single type, or nanofibers of at least two types.

In some embodiments, coherent nanofibers lead to a mat having desirable properties (e.g., a less brittle nanofiber mat). In some instances, these desirable properties emerge from the properties of the component nanofibers and/or depend on the method in which the nanofibers are formed into the mat. In some embodiments, the present disclosure includes the nanofiber mats. In one aspect, described herein are nanofiber mats formed by the nanofibers of the present disclosure. Also described herein are nanofiber mats prepared by any of the methods, or preparable by any of the methods in the present disclosure. In one aspect, described herein are methods for preparing nanofiber mats, optionally using an electrospinning process.

In some embodiments, nanofibers are collected in a given geometry as they are produced (e.g., by moving the collection plate relative to the spinnerets, i.e., 3-D printing). In various embodiments, nanofibers are formed into a given geometry after collection (optionally before calcination), or formed into a given geometry after calcination. In some instances, the nanofiber mat comprises nanofibers arranged in a controlled manner (e.g., on a mesh with a perpendicular lattice). In some embodiments, the nanofibers are arranged randomly. In various embodiments, the mats are patterned in any level of detail including different fibers of different types, laid in different directions, in contact with various other nanofibers or insulated from various other nanofibers, and the like. In some embodiments, the nanofibers are cross-linked and/or surface modified.

In some nanofiber mats, the nanofiber surface proves a high surface area for mass transfer of a chemical product. These nanofibers are particularly applicable as catalysts for example. In some embodiments, the nanofiber surface proves a high surface area for mass transfer of a protons or electrons in the nanofiber mat. These nanofibers are particularly applicable as electrodes for example.

Properties of Nanofiber Mats

In some instances, the nanofiber mat has substantially the same properties as the nanofibers from which it is comprised. For example, a similar porosity, similar specific surface area, similar specific conductivity, and the like. In some instances, the nanofiber mat has different properties from the nanofibers from which it is comprised. For example, a different porosity, different specific surface area, different conductivity, and the like. In various embodiments, the property of the mat is either greater than or less than the property of an individual nanofiber.

In some embodiments, the nanofiber mat is "isotropic" or has isotropic properties (e.g., meaning that the nanofiber mat has the same or substantially similar properties in all orientations and along all directions of the material). In some embodiments, the mat is "anisotropic" (e.g., meaning that it has different properties in various orientations or along different directions of the material). In some embodiments, anisotropic properties are created by controlling the orientation of the nanofibers in the mat. For example, in one embodiment where nanofiber direction was uniformly controlled, there was an approximately 100 fold difference in electric conductivity of copper nanofibers between the axial direction (direction of the nanofiber) and the perpendicular direction.

In embodiments where the mat is anisotropic, a given property differs in a second orientation or direction compared to a first orientation or direction by about 5%, about 10%, about 15%, about 20%, about 30%, about 40%, about 50%, about 60%, about 80%, about 100%, about 150%, about 200%, about 300%, about 400%, about 500%, and the like. In some embodiments, a given property is about 10 times, about 20 times, about 50 times, about 100 times, about 200 times, about 500 times, about 1,000 times, about 10,000 times, and the like higher in a second direction or orientation than in a first direction or orientation.

In some embodiments, a given property differs in a second orientation or direction compared to a first orientation or direction by at least about 5%, at least about 10%, at least about 15%, at least about 20%, at least about 30%, at least about 40%, at least about 50%, at least about 60%, at least about 80%, at least about 100%, at least about 150%, at least about 200%, at least about 300%, at least about 400%, at least about 500%, and the like. In some embodiments, a given property is at least about 10 times, at least about 20 times, at least about 50 times, at least about 100 times, at least about 200 times, at least about 500 times, at least about 1,000 times, at least about 10,000 times, and the like higher in a second direction or orientation than in a first direction or orientation.

In some embodiments, a given property differs in a second orientation or direction compared to a first orientation or direction by at most about 5%, at most about 10%, at most about 15%, at most about 20%, at most about 30%, at most about 40%, at most about 50%, at most about 60%, at most about 80%, at most about 100%, at most about 150%, at most about 200%, at most about 300%, at most about 400%, at most about 500%, and the like. In some embodiments, a given property is at most about 10 times, at most about 20 times, at most about 50 times, at most about 100 times, at most about 200 times, at most about 500 times, at most about 1,000 times, at most about 10,000 times, and the like higher in a second direction or orientation than in a first direction or orientation.

In some embodiments, the mat has a conductivity in a first direction and a conductivity in a second direction, wherein the conductivity in the first direction is at least one hundred times higher than in the second direction. In some embodiments, the mat has a conductivity of at least 1.0 S/cm in either the first or second direction.

In some instances, the porosity of the nanofiber mat is a consideration, for example in filtration applications. For example, in order to remove particles of a certain diameter, it is desirable to have a mat with pores smaller than the diameter of the smallest particle to be removed in some instances.

In some embodiments, the porosity of the nanofiber mat is greater than the porosity of the nanofibers that comprise the mat. In some embodiments, the porosity of the mat is the combination of the spaces between the nanofiber strands and the pores within the nanofibers themselves. In some instances, microscopy is used to estimate porosity. In some instances, the porosity of a nanofiber mat having a first volume defined by its external surface is measured by submersing the nanofiber mat in a fluid having a second volume. The volume of the fluid plus submersed nanofiber mat defines a third volume. A fourth volume is obtained by subtracting the second volume from the third volume. The porosity is one minus the ratio of the fourth volume to the first volume. In some embodiments, porosity is expressed as a percentage.

The nanofiber mat has any suitable porosity. In some embodiments, the porosity is about 1%, about 2%, about 4%, about 6%, about 8%, about 10%, about 15%, about 20%, about 25%, about 30%, about 40%, about 50%, about 60%, about 70% and the like. In some embodiments, the porosity is at most 1%, at most 2%, at most 4%, at most 6%, at most 8%, at most 10%, at most 15%, at most 20%, at most 25%, at most 30%, at most 40%, at most 50%, at most 60%, at most 70% and the like. In some embodiments, the porosity is at least 1%, at least 2%, at least 4%, at least 6%, at least 8%, at least 10%, at least 15%, at least 20%, at least 25%, at least 30%, at least 40%, at least 50%, at least 60%, at least 70% and the like. In some embodiments, the porosity is between about 1% and 10%, between about 10% and 50%, between about 20% and 30%, between about 30% and 70%, between about 1% and 50%, between about 5% and 20%, and the like.

In some instances, porosity has units of length. The porous length is the distance between a point on a nanofiber strand and the nearest point on another nanofiber strand. In some instances, objects having a dimension longer than this porous length will not generally be able to pass through the mat. In some instances, the porous length is measured by bombarding the nanofiber mat with particles of a plurality of diameters until the particles of a certain size pass through the nanofiber mat, indicating that the nanofiber mat has a porous length approximately equal to the diameter of said particles.

The pores of the nanofiber mat have any suitable size. In some embodiments, the pores are about 0.1 microns, about 0.2 microns, about 0.5 microns, about 0.7 microns, about 1 microns, about 2 microns, about 4 microns, about 6 microns, about 8 microns, about 10 microns, about 15 microns, about 20 microns, about 30 microns, about 40 microns, about 50 microns, about 70 microns, about 100 microns, about 200 microns, and the like on their longest dimension. In some embodiments, the pores are at most about 0.1 microns, at most about 0.2 microns, at most about 0.5 microns, at most about 0.7 microns, at most about 1 microns, at most about 2 microns, at most about 4 microns, at most about 6 microns, at most about 8 microns, at most about 10 microns, at most about 15 microns, at most about 20 microns, at most about 30 microns, at most about 40 microns, at most about 50 microns, at most about 70 microns, at most about 100 microns, at most about 200 microns, and the like on their longest dimension. In other embodiments, the pores are at least about 0.1 microns, at least about 0.2 microns, at least about 0.5 microns, at least about 0.7 microns, at least about 1 microns, at least about 2 microns, at least about 4 microns, at least about 6 microns, at least about 8 microns, at least about 10 microns, at least about 15 microns, at least about 20 microns, at least about 30 microns, at least about 40 microns, at least about 50 microns, at least about 70 microns, at least about 100 microns, at least about 200 microns, and the like on their longest dimension. In some embodiments, the pores are between about 0.5 microns and 50 microns, between about 1 microns and 10 microns, between about 10 microns and 50 microns, between about 0.1 microns and 5 microns, between about 2 microns and 10 microns, between about 40 microns and 100 microns, and the like on their longest dimension.

In some instances, the density of the nanofiber mat is another characteristic to consider in certain applications. In some instances, the concentration of the polymer in the fluid stock has an impact on the density of the mat (e.g., potentially with decreased amounts of polymer leading to a denser mat, e.g., because fewer voids are left when the polymer is removed in calcination). In one example, the density of the mat was at least about 1 $g/m^3$ where the polymer was less than about 30% in the fluid stock.

The nanofiber mat has any suitable density. In some embodiments, the mat has a density of about 0.1 $g/m^3$, about 0.5 $g/m^3$, about 1 $g/m^3$, about 2 $g/m^3$, about 4 $g/m^3$, about 8 $g/m^3$, about 10 $g/m^3$, about 50 $g/m^3$, about 100 $g/m^3$, about 200 $g/m^3$, and the like. In some embodiments, the mat has a density of at least about 0.1 $g/m^3$, at least about 0.5 $g/m^3$, at least about 1 $g/m^3$, at least about 2 $g/m^3$, at least about 4 $g/m^3$, at least about 8 $g/m^3$, at least about 10 $g/m^3$, at least about 50 $g/m^3$, at least about 100 $g/m^3$, at least about 200 $g/m^3$, and the like. In some embodiments, the mat has a density of at most about 0.1 $g/m^3$, at most about 0.5 $g/m^3$, at most about 1 $g/m^3$, at most about 2 $g/m^3$, at most about 4 $g/m^3$, at most about 8 $g/m^3$, at most about 10 $g/m^3$, at most about 50 $g/m^3$, at most about 100 $g/m^3$, at most about 200 $g/m^3$, and the like. In some embodiments, the mat has a density of between about 0.1 $g/m^3$ and 0.5 $g/m^3$, between about 0.5 $g/m^3$ and 3 $g/m^3$, between about 1 $g/m^3$ and 10 $g/m^3$, between about 10 $g/m^3$ and 50 $g/m^3$, and the like.

The mat has any suitable number of strands per area or volume. In some instances, microscopy is used to determine the number of strands per area or volume. In some embodiments, the mat comprises about 5 strands, about 10 strands, about 50 strands, about 100 strands, about 150 strands, about 250 strands, about 500 strands, about 1,000 strands, about 5,000 strands, about 50,000 strands, and the like per square millimeter or per cubic millimeter. In some embodiments, the mat comprises at least about 5 strands, at least about 10 strands, at least about 50 strands, about 100 strands, at least about 150 strands, at least about 250 strands, at least about 500 strands, at least about 1,000 strands, at least about 5,000 strands, at least about 50,000 strands, and the like per square millimeter or per cubic millimeter. In some embodiments, the mat comprises between about 5 strands to 50 strands, between about 50 strands to 500 strands, between about 500 strands to 5,000 strands, between about 5,000 strands to 50,000 strands, and the like per square millimeter or per cubic millimeter.

Figure 38:
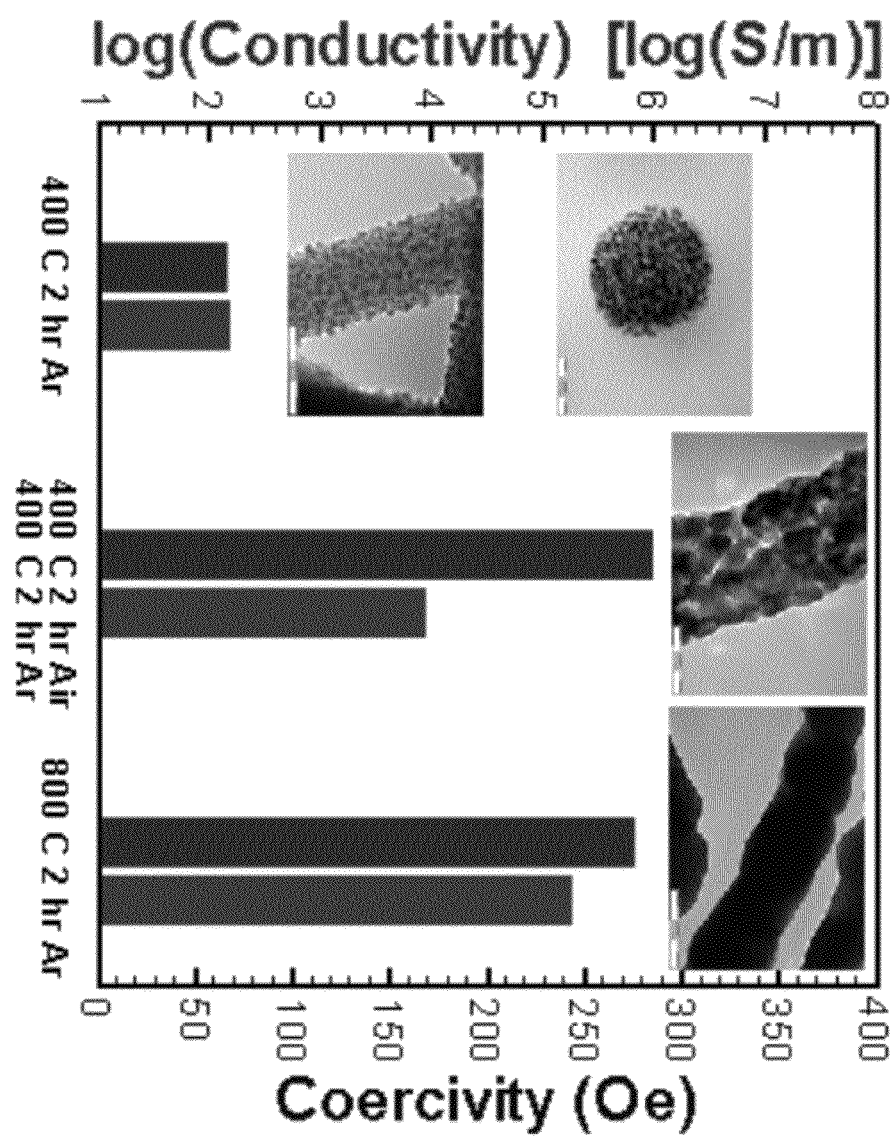
FIG. 38 shows a graphic comparing the effect of calcination conditions on electrical conductivity and magnetic coercivity of Ni nanofibers.

In some instances, the sizes of the crystal domains in the nanofiber have an effect on properties of the nanofiber or nanofiber mat (e.g., including magnetic strength and electrical conductivity). In some instances, calcination conditions have an effect on crystallization domains. In some embodiments, one may control the properties of the nanofiber or nanofiber mat by controlling the calcination conditions. In one example, FIG. 38 shows that by tuning calcination conditions with Ni nanofibers, a 5-fold difference in magnetic strength was obtained and a 10,000 fold difference in electric conductivity was obtained. Described herein are nanofibers or nanofiber mats having crystal domains of a certain size. The present disclosure also encompasses nanofibers or nanofiber mats with tunable properties and methods for tuning the properties of nanofiber or nanofiber mats (e.g., including magnetic or conductivity properties).

In some embodiments, there are a plurality of crystal domains in the nanofiber. In some embodiments, the domains are metal oxide domains. In various embodiments, these domains have various sizes, for example about 5 nm, about 10 nm, about 15 nm, about 20 nm, about 25 nm, about 30 nm, about 40 nm, about 50 nm, about 70 nm, about 90 nm, and the like. In some embodiments, the domains are at least about 5 nm, at least about 10 nm, at least about 15 nm, at least about 20 nm, at least about 25 nm, at least about 30 nm, at least about 40 nm, at least about 50 nm, at least about 70 nm, at least about 90 nm, and the like in size. In some embodiments, the domains are at most about 5 nm, at most about 10 nm, at most about 15 nm, at most about 20 nm, at most about 25 nm, at most about 30 nm, at most about 40 nm, at most about 50 nm, at most about 70 nm, at most about 90 nm, and the like in size. In some embodiments, the domains have a size between about 5 nm and 100 nm, between about 20 nm and 30 nm, between about 5 nm and 20 nm, between about 30 nm and 90 nm, between about 40 nm and 70 nm, between about 15 nm and 40 nm, and the like.

In one aspect, the nanofiber and/or nanofiber mat is magnetic. The coercivity (also called the coercive field or coercive force) of a ferromagnetic material is the intensity of the applied magnetic field required to reduce the magnetization of that material to zero after the magnetization of the sample has been driven to saturation. Coercivity is usually measured in oersted (Oe) or ampere/meter units.

In some embodiments, the nanofiber mat has any suitable magnetic coercivity. In some embodiments, the nanofiber mat has a magnetic coercivity of about 10 Oe, about 20 Oe, about 40 Oe, about 60 Oe, about 80 Oe, about 100 Oe, about 125 Oe, about 150 Oe, about 175 Oe, about 200 Oe, about 250 Oe, about 300 Oe, about 350 Oe, about 400 Oe, about 500 Oe, about 1,000 Oe, and the like. In some embodiments, the nanofiber mat has a magnetic coercivity of at least about 10 Oe, at least about 20 Oe, at least about 40 Oe, at least about 60 Oe, at least about 80 Oe, at least about 100 Oe, at least about 125 Oe, at least about 150 Oe, at least about 175 Oe, at least about 200 Oe, at least about 250 Oe, at least about 300 Oe, at least about 350 Oe, at least about 400 Oe, at least about 500 Oe, at least about 1,000 Oe, and the like. In some embodiments, the nanofiber mat has a magnetic coercivity of at most about 10 Oe, at most about 20 Oe, at most about 40 Oe, at most about 60 Oe, at most about 80 Oe, at most about 100 Oe, at most about 125 Oe, at most about 150 Oe, at most about 175 Oe, at most about 200 Oe, at most about 250 Oe, at most about 300 Oe, at most about 350 Oe, at most about 400 Oe, at most about 500 Oe, at most about 1,000 Oe, and the like. In some embodiments, the nanofiber mat has a magnetic coercivity of between about 50 Oe and 200 Oe, between about 100 Oe and 300 Oe, between about 200 Oe and 500 Oe, between about 300 Oe and 1,000 Oe, between about 10 Oe and 100 Oe, between about 175 Oe and 300 Oe, between about 200 Oe and 250 Oe, and the like.

In one aspect, the nanofiber and/or nanofiber mat is paramagnetic or superparamagnetic. Paramagnetism is a form of magnetism that occurs in the presence of an externally applied magnetic field. Superparamagnetism is a form of magnetism which appears in small ferromagnetic or ferrimagnetic nanoparticles or nanofibers. In some instances (e.g., for sufficiently small nanoparticles or nanofibers), magnetization randomly flips direction under the influence of temperature. The time between two flips is called the Ned relaxation time. In the absence of external magnetic field, when the time used to measure the magnetization of the nanoparticles is much longer than the Ned relaxation time, their magnetization appears to be on average zero. That is, they are said to be in the superparamagnetic state. In this state, an external magnetic field is able to magnetize the nanoparticles or nanofibers, similarly to a paramagnet.

System

In some embodiments, a number of components of a system interact to produce nanofibers. Without limitation, these include an electrospinning apparatus and a module for collecting the electrospun fluid stock or nanofiber. These two components are related by a voltage difference such that the thin jet of fluid stock emanating from the electrospinner is attracted to and deposits on the collection module. In some embodiments, the electrospinning component of the system is a gas-assisted electrospinner. The gas used to accelerate the jet of fluid stock is optionally air.

In some embodiments, the system also includes a fluid stock. Among other things, the fluid stock interacts with the electrospinner to produce a nanofiber. In some embodiments, the fluid stock has an elongational viscosity that allows for a jet of fluid stock to erupt from a charged droplet. In some embodiments, the fluid stock is a system of polymer and precursor that interact with each other to at least in part determine the spinnability of the fluid stock and the properties of the nanofiber.

In some embodiments, the system also includes an apparatus for calcinating the nanofiber (e.g., a heater or a gas chamber). In some instances, the gas is part of the system, wherein the gas is optionally air, hydrogen, nitrogen, an inert gas, and the like.

Electrochemical Devices

Figure 40:
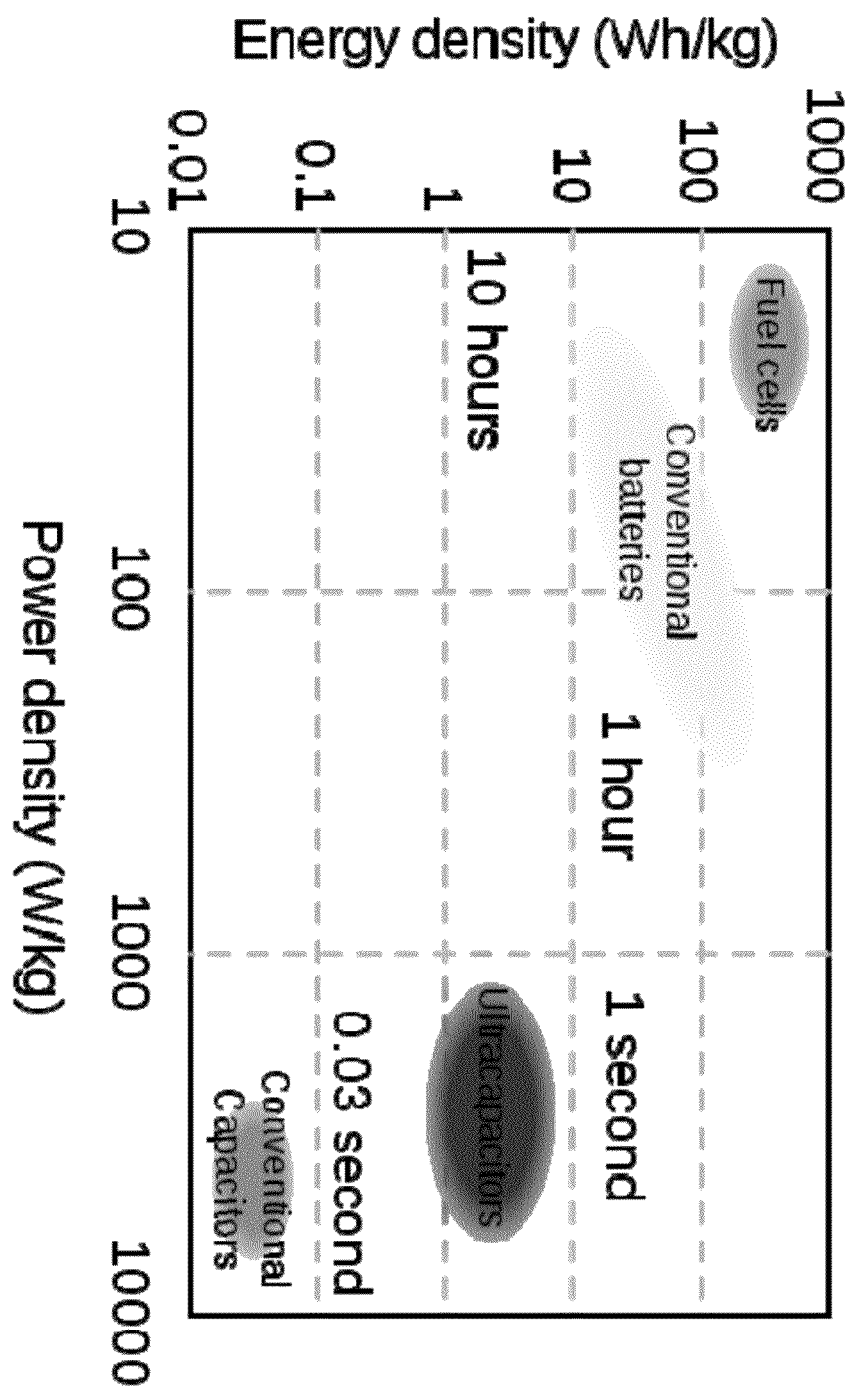
FIG. 40 shows a Ragone plot depicting energy densities and power densities typical of electrochemical devices.

Electrochemical devices include fuel cells, batteries, capacitors and ultra-capacitors, among others. In some instances, solar cells are electrochemical devices. In some instances, other electrochemical devices do not fit within the categories listed herein. In various embodiments, electrochemical devices have a wide range of energy densities and power densities that are summarized graphically on a Ragone chart (FIG. 40). Energy density is reported in units of watthours per kilogram (W·h/kg) or equivalents and is a measure of the amount of useful energy stored in a given size device (by mass or volume). Power density is reported in units of watts per kilogram (W/kg) or equivalents and is a measure of how quickly energy can be utilized. In some instances, fuel cells have a high energy density, but a low power density. In some instances, capacitors have a high power density but a low energy density. In some instances, batteries and ultracapacitors have energy densities and power densities between capacitors and fuel cells.

In one aspect, described herein are uses of nanofibers in electrochemical devices. For example, they are used as electrodes in fuel cells or batteries (e.g., where they may have beneficial properties such as a high conductivity and surface area). In some embodiments, they are utilized as the dielectric layer in an ultracapacitor. In various aspects, the present disclosure includes an electrochemical device that includes the nanofibers described herein, includes an electrochemical device that includes a nanofiber produced by the methods described herein, and includes an electrochemical device that includes a nanofiber produced by the system described herein. In some aspects, the disclosure also includes methods for making and methods for using electrochemical devices that comprise nanofibers.

In some embodiments, devices are built that comprise the nanofibers described herein. In some embodiments, such a device is created by substituting a component of the device with nanofibers (e.g., thus improving the function of the device), but substantially preserving the overall architecture and design of the device. In some embodiments, the architecture and overall design of the device comprising nanofibers is markedly different than a fuel cell, battery, ultracapacitor and the like.

In some instances, it is desirable to have or make an electrochemical device with both high energy density and high power density, for example to energize an electric vehicle that has both a long driving range (i.e., energy density) and can be charged and accelerate quickly (i.e., high power density). The electrochemical device has any suitable energy and power density. In some embodiments where the power density is at least about 100 W/kg, the energy density is at least about 10 W·h/kg, at least about 50 W·h/kg, at least about 100 W·h/kg, at least about 500 W·h/kg, at least about 1,000 W·h/kg, at least about 5,000 W·h/kg, and the like. In some embodiments where the power density is at least about 500 W/kg, the energy density is at least about 10 W·h/kg, at least about 50 W·h/kg, at least about 100 W·h/kg, at least about 500 W·h/kg, at least about 1,000 W·h/kg, at least about 5,000 W·h/kg, and the like. In some embodiments where the power density is at least about 1,000 W/kg, the energy density is at least about 10 W·h/kg, at least about 50 W·h/kg, at least about 100 W·h/kg, at least about 500 W·h/kg, at least about 1,000 W·h/kg, at least about 5,000 W·h/kg, and the like. In some embodiments where the power density is at least about 5,000 W/kg, the energy density is at least about 10 W·h/kg, at least about 50 W·h/kg, at least about 100 W·h/kg, at least about 500 W·h/kg, at least about 1,000 W·h/kg, at least about 5,000 W·h/kg, and the like. In some embodiments where the power density is at least about 10,000 W/kg, the energy density is at least about 10 W·h/kg, at least about 50 W·h/kg, at least about 100 W·h/kg, at least about 500 W·h/kg, at least about 1,000 W·h/kg, at least about 5,000 W·h/kg, and the like.

Fuel Cells

A fuel cell is an electrochemical cell that converts chemical energy into electrical energy. In some instances, electricity is generated from the reaction between a fuel supply and an oxidizing agent. In some embodiments, the reactants flow into the cell, and the reaction products flow out of it, while the electrolyte remains within it. In some embodiments, fuel cells are different from electrochemical cell batteries in that they consume a reactant from an external source (i.e., which is replenished).

In some embodiments, fuel cells are made up of three segments which are sandwiched together: the anode, the electrolyte, and the cathode. In some embodiments, two chemical reactions occur at the interfaces of the three different segments. In some embodiments, the net result of the two reactions is that fuel is consumed, water or carbon dioxide is created, and an electric current is created (e.g., which can be used to power electrical devices, normally referred to as the load). Many combinations of fuels and oxidants are possible. In some embodiments, a hydrogen fuel cell uses hydrogen as its fuel and oxygen (e.g., from air) as its oxidant. Other possible fuels include hydrocarbons and alcohols. Other possible oxidants include chlorine and chlorine dioxide.

In some embodiments, at the anode a catalyst oxidizes the fuel, (e.g., hydrogen), turning the fuel into a positively charged ion and a negatively charged electron. In some embodiments, the electrolyte is a substance specifically designed so ions can pass through it, but the electrons do not. In some instances, the freed electrons travel through a wire creating the electric current. In some instances, the ions travel through the electrolyte to the cathode. In some embodiments, once reaching the cathode, the ions are reunited with the electrons and the two react with a third chemical, (e.g., oxygen), to create water or carbon dioxide.

In some embodiments, a fuel cell has higher energy conversion efficiency than other power sources (e.g., since it converts chemical energy directly into electricity). In some embodiments, fuel cells produce no pollution (e.g., when hydrogen is used as the fuel) or less pollution (e.g., when hydrocarbon is used as the fuel) compared to combustion. In some embodiments, fuel cells operate quietly, reducing noise pollution. In some embodiments, a fuel cell operates continuously and generates electricity as long as the fuel is supplied. In some instances, fuel cells are used in applications including portable electronic devices, automobiles, and stationary power generation.

In some proton exchange membrane fuel cells, the catalyst for hydrogen oxidation at the anode is carbon supported platinum. Despite its popular use, the Pt/C anode system exhibits certain drawbacks in some instances. First, the use of carbon generally leads to the corrosion of the electrode in some embodiments. Secondly, the platinum is an expensive catalyst. In some instances, the fuel cells described herein comprise electrodes based on nanofibers (e.g., avoiding the corrosion by carbon and reduce the expensive Pt loading). In one embodiment, the nanofibers comprise intermetallic Fe—Pt.

In one aspect, described herein is the use of nanofibers in fuel cells. For example, they are used as electrodes, optionally anodes or cathodes. In various aspects, described herein is a fuel cell that comprises a nanofiber described herein, a fuel cell that comprises a nanofiber produced by the methods described herein, and includes a fuel cell that comprises a nanofiber produced by the system described herein. In one aspect, described herein are methods for making and methods for using fuel cells that comprise nanofibers.

In various embodiments, the nanofiber comprises any suitable material including, but not limited to iron (Fe), platinum (Pt), or any mixture thereof. In some embodiments, the nanofiber is a pure metal nanofiber or a metal alloy nanofiber, including any hybrid or hollow geometry. In some embodiments, the atoms have a certain arrangement (e.g., including a face-centered tetragonal structure). In various embodiments, the ratio of Fe to Pt atoms in the nanofiber of the fuel cell is about 1 Fe to 5 Pt, or about 4 Fe to 5 Pt for example. In some embodiments, the Fe and Pt atoms are substantially evenly distributed amongst each other (i.e., the nanofiber does not comprise aggregates of Pt or Fe). In some embodiments, the creation of the face-centered tetragonal structure of Fe—Pt is pursued to enhance oxygen reduction and durability under the minimized Pt loading. In some instances, the optional face-centered tetragonal structure also provides connectivity of the Pt.

In some instances, a Pt/C fuel cell mixes Pt particles with C and forms an electrode by vapor deposition of the mixture. In certain embodiments, the nanofibers and electrodes described herein significantly reduce the cost of the fuel cell (e.g., by using less platinum). In some embodiments, a gas-assisted electrospinning procedure is a cheaper and faster process than vapor deposition.

In some embodiments, the fuel cell comprises an anode and the anode comprises nanofibers. In some embodiments, a reduced amount of platinum is preferred (e.g., because of cost). The anode has any suitable amount of platinum (including no platinum). In some embodiments, the anode has by mass percentage about 5% Pt, about 10% Pt, about 15% Pt, about 20% Pt, about 25% Pt, about 30% Pt, about 40% Pt, about 50% Pt, about 70% Pt, and the like. In some embodiments, the anode has by mass percentage at most about 5% Pt, at most about 10% Pt, at most about 15% Pt, at most about 20% Pt, at most about 25% Pt, at most about 30% Pt, at most about 40% Pt, at most about 50% Pt, at most about 70% Pt, and the like. In some embodiments, the fuel cell has at least 10 fold less or at least 30 fold less Pt than a traditional Pt/C fuel cell. In some embodiments, the amount of corrosion of the cathode is reduced compared with a traditional Pt/C fuel cell. In certain embodiments, the nanofibers described herein reduce or substantially eliminate corrosion in the fuel cell. In some embodiments, reduced corrosion (e.g., upon start-up or shut-down), improves the performance of the fuel cell. In one aspect, the fuel cells described herein consist of substantially no carbon. In one aspect, the fuel cells described herein consist of substantially no carbon in the anode.

In some embodiments, the fuel cells described herein have a high current density. The current density is any suitable value. In some embodiments, the current density is about $-0.01$ mA/cm$^2$, about $-0.02$ mA/cm$^2$, about $-0.04$ mA/cm$^2$, about $-0.06$ mA/cm$^2$, about $-0.08$ mA/cm$^2$, about $-0.1$ mA/cm$^2$, about $-0.3$ mA/cm$^2$, and the like. In some embodiments, the current density is at least about $-0.01$ mA/cm$^2$, at least about $-0.02$ mA/cm$^2$, at least about $-0.04$ mA/cm$^2$, at least about $-0.06$ mA/cm$^2$, at least about $-0.08$ mA/cm$^2$, at least about $-0.1$ mA/cm$^2$, at least about $-0.3$ mA/cm$^2$, and the like. In some embodiments, the current density is about 4 times higher than a traditional Pt/C fuel cell.

In some embodiments, the fuel cell has increased reaction stability. In some instances, reaction stability is reported as the number of CV cycles. Cyclic voltammetry or CV is a type of potentiodynmic electrochemical measurement. In some cyclic voltammetry experiments, the working electrode potential is ramped linearly versus time (e.g., like linear sweep voltammetry). In some instances, cyclic voltammetry takes the experiment a step further than linear sweep voltammetry (which ends when it reaches a set potential). When cyclic voltammetry reaches a set potential, the working electrode's potential ramp is inverted. In some embodiments, this inversion happens multiple times during a single experiment. In some embodiments, the current at the working electrode is plotted versus the applied voltage to give the cyclic voltammogram trace. In some instances, cyclic voltammetry is used to study the electrochemical properties of an analyte in solution. In some embodiments, the fuel cells described herein have about 1.5× more, about 2× more, about 3× more, about 4× more, about 5× more, about 10× more, and the like CV cycles than a traditional Pt/C fuel cell.

In one aspect, the fuel cell is significantly thinner than a traditional Pt/C fuel cell. In some instances, reduced thickness allows packing of more fuel cells into a given volume, increasing overall performance and/or reducing cost. The fuel cells have any suitable thickness. In some embodiments, the fuel cell has a thickness of about 0.2 mm, about 0.5 mm, about 0.7 mm, about 1 mm, about 1.5 mm, about 2 mm, about 5 mm, and the like when measured along its shortest dimension. In some embodiments, the fuel cell has a thickness of at most about 0.2 mm, at most about 0.5 mm, at most about 0.7 mm, at most about 1 mm, at most about 1.5 mm, at most about 2 mm, at most about 5 mm, and the like when measured along its shortest dimension.

Batteries

In some instances, a battery is composed of electrochemical cells that are connected in series and/or in parallel to provide the required voltage and capacity. In some instances, each cell consists of a positive and a negative electrode (both sources of chemical reactions) separated by an electrolyte solution, which enables ion transfer between the two electrodes. Once these electrodes are connected externally, chemical reactions proceed in tandem at both electrodes (i.e., thereby liberating electrons and enabling the current to be used). In some instances, the amount of electrical energy (typically expressed per unit of weight, e.g., W·h/kg or mW·h/g) that a battery is able to deliver is a function of the cell potential (V) and capacity (A·h/kg), which is linked directly to the chemistry of the system.

In one aspect, described herein are batteries comprising nanofibers. For example, the nanofibers are used in electrodes, optionally anodes or cathodes. In one aspect, described herein is a battery that includes a nanofiber as described herein, includes a battery that includes a nanofiber produced by the methods described herein, and includes a battery that includes a nanofiber produced by the system described herein. In some aspects, the described herein are methods for making and methods for using batteries that include nanofibers.

The present disclosure encompasses all types of batteries. In some embodiments, the battery is a rechargeable lithium battery. In various embodiments, the nanofiber, the anode, and the cathode are any suitable material. In embodiments of rechargeable lithium batteries for example, silicon or germanium are used as anode material (e.g., because these materials have a low discharge potential and high theoretical charge capacity (about 4,200 mA·h/g, and 1,600 mA·h/g respectively) compared to that of graphitic carbon (373 mA·h/g)). In one embodiment, the nanofiber is a Si or Ge nanofiber. In some embodiments, the anode includes Si or Ge nanofibers.

In some instances, silicon anodes have limited applications because silicon's volume changes upon insertion and extraction of lithium, which results in pulverization and capacity fading. In some instances, hollow nanofibers can accommodate volume changes without pulverization. In some embodiments, the nanofibers described herein are hollow. In some embodiments, the batteries described herein comprise a hollow Si or Ge (or combination Si/Ge) nanofiber.

In some embodiments, hollow Si and/or Ge nanofibers are produced via water-based, multi-axial electrospinning. In various embodiments, the nanofibers comprise pure $SiO_2$, and their hybrids with $V_2O_5$, $ZrO_2$, $TiO_2$, Fe, Ni, and carbon with $Fe_3O_4$. In some embodiments, pure ceramic nanofibers such as $SiO_2$, $Al_2O_3$ and $ZrO_2$, etc. are produced via electrospinning of aqueous polymer solution containing their precursors, followed by thermal treatment.

Hollow Si or Ge nanofibers (e.g., for lithium-ion battery cathodes) are produced in any suitable manner. In one embodiment, mineral oil and aqueous polymer solution with Si or Ge precursor are coaxially electrospun as core and sheath layer, respectively, followed by the removal of mineral core to create a hollow structure. In one embodiment, gas-assisted coaxial electrospinning is employed (e.g., where an air stream is used as core) to create a hollow structure during the spinning (e.g., and to stretch the sheath layer jet of precursor solution for higher throughput).

Any suitable method of reduction is employed (e.g., following electrospinning of hollow Si or Ge precursor nanofibers). In some embodiments, thermal treatment and/or chemical reduction are applied to obtain pure hollow Si or Ge nanofibers. In some instances, the degree of volume expansion upon insertion and extraction of lithium in Li-ion battery applications is evaluated.

The nanofibers described herein have any suitable amount of volume expansion. In some embodiments, the volume expansion is about 100%, about 200%, about 300%, about 400%, about 600%, about 800%, and the like. In some embodiments, the volume expansion is at most about 100%, at most about 200%, at most about 300%, at most about 400%, at most about 600%, at most about 800%, and the like.

The batteries described herein have any suitable recharging efficiency. In some embodiments, the recharging efficiency is about 500 mAh/g, about 800 mAh/g, about 1,200 mAh/g, about 1,600 mAh/g, about 2,000 mAh/g, about 3,000 mAh/g, about 5,000 mAh/g, about 10,000 mAh/g, and the like. In some embodiments, the recharging efficiency is at least about 500 mAh/g, at least about 800 mAh/g, at least about 1,200 mAh/g, at least about 1,600 mAh/g, at least about 2,000 mAh/g, at least about 3,000 mAh/g, at least about 5,000 mAh/g, at least about 10,000 mAh/g, and the like.

Ultracapacitors

In a conventional capacitor, energy is generally stored by the removal of charge carriers, typically electrons, from one metal plate and depositing them on another. In some instances, this charge separation creates a potential between the two plates, which is harnessed in an external circuit. In some instances, the total energy stored increases with both the amount of charge stored and the potential between the plates. In some instances, the amount of charge stored per unit voltage is a function of the size, the distance, and the material properties of the plates and the material in between the plates (the dielectric), while the potential between the plates is limited by breakdown of the dielectric. In some instances, the dielectric controls the capacitor's voltage. In some instances, changing the dielectric material leads to higher energy density for a given size of capacitor. In one aspect, described herein is the use of nanofibers in capacitors. In various aspects, the present disclosure includes a capacitor that comprises the nanofibers described herein, includes a capacitor that includes a nanofiber produced by the methods described herein, and includes a capacitor that includes a nanofiber produced by the system described herein. In some aspects, the disclosure also includes methods for making and methods for using capacitors that include nanofibers.

An ultracapacitor, also known as an electric double-layer capacitor (EDLC), a supercapacitor, supercondenser, pseudocapacitor, or electrochemical double layer capacitor, is an electrochemical capacitor with relatively high energy density. In some instances, the energy density is on the order of hundreds of times greater compared to conventional electrolytic capacitors. In some instances, ultra-capacitors have a higher power density in comparison with batteries or fuel cells.

In some instances, ultra-capacitors do not have a conventional dielectric. In some instances, ultra-capacitors use "plates" that are two layers of a substrate (optionally the same substrate), rather than two separate plates separated by an intervening substance. In some instances, this "electrical double layer" results in the separation of charge despite the thin physical separation of the layers (e.g., on the order of nanometers). In some instances, the lack of a bulky layer of dielectric in an ultra-capacitor permits the packing of plates with much larger surface area into a given size, resulting in high capacitances compared with a capacitor.

In various embodiments, any of the components of an ultracapacitor comprise nanofibers (for example, porous carbon/$BaTiO_3$/separator). In some embodiments, the nanofibers are produced from a water-based, gas-assisted electrospinning process. In some embodiments, dielectric double layer comprises nanofibers. In one aspect, described herein are ultracapacitors comprising nanofibers. In various aspects, the present disclosure includes an ultracapacitor that includes the nanofibers described herein, includes an ultracapacitor that includes a nanofiber produced by the methods described herein, and includes an ultracapacitor that includes a nanofiber produced by the system described herein. In some embodiments, described herein are methods for making and methods for using ultracapacitors that comprise nanofibers.

In some embodiments, the ultracapacitor comprises porous carbon electrodes with a dielectric layer. In some embodiments, the porous carbon electrodes are formed of nanofibers. In some embodiments, nanofibers are disposed on the carbon electrodes. In various embodiments, the nanofibers comprise any material with a suitable dielectric constant. Non-limiting examples are $StTiO_3$, $BaTiO_3$, $SrBaTiO_3$, mixtures thereof, and combinations thereof. In various embodiments, the nanofibers are of any suitable geometry including hybrid or hollow nanofibers.

In some embodiments, described herein are processes for producing nanofibers suitable for use in an ultracapacitor. In one aspect, the process includes electrospinning a fluid stock, wherein the fluid stock comprises precursor molecules bound to a polymer. In some embodiments, the precursor molecules comprise Ba, St, Ti, or mixtures thereof. In some embodiments, the process includes thermally treating the spun nanofibers.

In some embodiments, the ultracapacitor comprises a thin layer of dielectric nanofibers at the interface between the electrolyte and the electrode (e.g., activated carbon electrode). In some instances, this nanofiber layer results in an increased capacitance. Capacitance density is reported in units of farads per cubic centimeter ($F/cm^3$) or equivalents. In some embodiments, the ultra-capacitors described herein have a capacitance density of about 10 $F/cm^3$, about 20 $F/cm^3$, about 50 $F/cm^3$, about 100 $F/cm^3$, about 200 $F/cm^3$, about 500 $F/cm^3$, about 1,000 $F/cm^3$, and the like. In some embodiments, the ultracapacitor have a capacitance density of at least about 10 $F/cm^3$, at least about 20 $F/cm^3$, at least about 50 $F/cm^3$, at least about 100 $F/cm^3$, at least about 200 $F/cm^3$, at least about 500 $F/cm^3$, at least about 1,000 $F/cm^3$, and the like.

Figure 45:
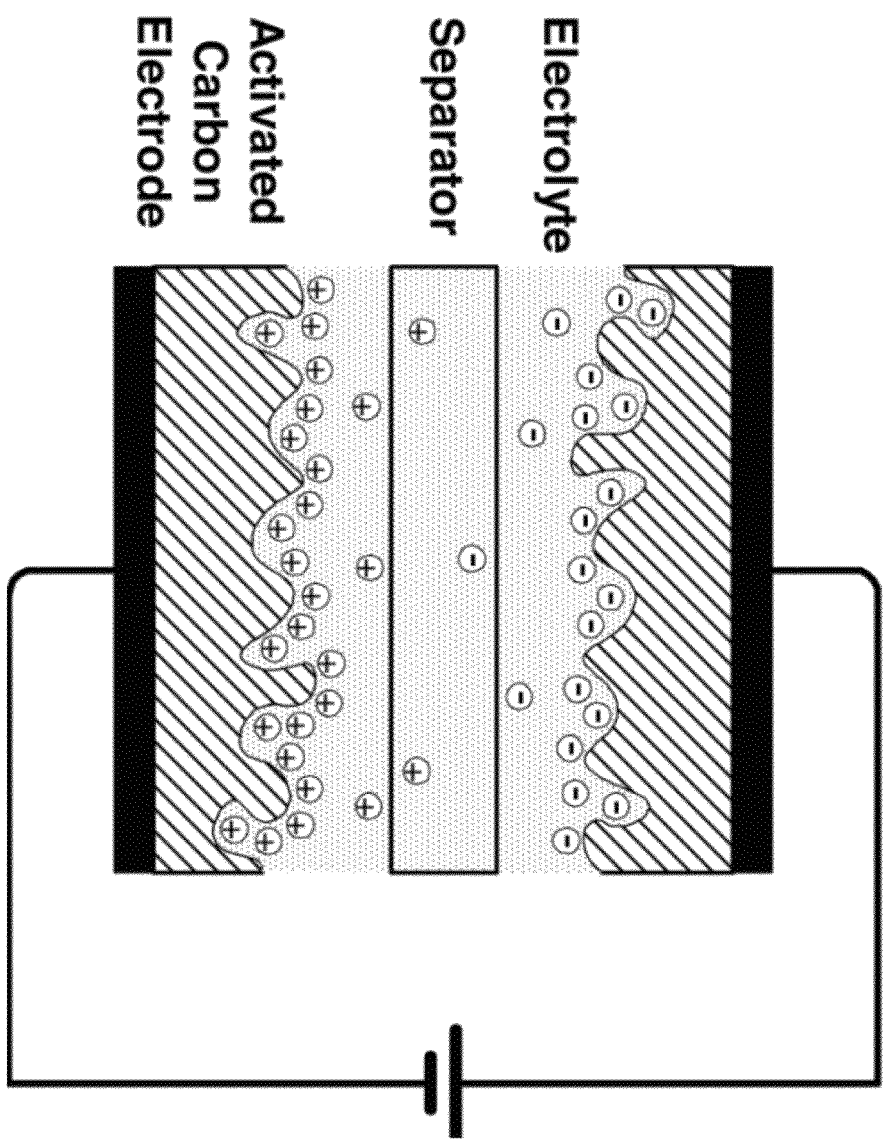
FIG. 45 shows a cross-sectional view of an electrolytic double layer ultracapacitor.

FIG. 45 shows a cross-sectional view of an electrolytic double layer ultracapacitor.

Figure 46:
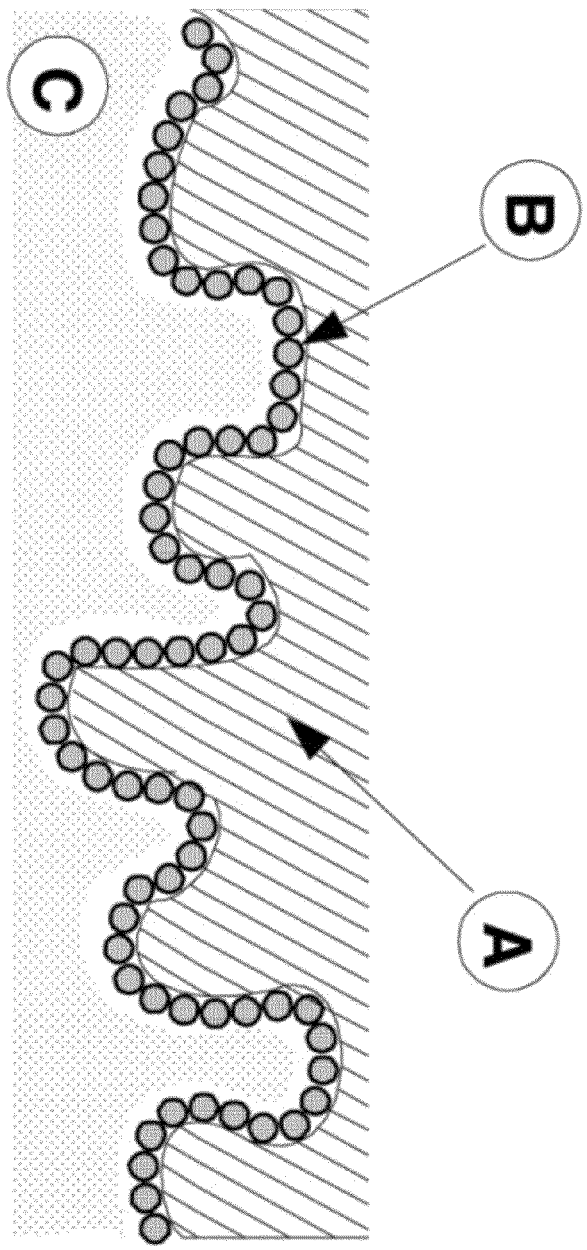
FIG. 46 shows a cross-sectional view of barium titanate nanofibers laid on the activated carbon of an ultracapacitor.

FIG. 46 shows a cross-sectional view of barium titanate nanofibers laid on the activated carbon of an ultracapacitor.

Solar Cells

In some instances, a solar cell (also called photovoltaic cell or photoelectric cell) is a solid state electrical device that converts the energy of light directly into electricity by the photovoltaic effect. In some instances, assemblies of cells are used to make modules (e.g., solar panels), which are used to capture energy from sunlight.

Photovoltaics is a field of technology related to the use of photovoltaic cells to producing electricity from light (though it is often used specifically to refer to the generation of electricity from sunlight). In some instances, photovoltaic devices are based on the concept of charge separation at an interface of two materials of different conduction mechanism. In some instances, photovoltaic devices are solid-state junction devices, usually made of silicon, (e.g., and profiting from the experience and material availability resulting from the semiconductor industry), however other designs and materials can be utilized.

In various embodiments, any of the components of a solar cell (e.g., thin film solar cell) comprise nanofibers. Exemplary components include an anode, an n-layer, an active layer, a p-layer and a cathode. In some embodiments, the nanofibers are produced by the water-based, gas-assisted electrospinning process described herein. In some embodiments, the n-layer, active layer and p-layer comprise nanofibers. In one aspect, the present disclosure includes uses of nanofibers in solar cells. The present disclosure includes solar cells that include a nanofiber of the invention, includes solar cells that include a nanofiber produced by the methods of the invention, and includes thin film solar cells that include a nanofiber produced by the system of the invention. The disclosure also includes methods for making and methods for using solar cells that include nanofibers.

In one embodiment, the cathode comprises nanofibers (e.g., aluminum). In various embodiments, any suitable material is used as the cathode including pure metal nanofibers such as gold (Au), silver (Ag), nickel (Ni), copper (Co), and/or calcium (Ca).

In some instances, the n-layer provides for transfer of electrons. In some embodiments, the n-layer comprises ZnO nanofibers. Any suitable bandgap material is used as the n-layer including nanofibers of any suitable pure metal oxides such as $TiO_2$.

In one embodiment, the photoactive layer comprises PbSe nanofibers (e.g., where the PbSe crystals are nanoscale in size). Any suitable bandgap material is used as the photoactive layer including nanofibers of any suitable hybrid materials such as CdTe, CdS, PbS, and/or PbTe.

In some instances, the p-layer provides the transfer of holes. In some embodiments, the p-layer comprises NiO nanofibers. Any suitable bandgap material is used as the p-layer including nanofibers of any suitable pure metal oxides such as $CuInGaSe_2$.

In some instances, Indium Tin Oxide ("ITO") is one of the most widely used transparent conducting oxides (e.g., as a solar cell substrate). In some instances, ITO has a superior electrical conductivity and optical transparency. In some instances, ITO is easy to be deposit as a thin film. In one embodiment, the anode comprises ITO nanofibers. In some instances, any suitable conducting, transparent material is used as the anode including nanofibers of any suitable pure inorganic materials such as carbon.

In some embodiments, the cathode comprises Al, the n-layer comprises ZnO, the photoactive layer comprises PbSe, the p-layer comprises NiO, and the anode comprises ITO. In some embodiments, any one or more of the components comprise nanofibers. In some instances, the solar cells based on the nanofibers have good connectivity among nanocrystals in each layer with minimal recombination losses. In some instances, the solar cells based on the nanofibers remove the complications associated with incompatibility among processes for each component.

Flexible Solar Cells

Figure 41:
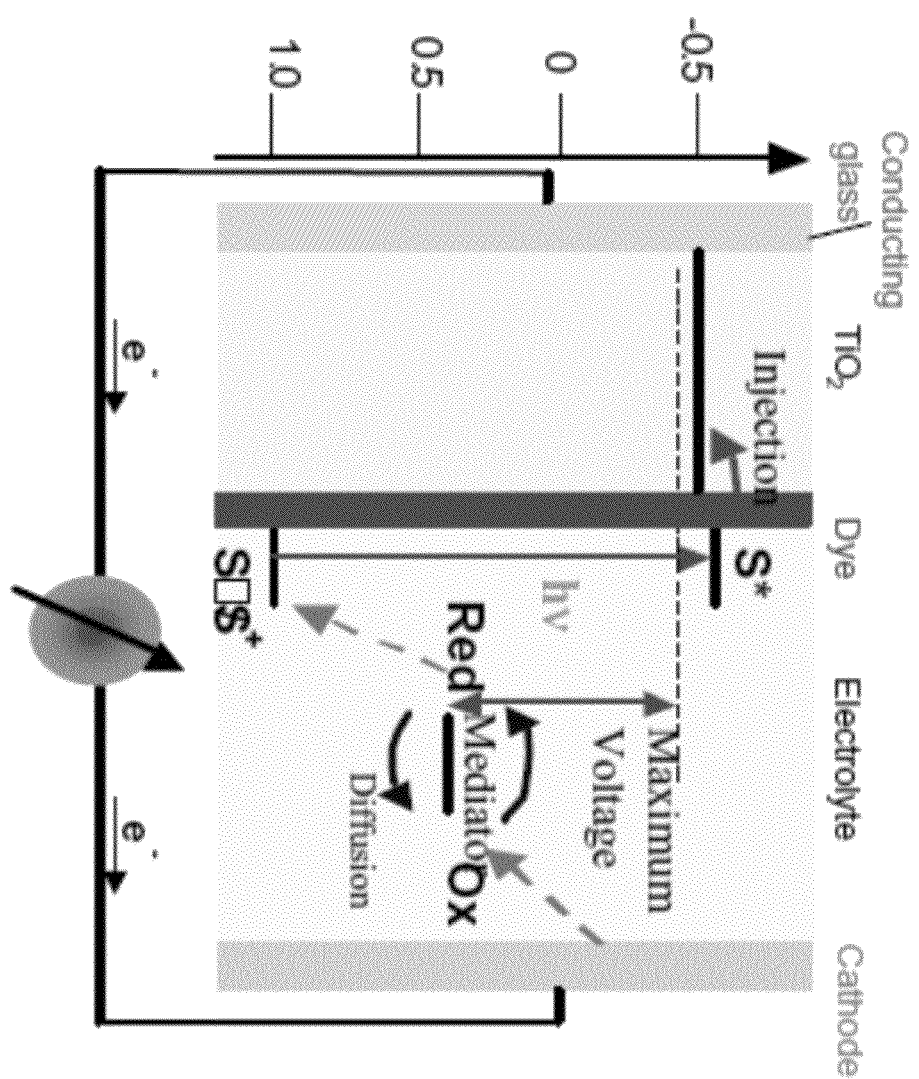
FIG. 41 shows an exemplary principle of operation and energy level scheme of a dye-sensitize nanocrystalline solar cell.

In some instances, inorganic solid-state junction devices are being replaced by cells based on nanocrystalline and conducting films (i.e., thin films). In some instances, thin-film structures reduce the cost of photovoltaic devices (e.g., by eliminating the use of the expensive silicon wafers). In some instances, it is now possible to depart completely from solid-state junction devices, by replacing the contacting phase to the semiconductor by an electrolyte, liquid, gel or solid, thereby forming a photo-electrochemical cell. In some instances, the prototype of this family of devices is the dye-sensitized solar cell (see FIG. 41). In some instances, the dye-sensitized solar cell performs the optical absorption and the charge separation processes by the association of a sensitizer as light-absorbing material with a wide band gap semiconductor of nanocrystalline morphology.

In one aspect, described herein are thin film solar cells and photo-electrochemical cells comprising nanofibers. In various aspects, the present disclosure includes thin film solar cells and photo-electrochemical cells that include the nanofibers described herein, includes thin film solar cells and photo-electrochemical cells that include a nanofiber produced by the methods described herein, and includes thin film solar cells and photo-electrochemical cells that include a nanofiber produced by the system described herein. In various aspects, described herein are methods for making and methods for using thin film solar cells and photo-electrochemical cells that include nanofibers.

In some instances, the thin film solar cells and photo-electrochemical cells are flexible. In some instances, ITO (Indium Tin Oxide) is not flexible. In some instances, various flexible substrates based on transparent polymers have been developed, but they do not provide enough thermal stability for thermal treatment of electrode materials (>450° C.) or good adhesion between the substrate and electrodes. In some embodiments, described herein are coaxial nanofibers of alumina (core) and ITO (sheath) (e.g., for use as substrates for flexible solar cell applications). In some embodiments, the alumina/ITO nanofibers have good thermal stability and good adhesion between the substrate and the electrodes.

In some instances, inorganic materials such as alumina, alumina-magnesia and zirconia have been fabricated as flexible substrates for catalytic applications. In some embodiments, insertion of these flexible inorganic materials in the ITO sheath of coaxial nanofibers results in improved flexibility without losing transparency and conductivity. In some embodiments, such coaxial nanofibers of alumina and ITO are synthesized via water-based spinning (e.g., as substrates for flexible solar cells). In some embodiments, the development of alumina/ITO nanofibers cathodes is carried out in two steps. In some embodiments, aqueous polymer solutions containing high loading of Al precursor and ITO precursor are coaxially electrospun as core and sheath layer, respectively, followed by the thermal treatment to create alumina/ITO coaxial nanofibers.

Figure 43:
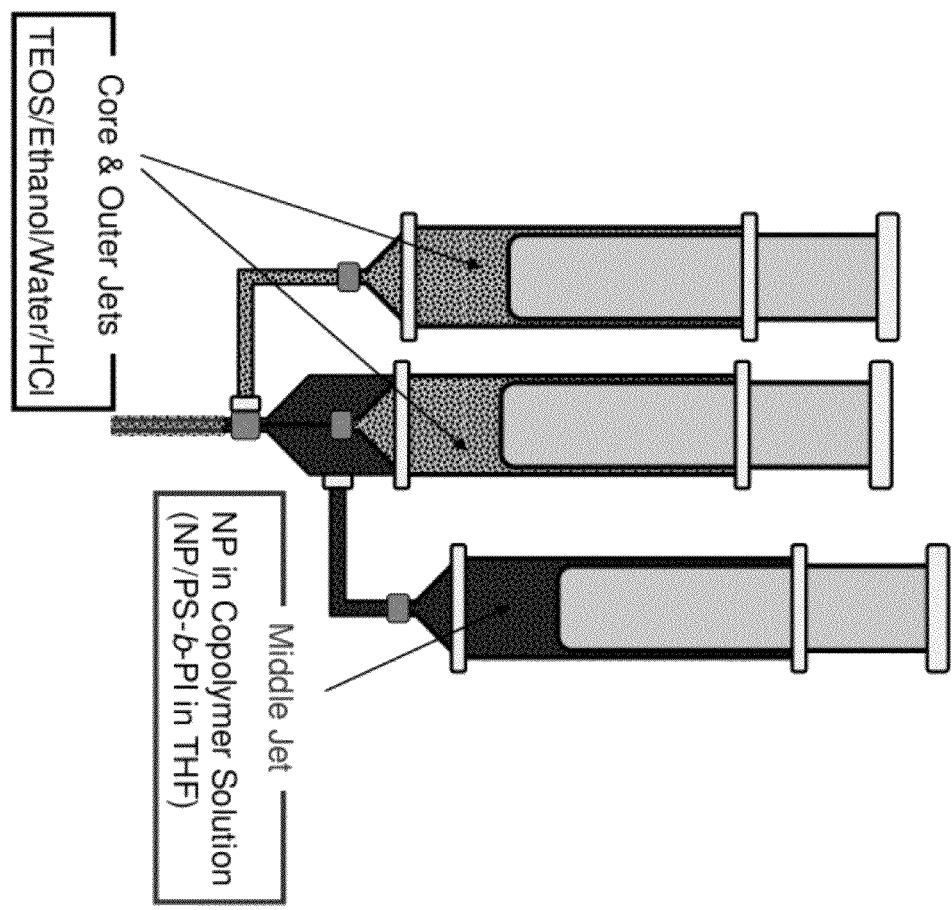
FIG. 43 shows a schematic of tri-axial electrospinning.

In some embodiments, a high speed air stream is incorporated into the coaxial procedure as an additional skin layer (i.e., tri-axial jets of alumina precursor (core)/ITO (middle)/air (sheath)). In some embodiments, the gas flow produces nanofibers at a faster rate. In some embodiments, (e.g., as shown in FIG. 43), tri-axial electrospinning is utilized in the confined assembly of block copolymers sandwiched by silica layers.

In various aspects, the present disclosure includes flexible solar cells that include the nanofibers described herein, includes flexible solar cells that include a nanofiber produced by the methods described herein, and includes flexible solar cells that include a nanofiber produced by the system described herein. In some aspects, described herein are methods for making and methods for using flexible solar cells that comprise nanofibers. In one aspect, the disclosure includes solar cells comprising a substrate comprising nanofibers comprising alumina, ITO, or a mixture of alumina and ITO.

Figure 42:
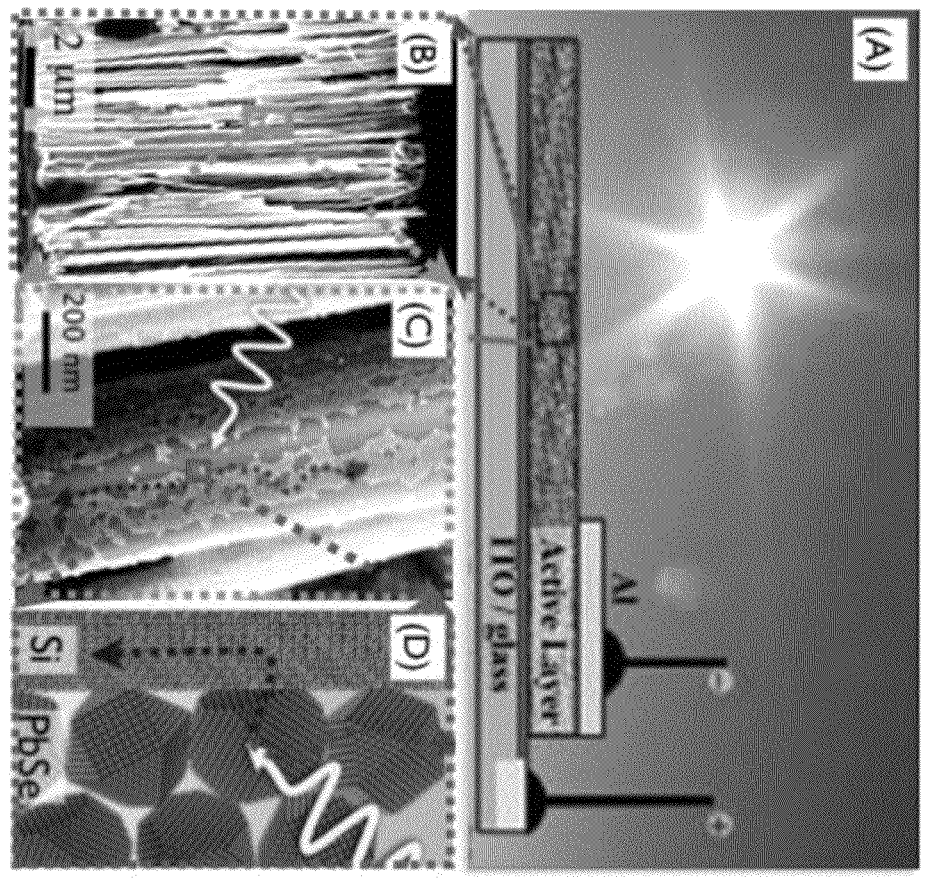
FIG. 42 shows an exemplary principle of operation of a thin film nanocrystal/nanowire hybrid solar cell.

FIG. 42 shows the principle of operation of a thin film nanocrystal/nanowire hybrid solar cell.

Figure 44:
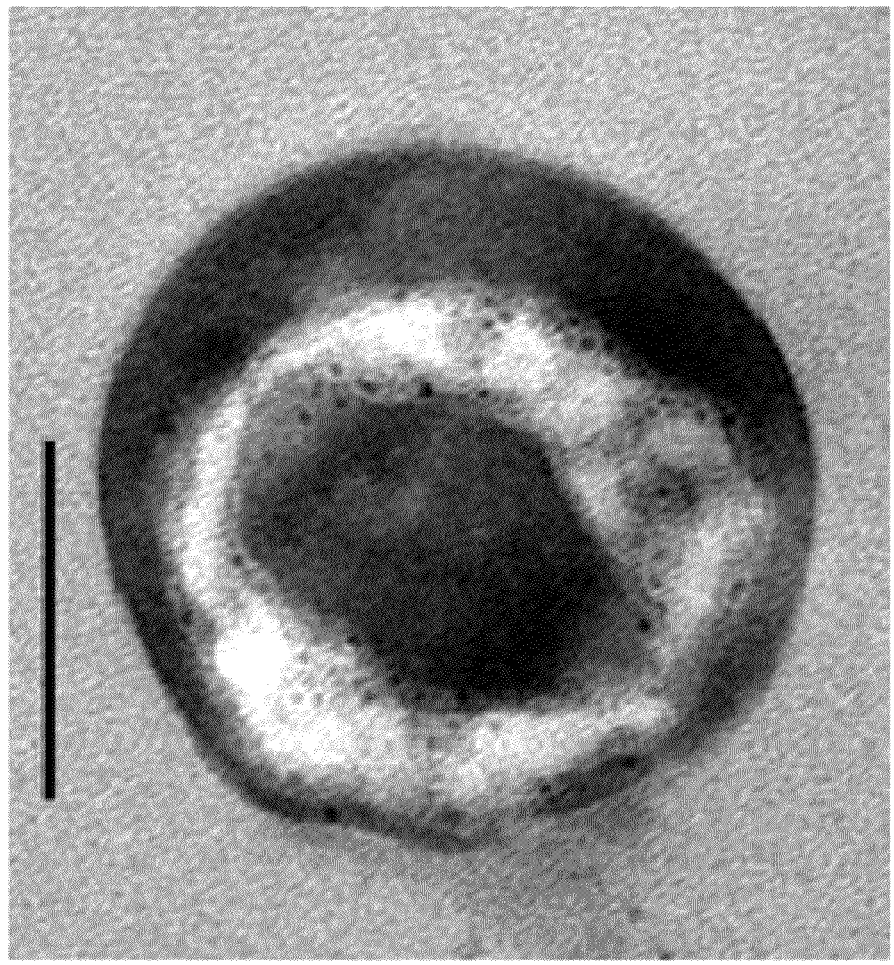
FIG. 44 shows a TEM image of tri-axial nanofibers of $SiO_2$ (core)/PI-b-PS with $Fe_3O_4$ (middle)/$SiO_2$ (sheath).

FIG. 44 shows a TEM image of tri-axial nanofibers of $SiO_2$ (core)/PI-b-PS with $Fe_3O_4$ (middle)/$SiO_2$ (sheath).

Other Uses

In some instances, there are uses for the pure metal and/or ceramic nanofibers other than in electrochemical devices (e.g., filters, sensors, catalysts, membranes, electrodes, tissue regeneration matrixes, and the like).

Catalysis is the change in rate of a chemical reaction due to the participation of a substance called a catalyst. In some instances, unlike reagents that participate in the chemical reaction, a catalyst is not consumed by the reaction itself. In some instances, a catalyst participates in multiple chemical transformations. In some instances, catalysts that speed the reaction are called positive catalysts. In some instances, substances that interact with catalysts to slow the reaction are called inhibitors (or negative catalysts). In some instances, substances that increase the activity of catalysts are called promoters, and substances that deactivate catalysts are called catalytic poisons.

In some instances, solid-state catalysts (sometimes known as a heterogeneous catalyst) catalyze reactions on their surface. Exemplary solid-state catalysts are metals and metal alloys. In some instances, metals and metal alloys are expensive (e.g., precious metals) and reactions are surface-catalyzed. In some instances, it is advantageous to use a catalyst with a high surface to mass ratio (e.g., to maximize performance per cost). In some instances, long, thin nanofibers have a high surface area to mass ratio, so are a desirable material from which to make catalysts.

In one aspect, described herein are catalysts. In various aspects, the present disclosure includes a catalyst that comprises the nanofibers described herein, includes a catalyst that comprises a nanofiber produced by the methods described herein, and includes a catalyst that comprises a nanofiber produced by the system described herein. In some aspects, described herein are methods for making and methods for using catalysts that comprise nanofibers.

In some instances, hydrogen is an energy carrier suitable for use in fuel cells. In one embodiment, the catalyst comprises composite nanofibers comprising a first layer (e.g., comprising Fe or Ni) and a second layer (e.g., comprising $SiO_2$, $ZrO_2$ or $Al_2O_3$). In some embodiments, the catalyst is capable of producing $H_2$ from glucose or cellulose. In some embodiments, the catalyst has a maximum temperature for $H_2$ production of about 60° C. (e.g., increased from about 40° C.).

In some instances, hydrogen sulfide is a poisonous gas that is a pollutant in some industrial processes. In some instances, hydrogen sulfide is removed by a catalyst. In some embodiments, the catalyst comprises composite nanofibers (e.g., comprising ZnO on $ZrO_2$). In some embodiments, the catalyst is capable of removing $H_2S$ from flue gas. In some embodiments, the catalyst is capable of removing $H_2S$ to a concentration of 10 ppm.

In some instances, filters are used to purify particles from a fluid stream. In one aspect, the present disclosure includes filters. In various aspects, the present disclosure includes a filter that comprises the nanofibers described herein, includes a filter that includes a nanofiber produced by the methods described herein, and includes a filter that includes a nanofiber produced by the system described herein. In various aspects, described herein are methods for making and methods for using filters that comprise nanofibers.

In some embodiments, the filter is a water filter. In some embodiments, the filter is an air filter. In some embodiments, the filter is designed to remove particles of a certain size.

In some embodiments, the nanofibers described herein are used in sensors. In one embodiment, the sensor comprises nanofibers comprising metal oxides. In some embodiments, the metal oxides are dispersed in a conducting metal. In some embodiments, a molecule is sensed by a change in current. In one embodiment, the nanofiber comprises $V_2O_5$ and the molecule is ammonia.

In one aspect, the present disclosure includes sensors. In various aspects, the present disclosure includes a sensor that comprises the nanofibers described herein, includes a sensor that includes a nanofiber produced by the methods described herein, and includes a sensor that includes a nanofiber produced by the system described herein. In some embodiments, described herein are methods for making and methods for using sensors that comprise nanofibers.

In some instances, a membrane is a general or selective barrier, which is often thin. In some instances, the nanofibers described herein are formed into membranes. In one embodiment, the membrane comprises nanofibers (e.g., $SiO_2$ comprising metal oxides). In some embodiments, the membrane is capable of removing metal ions from wastewater. In some embodiments, the membrane comprises nanofibers comprising $TiO_2$. In some embodiments, the membrane is capable of degrading organic pollutants. In various embodiments, the pollutant is a pesticide or volatile organic compound. In some instances, the degradation of the pollutant is photocatalytic (i.e., catalyzed by light).

In one aspect, the present disclosure includes membranes. In various aspects, the present disclosure includes a membrane that comprises the nanofibers described herein, includes a membrane that comprises a nanofiber produced by the methods described herein, and includes a membrane that comprises a nanofiber produced by the system described herein. In some aspects, described herein are methods for making and methods for using membranes that comprise nanofibers.

In some instances, an electrode is an electrical conductor used to make contact with a nonmetallic part of a circuit (e.g., a semiconductor, an electrolyte or a vacuum). In some instances, electrodes are utilized in electrochemical devices (e.g., fuel cells, batteries, ultra-capacitors and solar cells). In one aspect, the present disclosure includes electrodes. In various aspects, the present disclosure includes an electrode that comprises the nanofibers described herein, includes an electrode that comprises a nanofiber produced by the methods described herein, and includes an electrode that comprises a nanofiber produced by the system described herein. In some aspects, described herein are methods for making and methods for using electrodes that comprise nanofibers.

In some instances, the nanofibers are used in medicine, including in tissue culture. In some embodiments, described herein are tissue regeneration matrixes. For example, the nanofibers are used for constructing a porous scaffold onto which cells are seeded that grow to fill the scaffold (e.g., thereby producing a material suitable for tissue supplementation or replacement).

In various aspects, the present disclosure includes an electrode that comprises the nanofibers described herein, includes an electrode that comprises a nanofiber produced by the methods described herein, and includes an electrode that comprises a nanofiber produced by the system described herein. In some aspects, described herein are methods for making and methods for using electrodes that comprise nanofibers.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

Example 1

Preparing a Fluid Stock of Nickel Acetate and PVA

Two (2) grams of nickel acetate, the metal precursor, was dissolved in 20 ml of 1 molar acetic acid solution. The solution was stirred for 2 hours to create a solution of nickel acetate. The solution was homogenous.

In a second solution, 1 gram of 99.7% hydrolyzed polyvinyl alcohol (PVA) with an average molecular weight of 79 kDa and polydispersity index of 1.5 was dissolved in 10 ml of de-ionized water. The polymer solution was heated to a temperature of 95° C. and stirred for 2 hours to create a homogenous solution.

The nickel acetate solution was then combined with the PVA solution to create a fluid stock. In order to distribute the precursor substantially evenly in the fluid stock, the precursor solution was added gradually to the polymer solution while being continuously vigorously stirred for 2 hours. The mass ratio of precursor to polymer in the fluid feed was 2:1.

Example 2

Characterization of a Fluid Stock of Nickel Acetate and PVA

Figure 2:
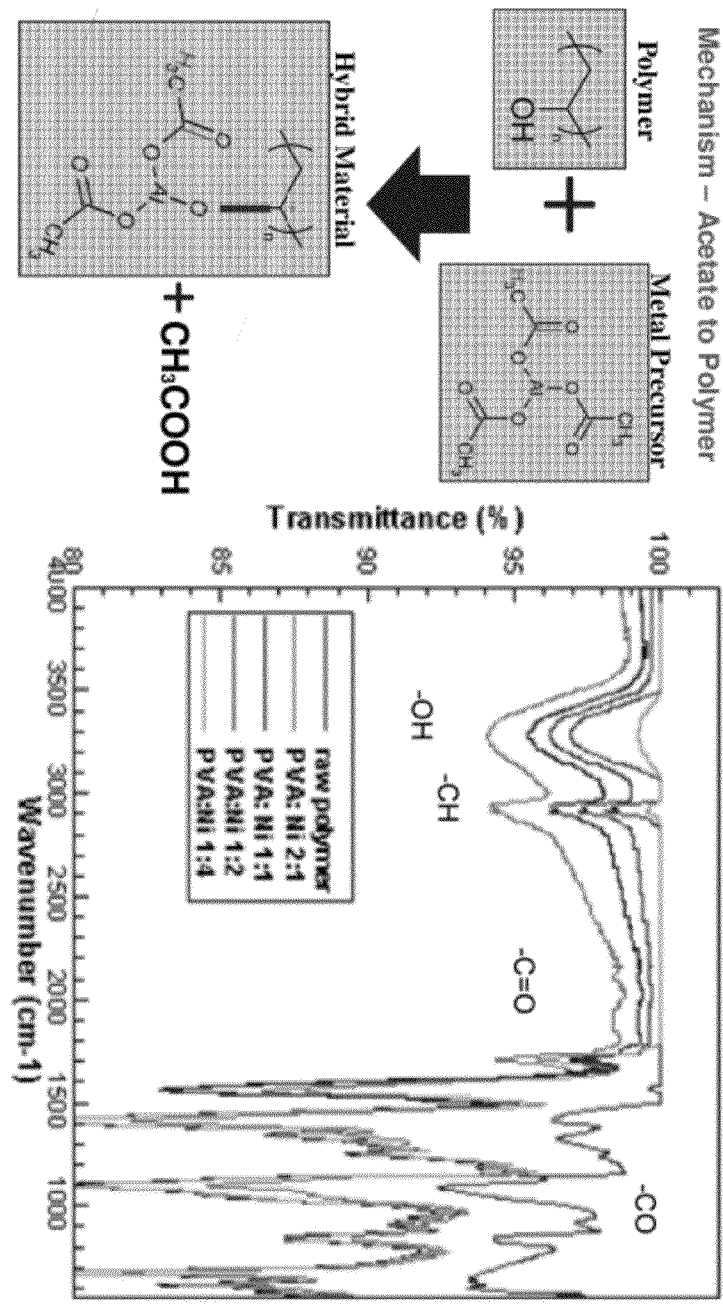
FIG. 2 shows an exemplary mechanism of precursor-polymer bonding and a FTIR study of the effect of Ni precursor loading.

The chemical interaction between the ligand of the metal precursor and the functional group in the polymer backbone resulted in extremely high loading of metal precursors without losing the spinnability. The interaction was demonstrated in the FT-IR study for nanofibers with various ratios of PVA to Ni precursor. As demonstrated in FIG. 2, the reduction of —OH bond and increase in —CO bond were observed at high loading of Ni precursor (Ni:PVA=4:1).

Example 3

Electrospinning a Fluid Stock of Nickel Acetate and PVA

The fluid stock of Example 1 was electrospun by a gas-assisted technique. The overall process and apparatus is depicted in FIG. 1. The fluid stock was loaded into a syringe pump connected to a spinneret with an inner nozzle diameter (fluid stock) of $4.13 \times 10^{-4}$ m and an outer (air) diameter of $1.194 \times 10^{-3}$ m. The distance between the nozzle and the collection plate was kept at about 15 cm and the fluid stock was spun at a rate of 0.1 ml/min. A charge of +15 kV was maintained at the collector. The air velocity at the nozzle was 100 m/s. The temperature of the air and fluid stock at the nozzle was 300 K.

Example 4

Figure 3:
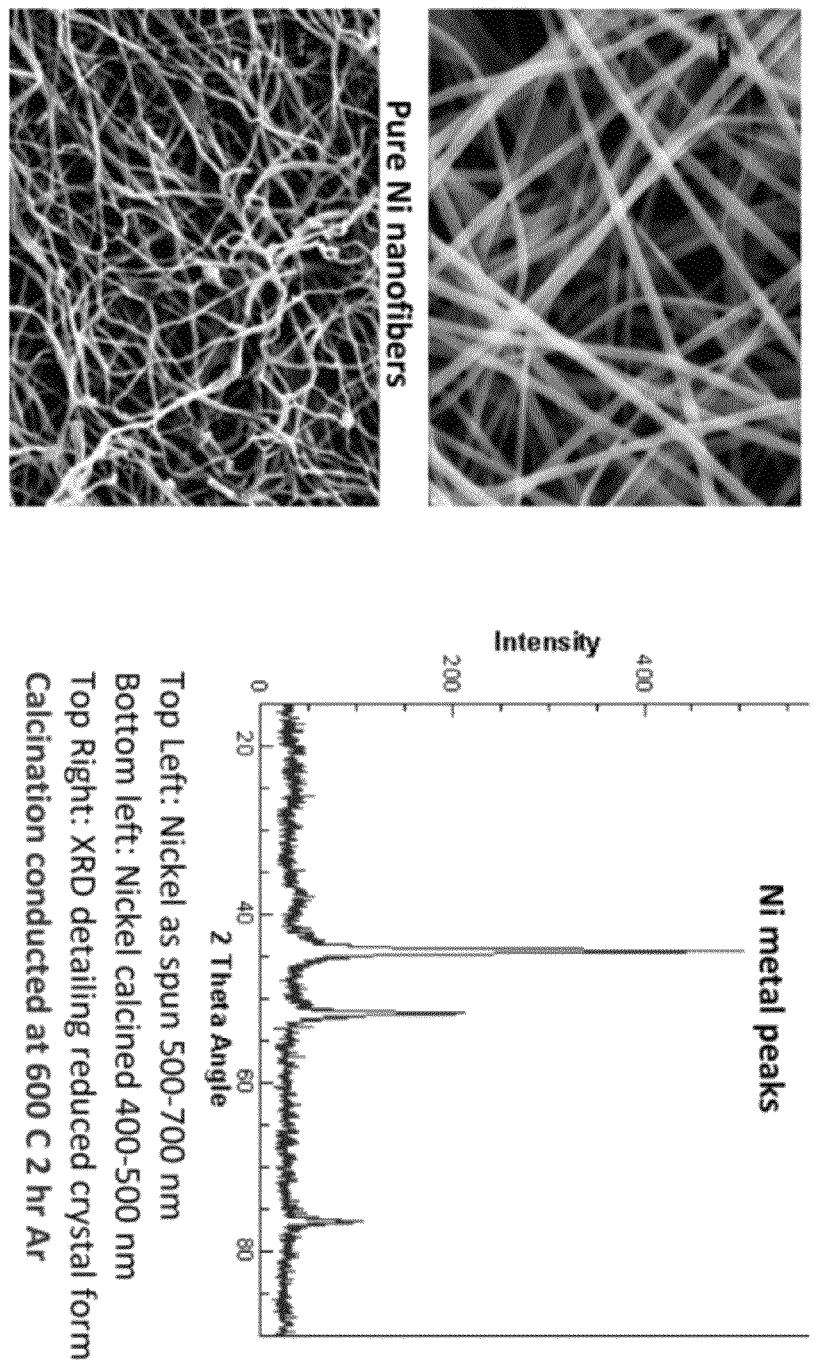
FIG. 3 shows micrographs and an x-ray diffraction plot of Ni nanofibers.

Calcinating a Fluid Feed of Nickel Acetate and PVA to Create a Pure Nickel Nanofiber The electrospun fluid stock of Example 3 was heated for 2 hours at 600° C. in an atmosphere of 100% Ar gas. In order to visualize the nanofiber before and after calcination an SEM image was taken before and after calcination as depicted in FIG. 3. The diameter of the nanofiber was approximately 500-700 nm as spun and 400-500 nm after calcination. In order to characterize the nanofiber after calcination, an x-ray diffraction measurement was conducted a Scintag Theta-Theta X-ray Diffractometer, indicating that the nanofiber was substantially pure nickel as depicted in FIG. 3.

Example 5

Figure 4:
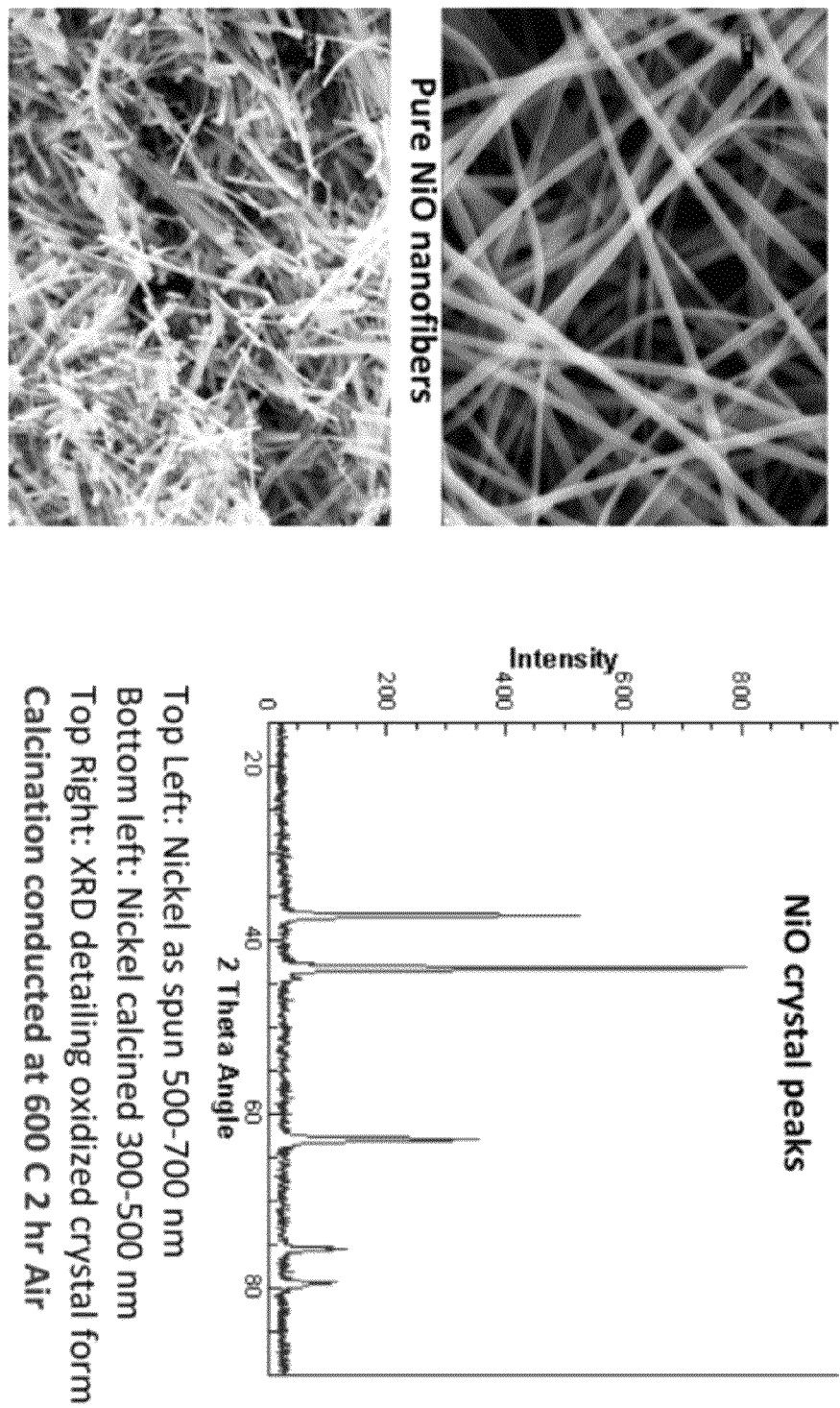
FIG. 4 shows micrographs and an x-ray diffraction plot of NiO nanofibers.

Calcinating a Fluid Feed of Nickel Acetate and PVA to Create a Nickel Oxide Nanofiber The electrospun fluid stock of Example 3 was heated for 2 hours at 600° C. in an atmosphere of air. In order to visualize the nanofiber before and after calcination an SEM image was taken before and after calcination as depicted in FIG. 4. The diameter of the nanofiber was approximately 500-700 nm as spun and 300-500 nm after calcination. An x-ray diffraction measurement indicates that that the nanofiber was substantially pure nickel oxide as depicted in FIG. 4.

Example 6

Calcinating a Fluid Feed of Copper Acetate and PVA to Create a Copper Nanofiber

Figure 5:
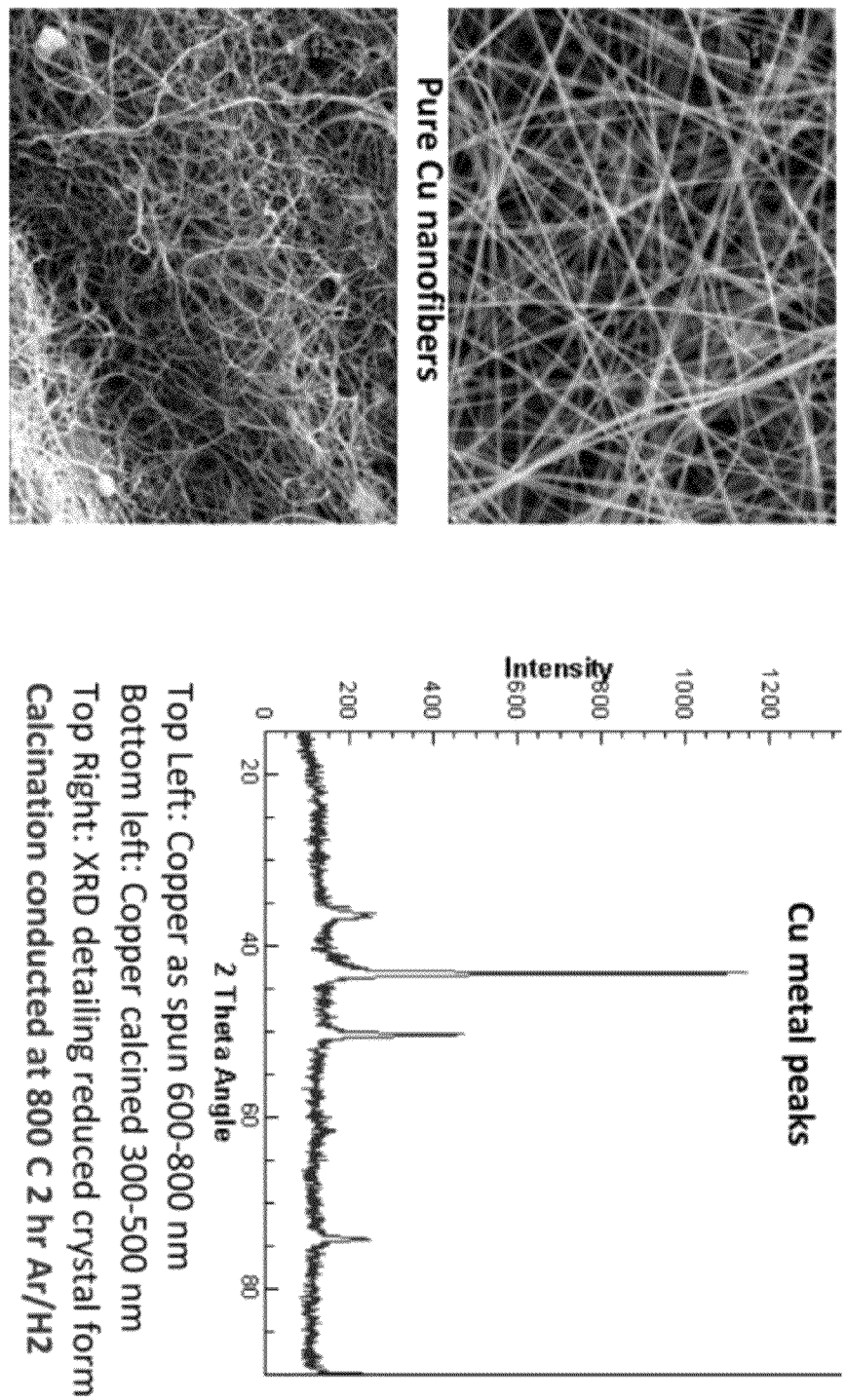
FIG. 5 shows micrographs and an x-ray diffraction plot of Cu nanofibers.

Following the procedure of Example 1, a fluid stock of copper acetate and PVA were prepared with ratios of precursor:polymer of 2:1. These fluid stocks were electrospun by the procedure of Example 3. The electrospun fluid stock was heated for 2 hours at 800° C. in an atmosphere of 94% Ar and 6% $H_2$ gas. In order to visualize the nanofiber before and after calcination an SEM image was taken before and after calcination as depicted in FIG. 5. The diameter of the nanofiber was approximately 600-800 nm as spun and 300-500 nm after calcination. An x-ray diffraction measurement indicates that that the nanofiber was substantially pure copper as depicted in FIG. 5.

Example 7

Figure 6:
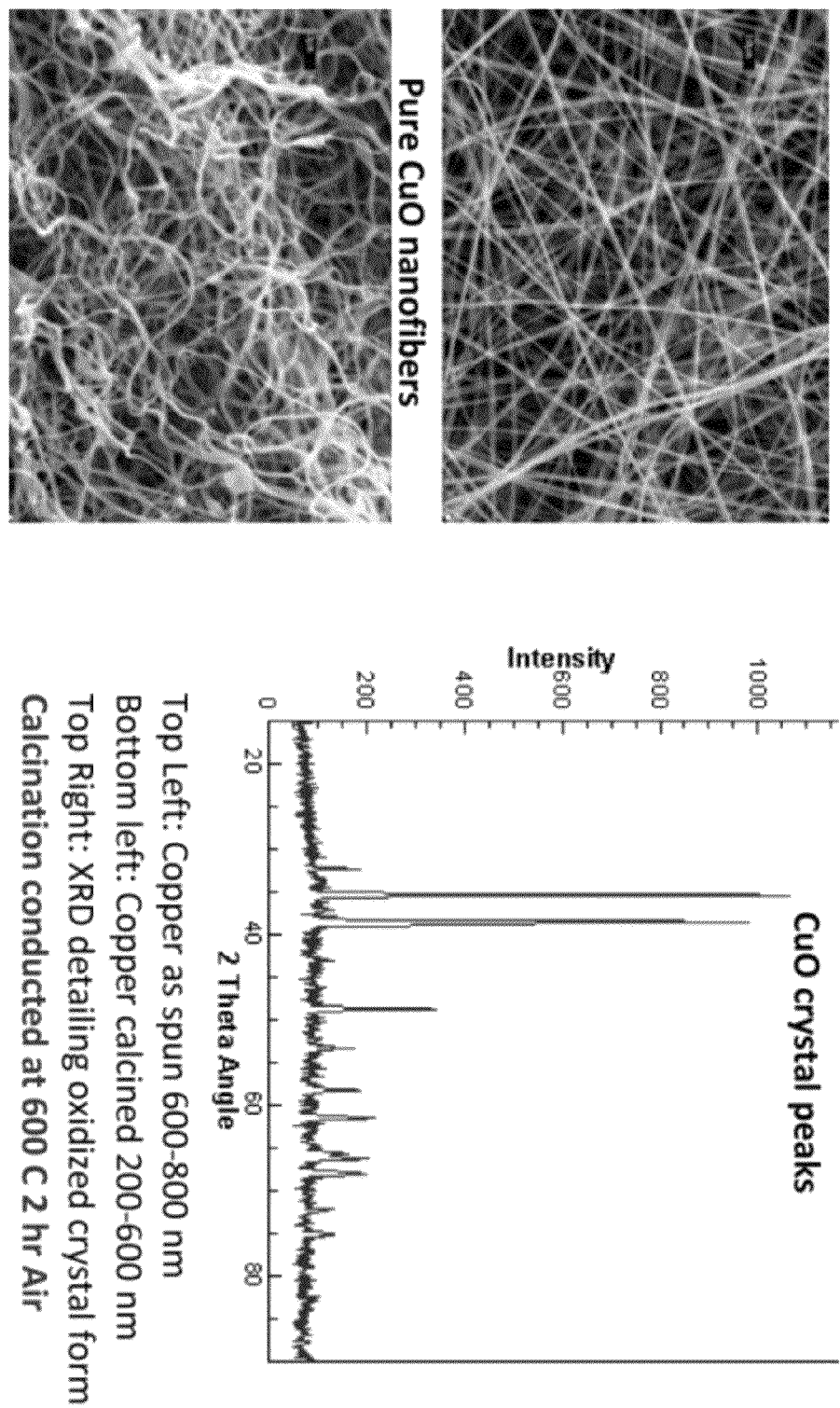
FIG. 6 shows micrographs and an x-ray diffraction plot of CuO nanofibers.

Calcinating a Fluid Feed of Copper Acetate and PVA to Create a Copper Oxide Nanofiber The electrospun fluid stock of Example 6 was heated for 2 hours at 600° C. in an atmosphere of air. In order to visualize the nanofiber before and after calcination an SEM image was taken before and after calcination as depicted in FIG. 6. The diameter of the nanofiber was approximately 600-800 nm as spun and 200-600 nm after calcination. An x-ray diffraction measurement indicates that that the nanofiber was substantially pure copper oxide as depicted in FIG. 6.

Example 8

Calcinating a Fluid Feed of Silver Acetate and PVA to Create a Silver Nanofiber

Figure 7:
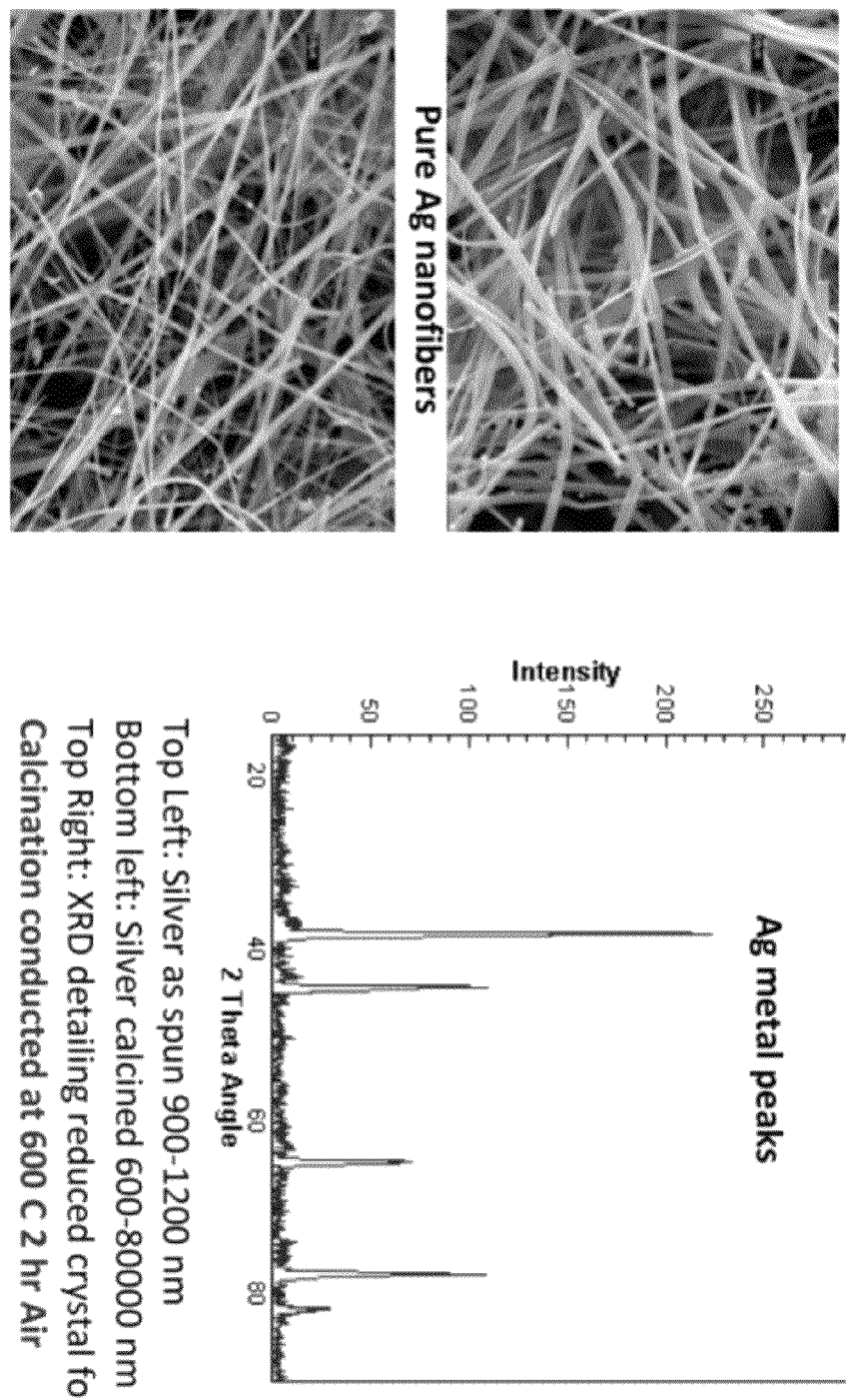
FIG. 7 shows micrographs and an x-ray diffraction plot of Ag nanofibers.

Following the procedure of Example 1, a fluid stock of silver acetate and PVA were prepared with ratios of precursor:polymer of 2:1. These fluid stocks were electrospun by the procedure of Example 3. The electrospun fluid stock was heated for 2 hours at 600° C. in an atmosphere of air. In order to visualize the nanofiber before and after calcination an SEM image was taken before and after calcination as depicted in FIG. 7. The diameter of the nanofiber was approximately 900-1200 nm as spun and 600-800 nm after calcination. An x-ray diffraction measurement indicates that that the nanofiber was substantially pure silver as depicted in FIG. 7.

Example 9

Calcinating a Fluid Feed of Iron Acetate and PVA to Create an Iron Nanofiber

Figure 8:
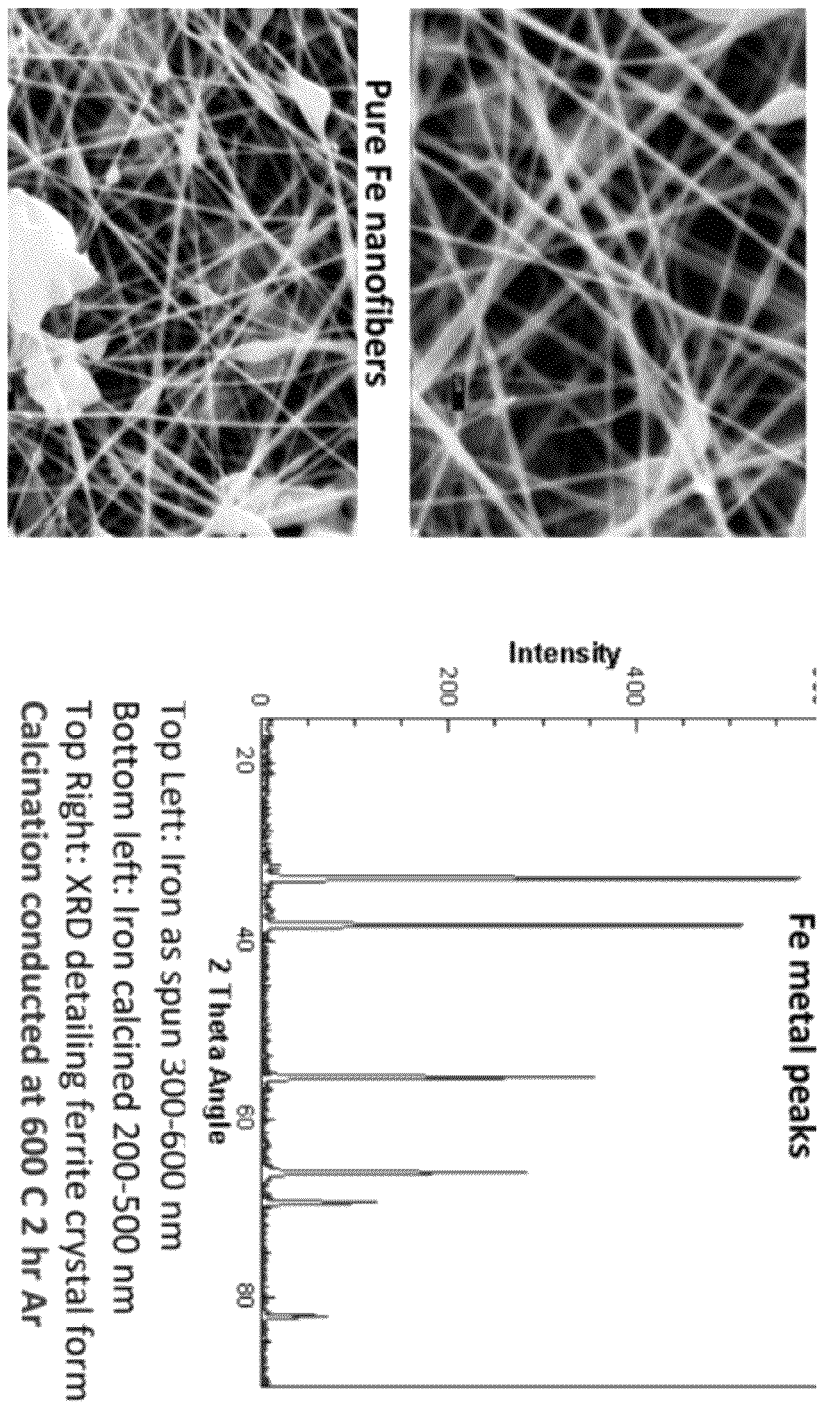
FIG. 8 shows micrographs and an x-ray diffraction plot of Fe nanofibers.

Following the procedure of Example 1, a fluid stock of iron acetate and PVA were prepared with ratios of precursor:polymer of 2:1. These fluid stocks were electrospun by the procedure of Example 3. The electrospun fluid stock was heated for 2 hours at 600° C. in an atmosphere of air. In order to visualize the nanofiber before and after calcination an SEM image was taken before and after calcination as depicted in FIG. 8. The diameter of the nanofiber was approximately 300-500 nm as spun and 200-400 nm after calcination. An x-ray diffraction measurement indicates that that the nanofiber was substantially pure iron as depicted in FIG. 8.

Example 10

Figure 9:
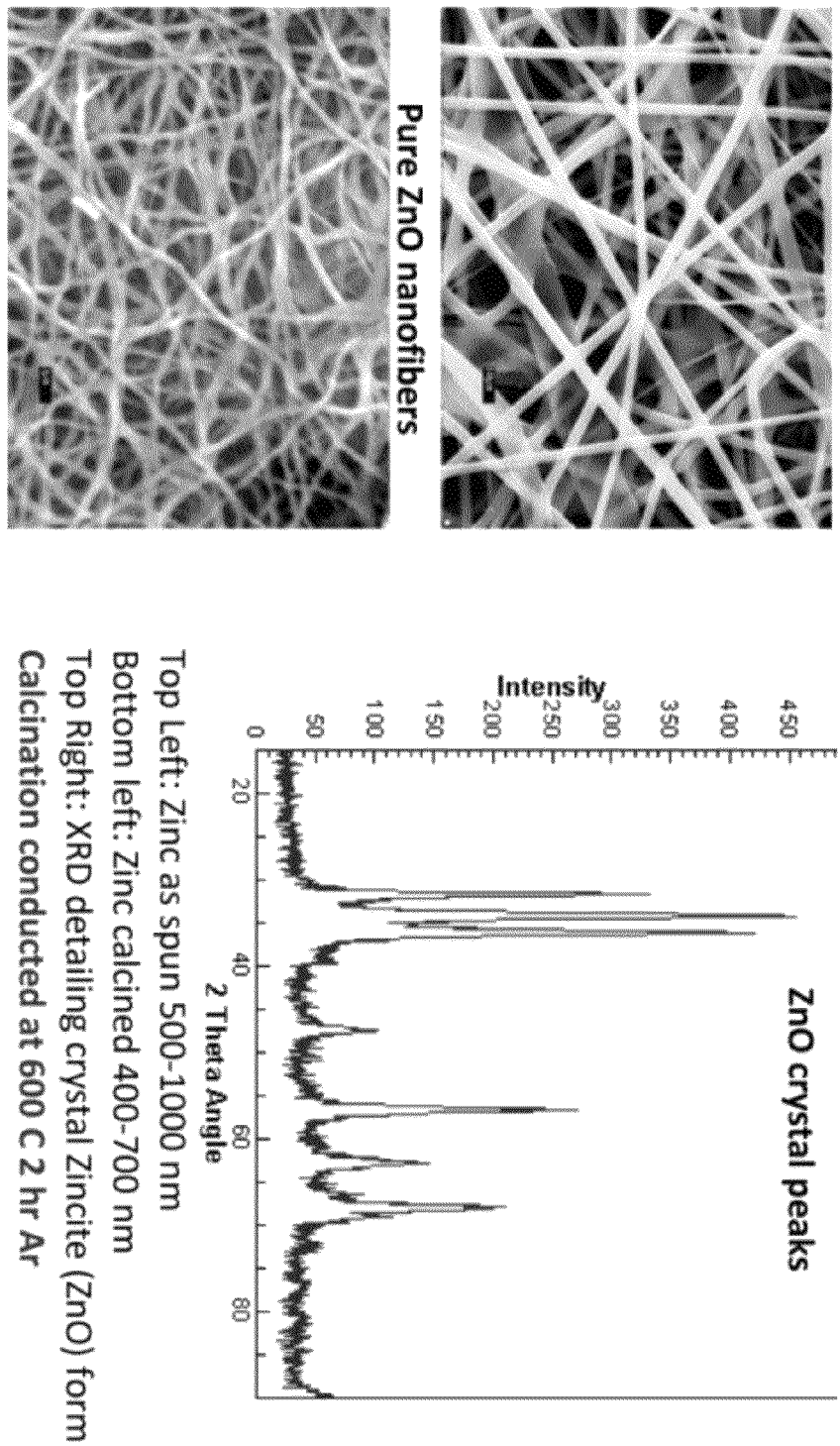
FIG. 9 shows micrographs and an x-ray diffraction plot of ZnO nanofibers.

Calcinating a Fluid Feed of Zinc Acetate and PVA to Create a Zinc Oxide Nanofiber Following the procedure of Example 1, a fluid stock of zinc acetate and PVA were prepared with ratios of precursor:polymer of 2:1. These fluid stocks were electrospun by the procedure of Example 3. The electrospun fluid stock was heated for 2 hours at 600° C. in an atmosphere of air. In order to visualize the nanofiber before and after calcination an SEM image was taken before and after calcination as depicted in FIG. 9. The diameter of the nanofiber was approximately 500-1000 nm as spun and 400-700 nm after calcination. An x-ray diffraction measurement indicates that that the nanofiber was substantially pure zinc oxide as depicted in FIG. 9.

Example 11

Figure 10:
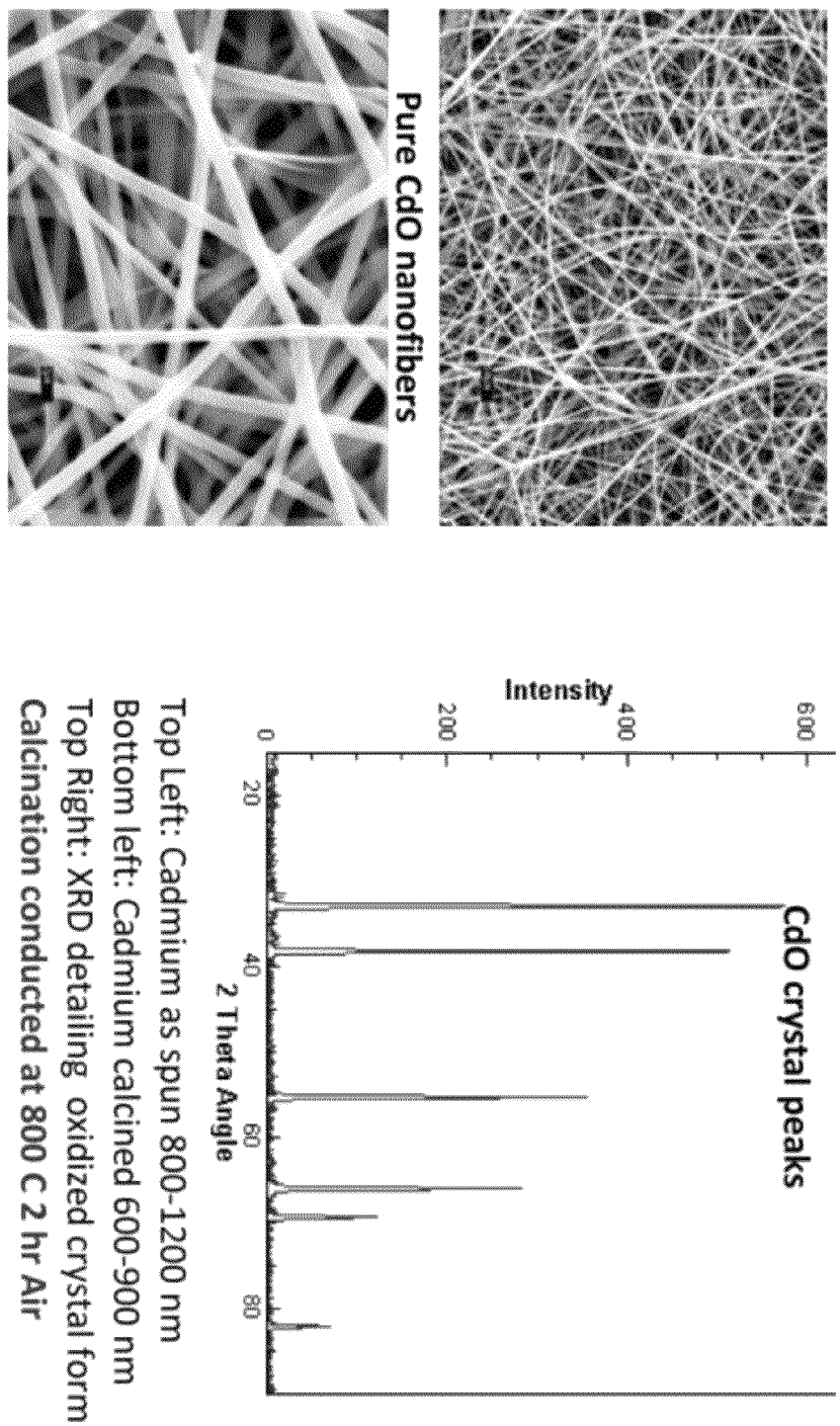
FIG. 10 shows micrographs and an x-ray diffraction plot of CdO nanofibers.

Calcinating a Fluid Feed of Cadmium Acetate and PVA to Create a Cadmium Nanofiber Following the procedure of Example 1, a fluid stock of cadmium acetate and PVA were prepared with ratios of precursor:polymer of 2:1. These fluid stocks were electrospun by the procedure of Example 3. The electrospun fluid stock was heated for 2 hours at 800° C. in an atmosphere of air. In order to visualize the nanofiber before and after calcination an SEM image was taken before and after calcination as depicted in FIG. 10. The diameter of the nanofiber was approximately 800-1200 nm as spun and 600-900 nm after calcination. An x-ray diffraction measurement indicates that that the nanofiber was substantially pure cadmium as depicted in FIG. 10.

Example 12

Figure 11:
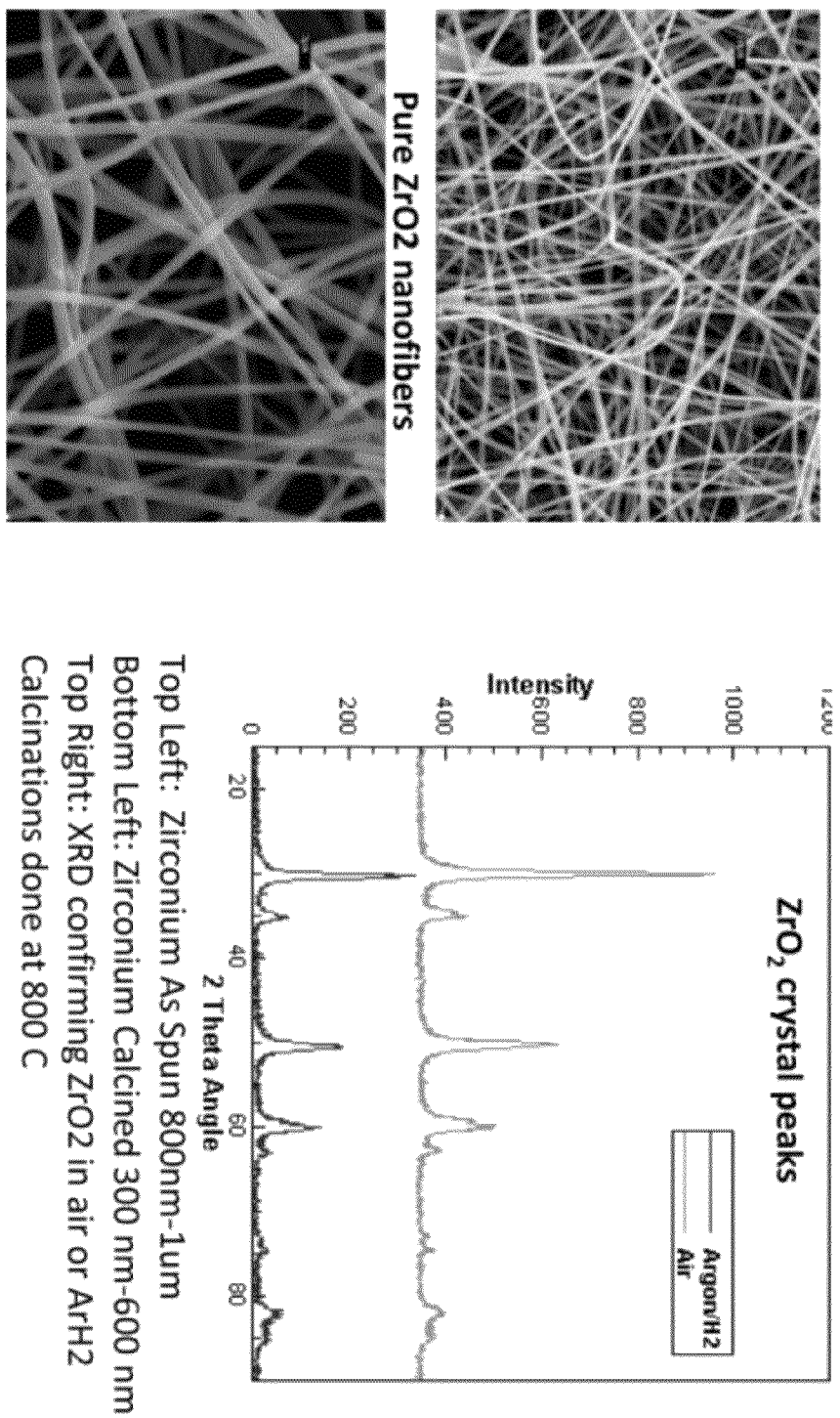
FIG. 11 shows micrographs and an x-ray diffraction plot of $ZrO_2$ nanofibers.

Calcinating a Fluid Feed of Zirconium Acetate and PVA to Create a Zirconia Nanofiber Following the procedure of Example 1, a fluid stock of zirconium acetate and PVA were prepared with ratios of precursor:polymer of 2:1. These fluid stocks were electrospun by the procedure of Example 3. The electrospun fluid stock was heated for 2 hours at 800° C. in an atmosphere of air or 94% Ar and 6% $H_2$ gas. In order to visualize the nanofiber before and after calcination an SEM image was taken before and after calcination as depicted in FIG. 10. The diameter of the nanofiber was approximately 800-1000 nm as spun and 300-600 nm after calcination. An x-ray diffraction measurement indicates that the nanofiber was substantially pure zirconia as depicted in FIG. 11.

Example 13

Calcinating a Fluid Feed of Lead Acetate and PVA to Create a Lead Nanofiber

Figure 12:
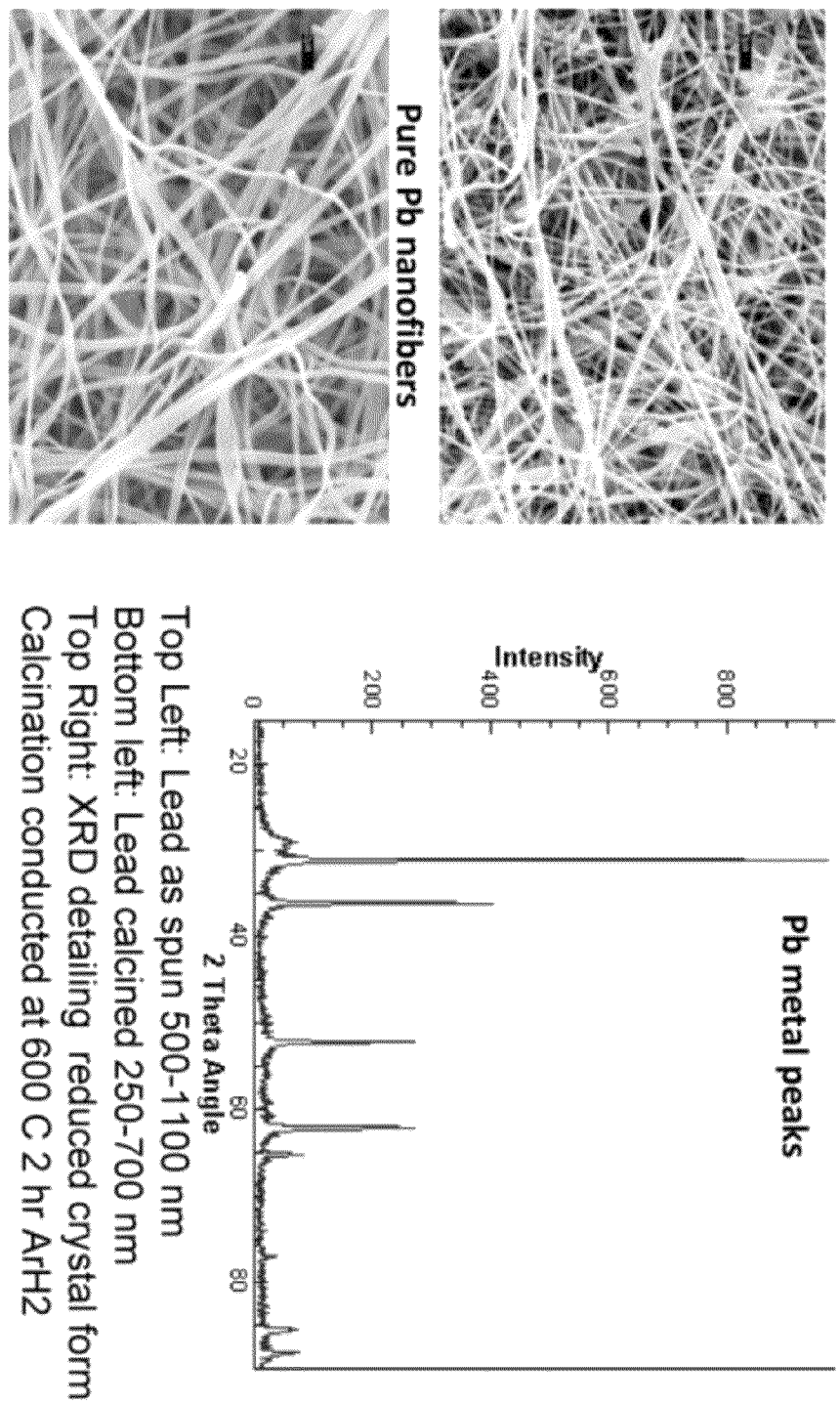
FIG. 12 shows micrographs and an x-ray diffraction plot of Pb nanofibers.

Following the procedure of Example 1, a fluid stock of lead acetate and PVA were prepared with ratios of precursor:polymer of 2:1. These fluid stocks were electrospun by the procedure of Example 3. The electrospun fluid stock was heated for 2 hours at 600° C. in an atmosphere of 94% Ar and 6% $H_2$ gas. In order to visualize the nanofiber before and after calcination an SEM image was taken before and after calcination as depicted in FIG. 10. The diameter of the nanofiber was approximately 500-1200 nm as spun and 250-700 nm after calcination. An x-ray diffraction measurement indicates that that the nanofiber was substantially pure lead as depicted in FIG. 12.

Example 14

Exploring the Loading of Nickel Acetates on PVA

Figure 13:
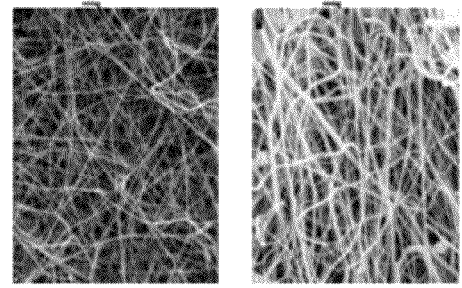
FIG. 13 shows micrographs demonstrating the effect of precursor loading on fiber morphology.
Figure 13:
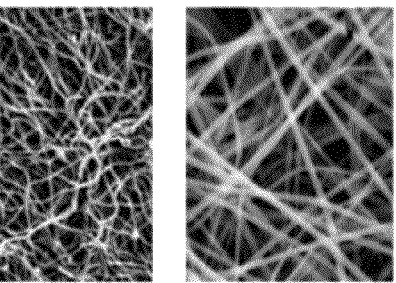
Figure 13:
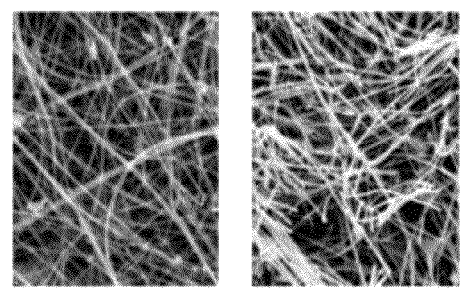
Figure 13:
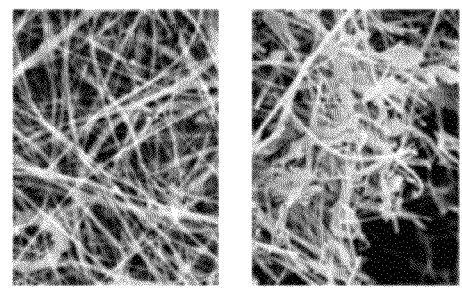
Figure 14:
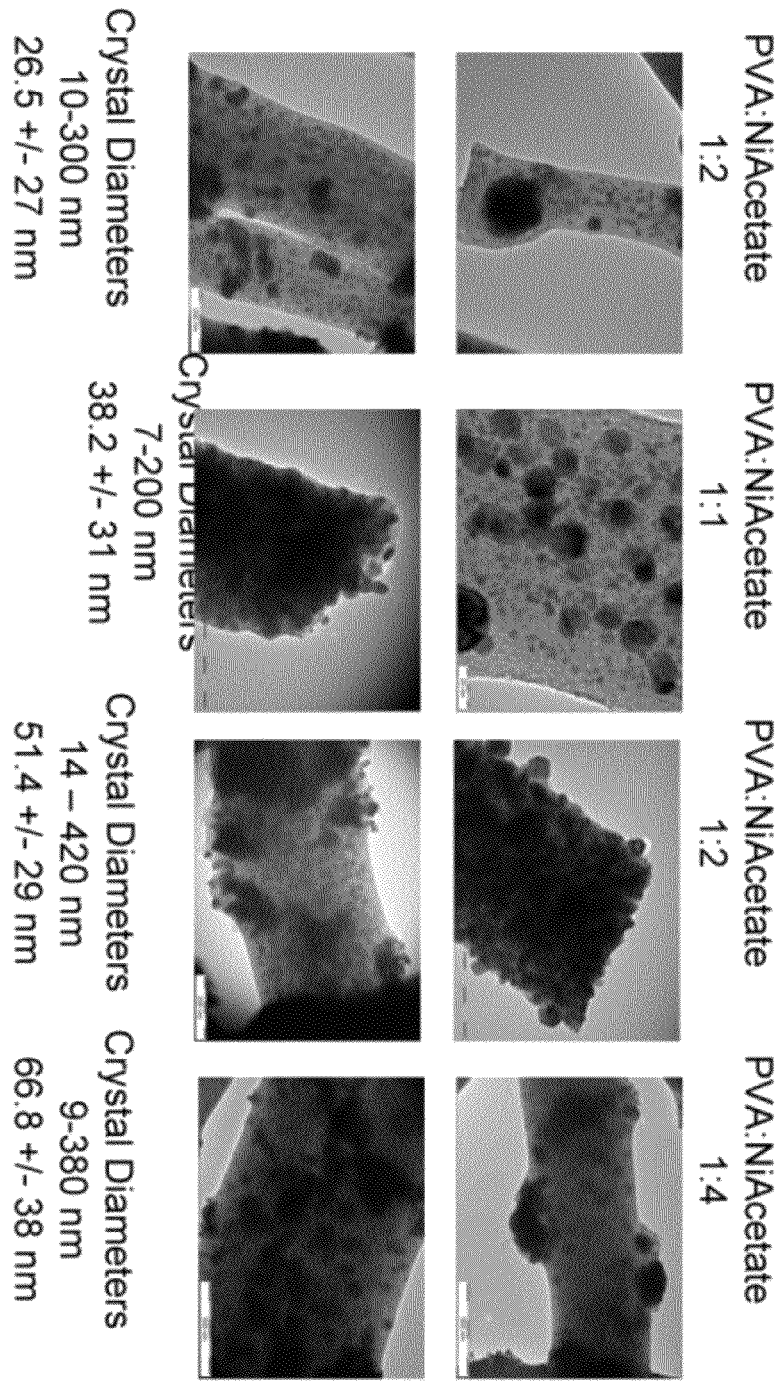
FIG. 14 shows TEM micrographs demonstrating the substantial lack of voids in nanofibers.

Following the procedure of Example 1, various fluid stocks of nickel acetate and PVA were prepared with ratios of precursor:polymer of 1:2, 1:1, 2:1, and 4:1. These fluid stocks were electrospun by the procedure of Example 3. At that point, 4 SEM micrographs were taken of the electrospun fluid stock. The electrospun fluid stock was then calcinated by the procedure of Example 4 to create pure Ni nanofibers. At that point, 4 micrographs were taken of the calcinated nanofibers. FIG. 13 shows that the diameter of the nanofibers increased with higher loading of precursor. It also shows that continuous, high-quality nanofibers were formed, particularly at high loading of precursor. TEM micrographs were also taken of the calcinated nanofibers. FIG. 14 shows that there are no voids in the nanofibers, confirming that they are dense and coherent.

Example 15

Investigation of the Atomic Composition of a Pure Nickel Nanofiber

Figure 15:
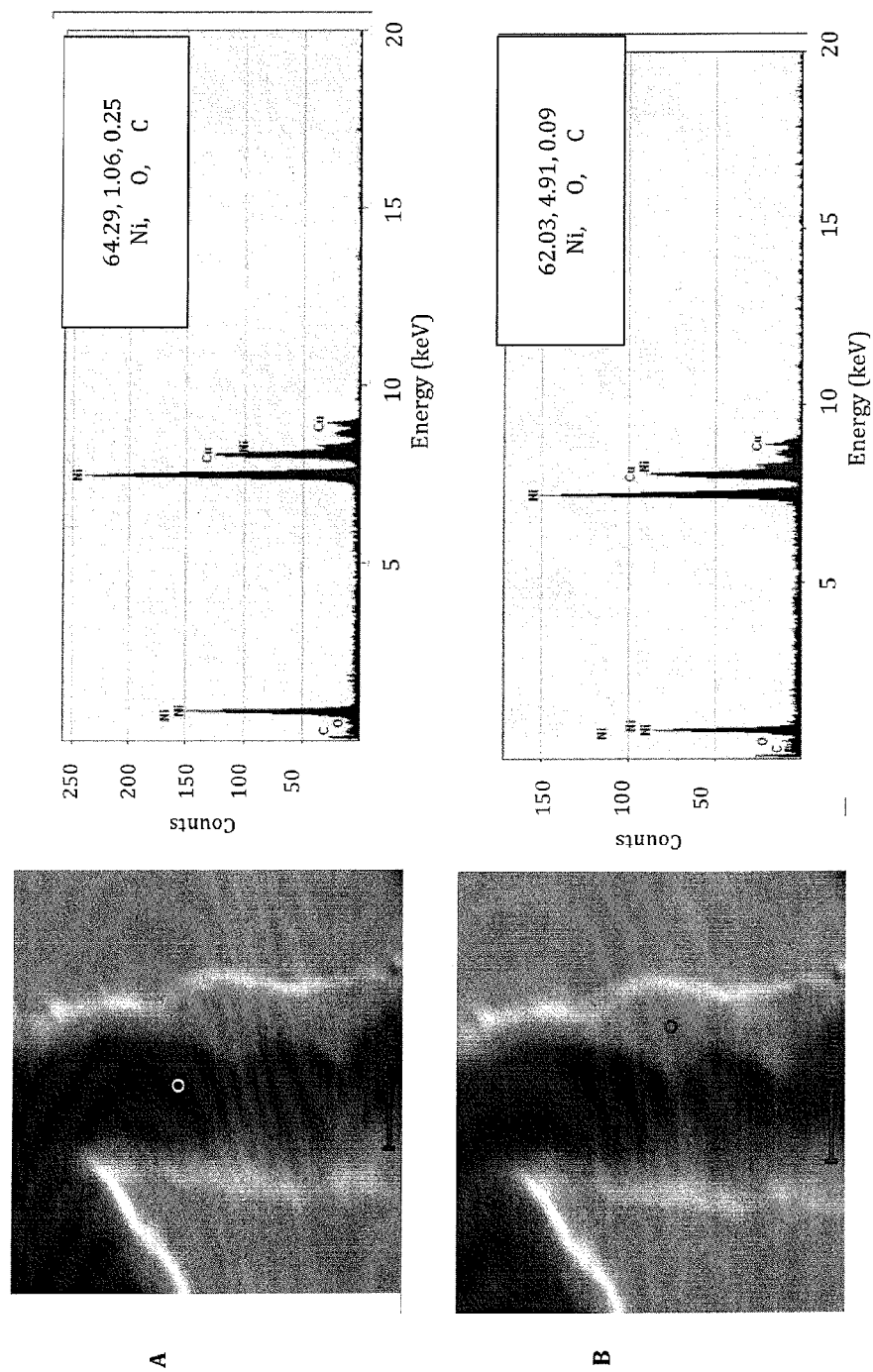
FIG. 15 shows elemental analysis of pure Ni nanofibers.

Energy-dispersive x-ray spectroscopy (EDX) was used to measure the elemental composition of a pure nickel nanofiber. FIG. 15 shows that for both dark (panel A) and bright (panel B) regions of the TEM images, the majority of the nanofiber is Ni with a small oxygen content. Negligible amounts of carbon are detected.

Example 16

Preparing a PbSe Alloy Nanofiber

Figure 23:
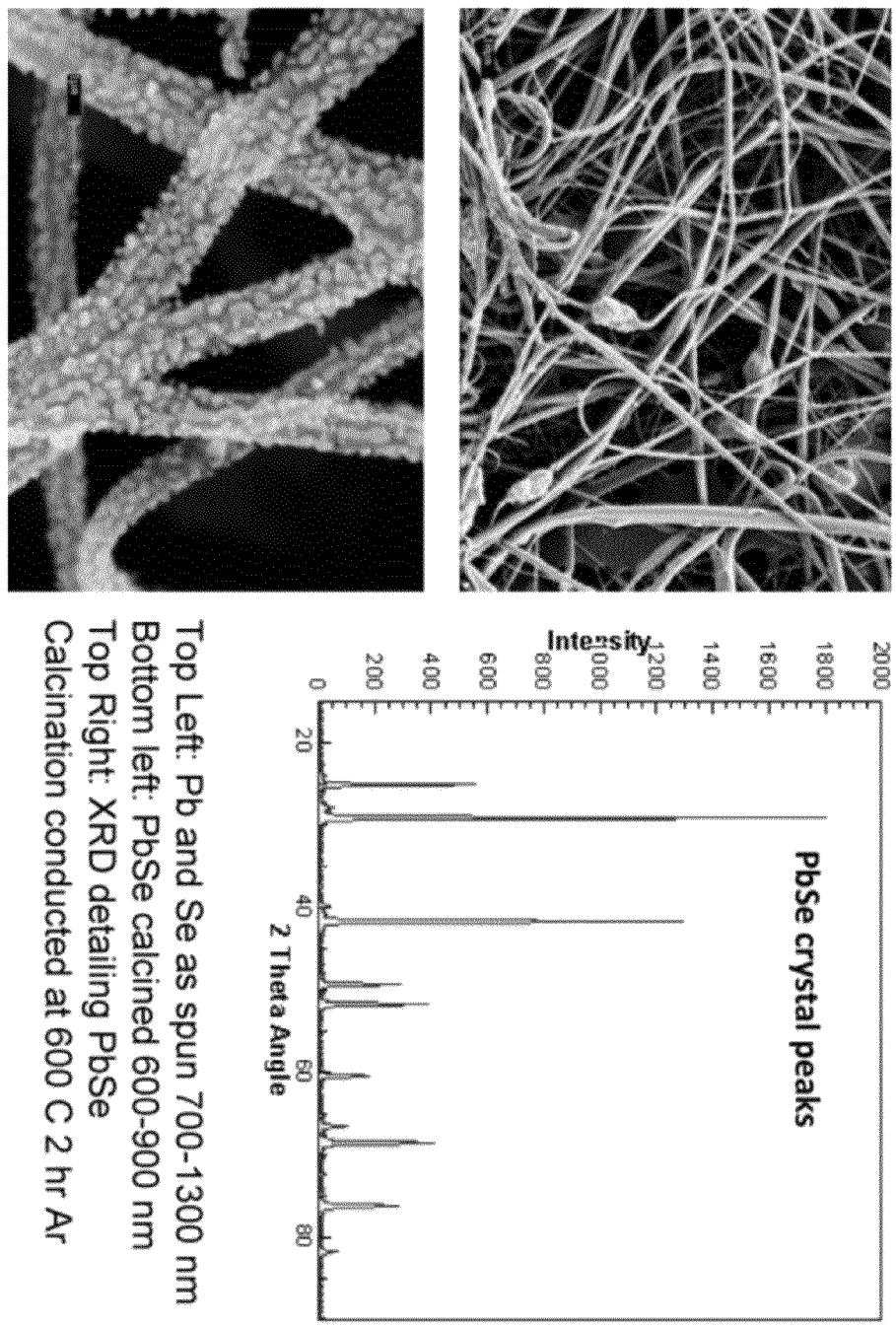
FIG. 23 shows micrographs and an x-ray diffraction plot of PbSe alloy nanofibers.
Figure 24:
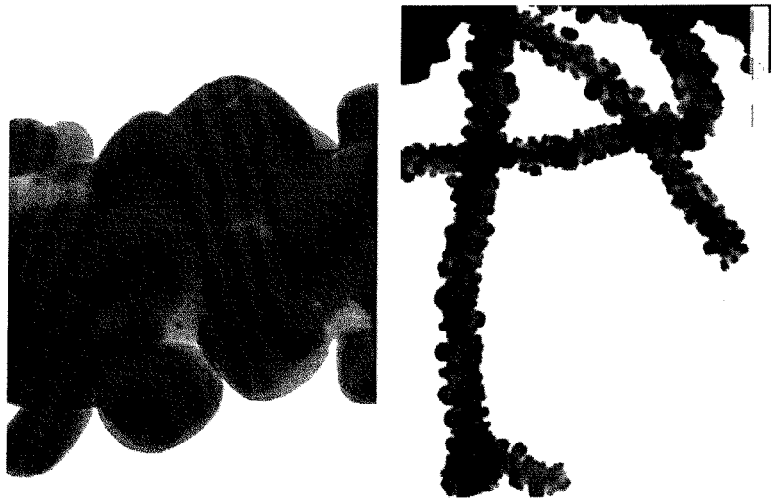
FIG. 24 shows TEM micrographs of CdSe and PbSe alloy nanofibers.
Figure 24:
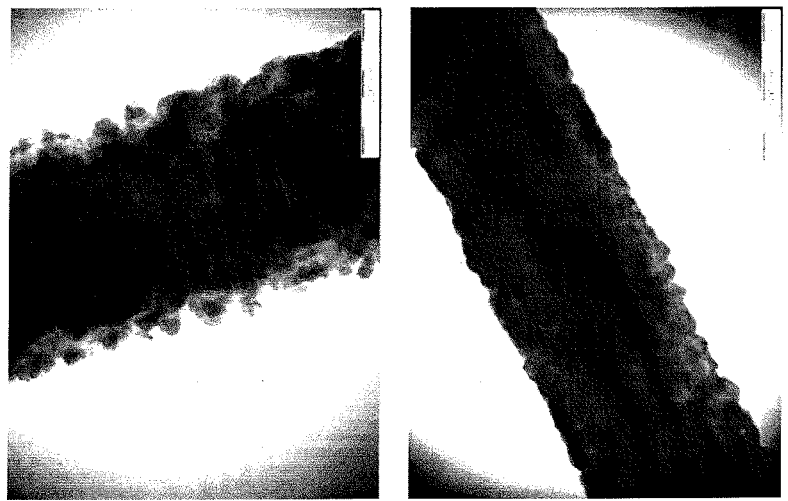

A mixture of 50% Pb and 50% Se were formed from lead acetate and Se powder according to the procedures of Example 1. The precursors were further made into a fluid stock with PVA according to the procedure of Example 1 and electrospun according to the procedure of Example 3. The electrospun fluid stock was calcinated by heating for 2 hours at 600° C. in an atmosphere of 100% Ar. Micrographs (FIG. 23) show continuous metal alloy nanofibers and TEM micrographs (FIG. 24) show that they are dense and coherent.

Example 17

Investigation of the Atomic Composition of a PbSe Alloy Nanofiber

Figure 25:
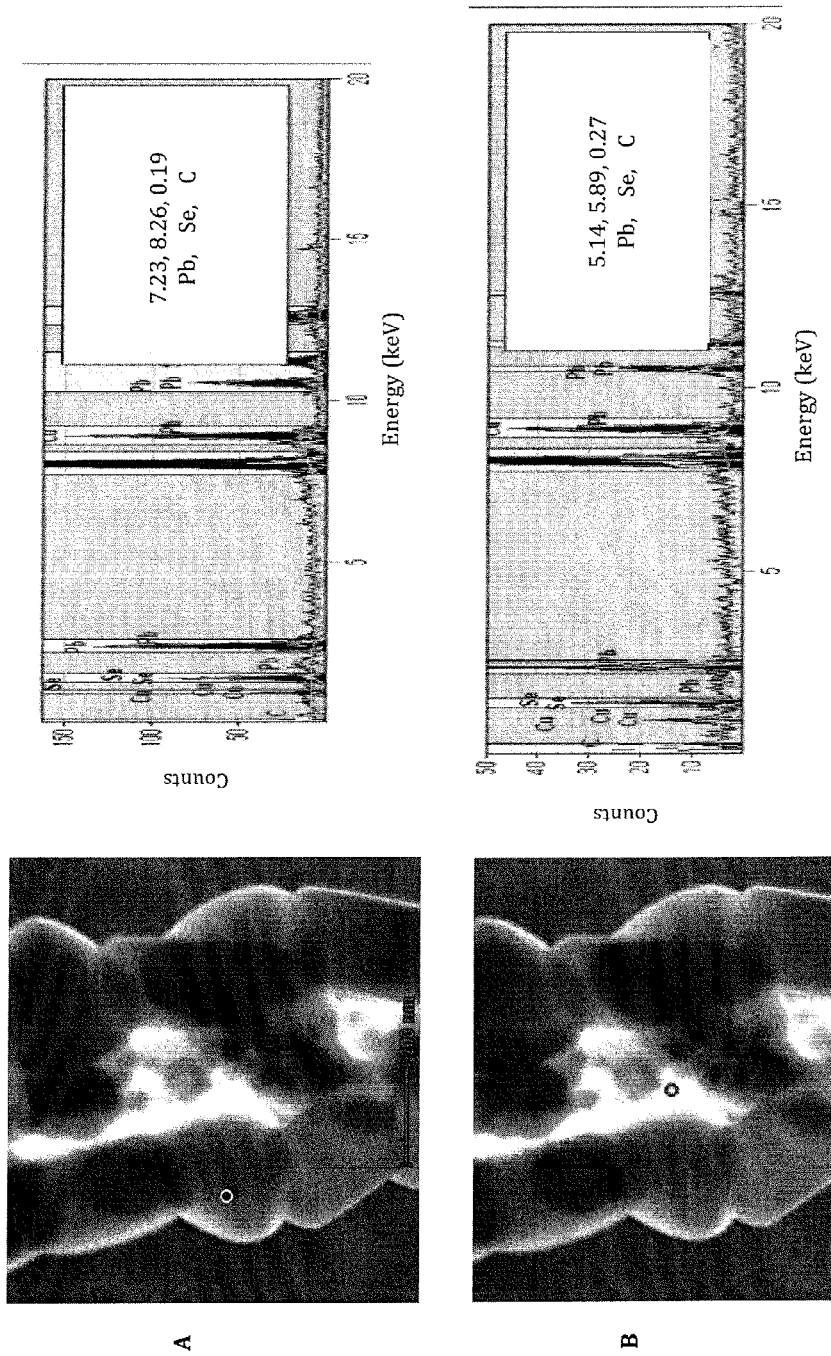
FIG. 25 shows elemental analysis of PbSe alloy nanofibers.

Energy-dispersive x-ray spectroscopy (EDX) was used to measure the elemental composition of the PbSe alloy nanofiber produced in Example 16. FIG. 25 shows that for both dark (panel A) and bright (panel B) regions of the TEM images, the composition of Pb to Se is maintained as relatively equal. Negligible amounts of carbon are detected.

Example 18

Investigation of the Electrical Conductivities of Pure Metal Nanofibers

Figure 30:
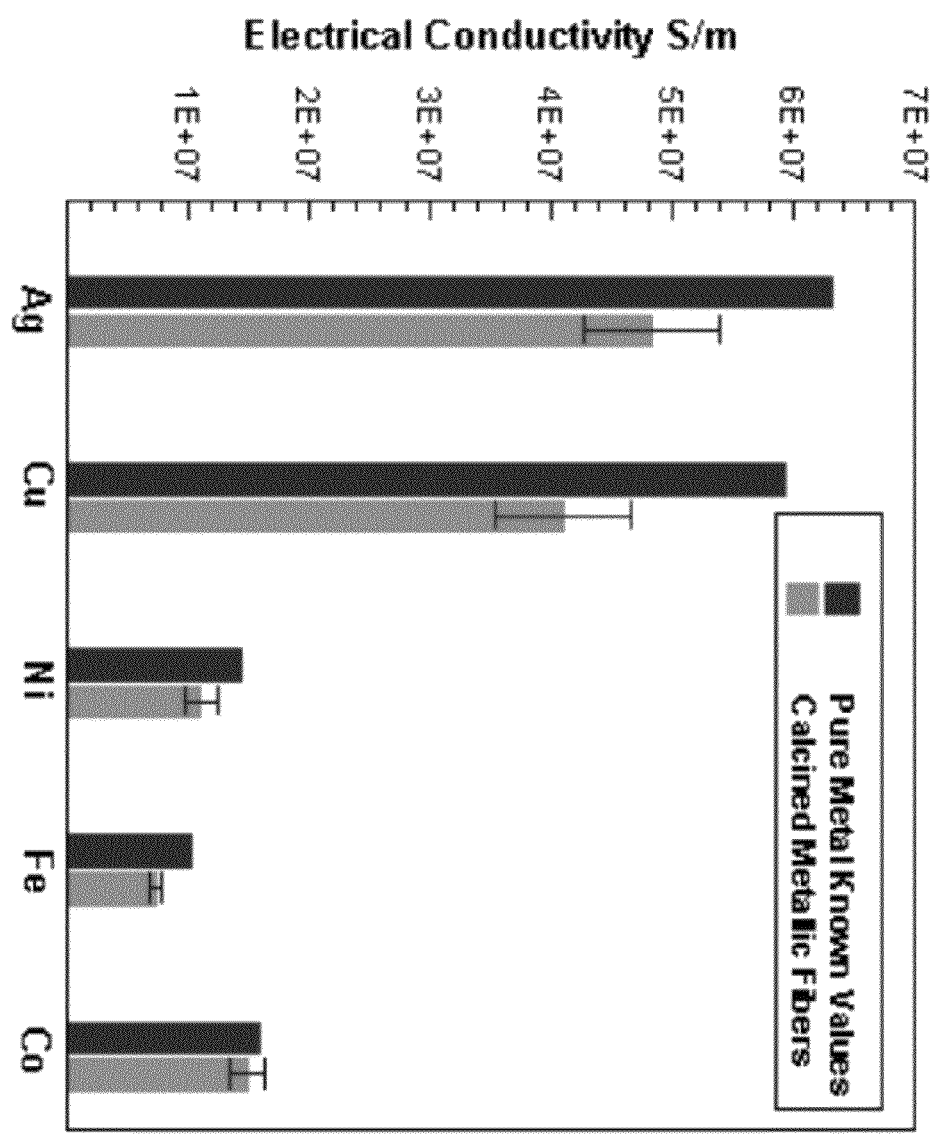
FIG. 30 shows a graphic comparing the electrical conductivity of metal nanofibers to the conductivity of a metallic film.

A two point probe was used to measure the electric conductivity of various pure metal nanofiber mats. FIG. 30 shows that calcinated pure metal nanofibers prepared by the methods of the disclosure exhibit very high conductivity (greater than $10^6$ S/m) and are nearly as conductive as the known conductivity of the metal when formed into a sheet.

Example 19

Preparing a ZrO$_2$/Ni Hybrid Nanofiber

Figure 31:
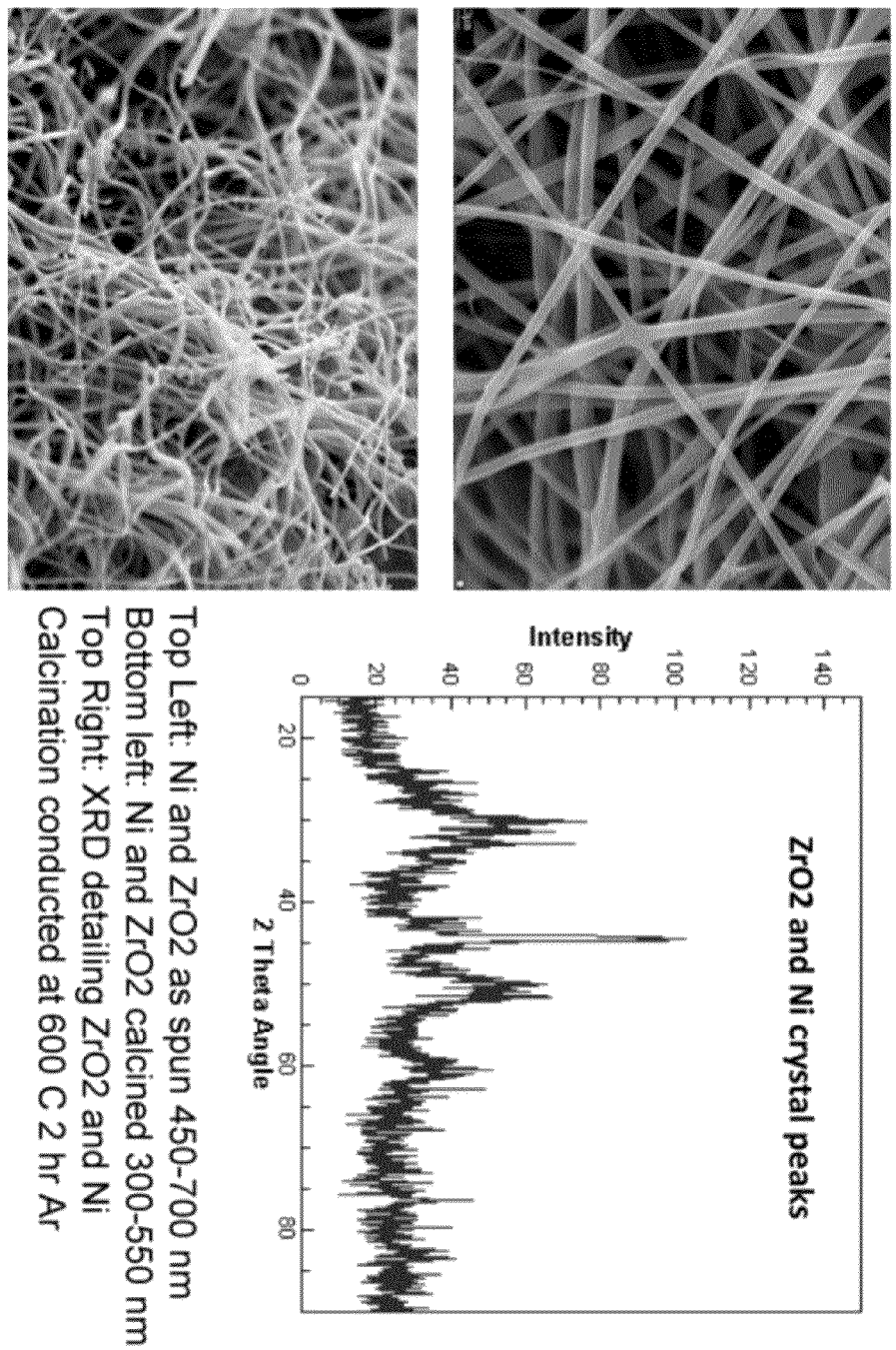
FIG. 31 shows micrographs and an x-ray diffraction plot of $Ni/ZrO_2$ hybrid nanofibers.
Figure 32:
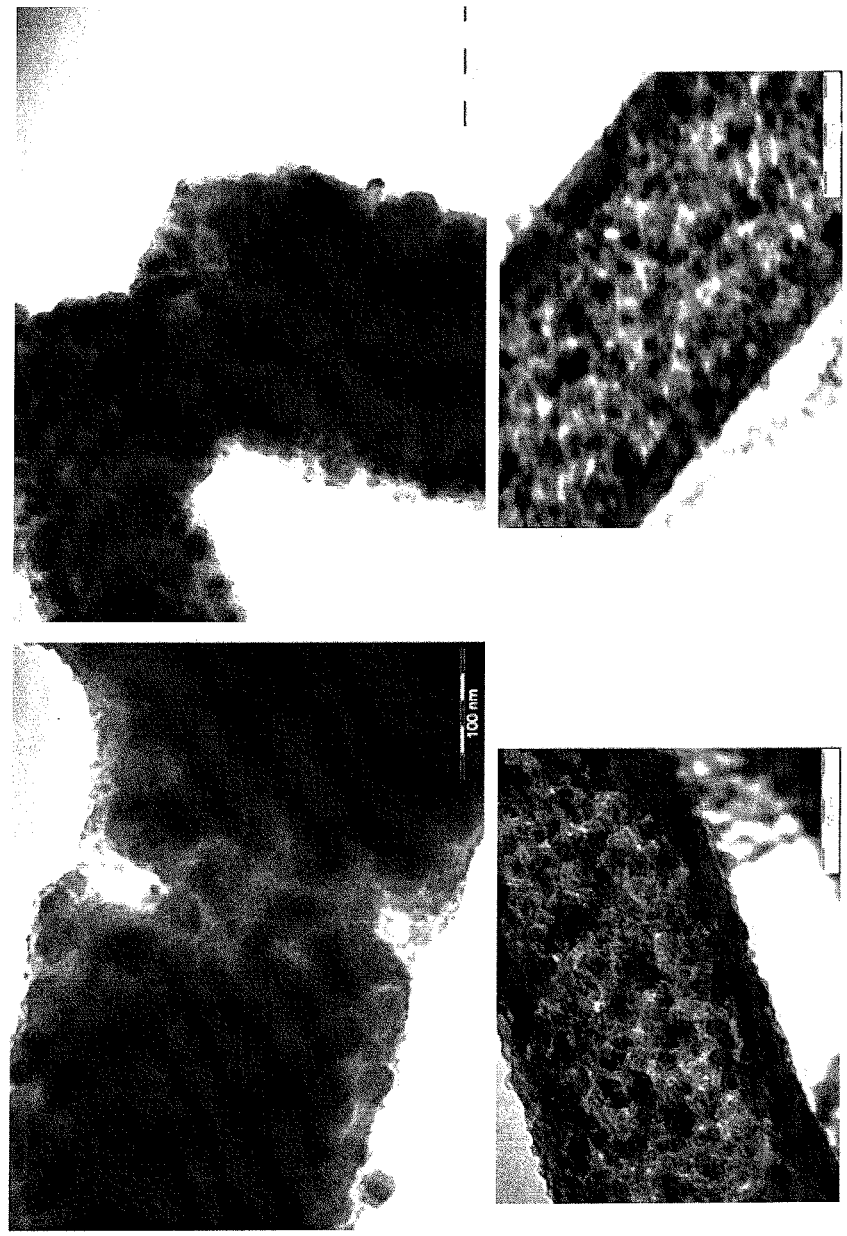
FIG. 32 shows TEM micrographs of $Ni/ZrO_2$ hybrid nanofibers.

Fluid feeds of ZrO$_2$ acetate and Ni acetate were prepared according to the procedure of Example 1. The two fluid stocks were then electrospun in a co-axial manner using a spinneret similar to the one depicted in FIG. 35. The center conduit contained Ni acetate fluid stock (not air as depicted in FIG. 35) and the outer conduit contained ZrO$_2$ fluid stock. The electrospinning procedure was gas-assisted. The electrospun hybrid fluid stock was calcinated by heating for 2 hours at 600° C. in an atmosphere of 100% Ar. Micrographs (FIG. 31) show continuous metal alloy nanofibers and TEM micrographs (FIG. 32) show that they are dense and coherent.

Example 20

Investigation of the Atomic Composition of a ZrO$_2$/Ni Hybrid Nanofiber

Figure 33:
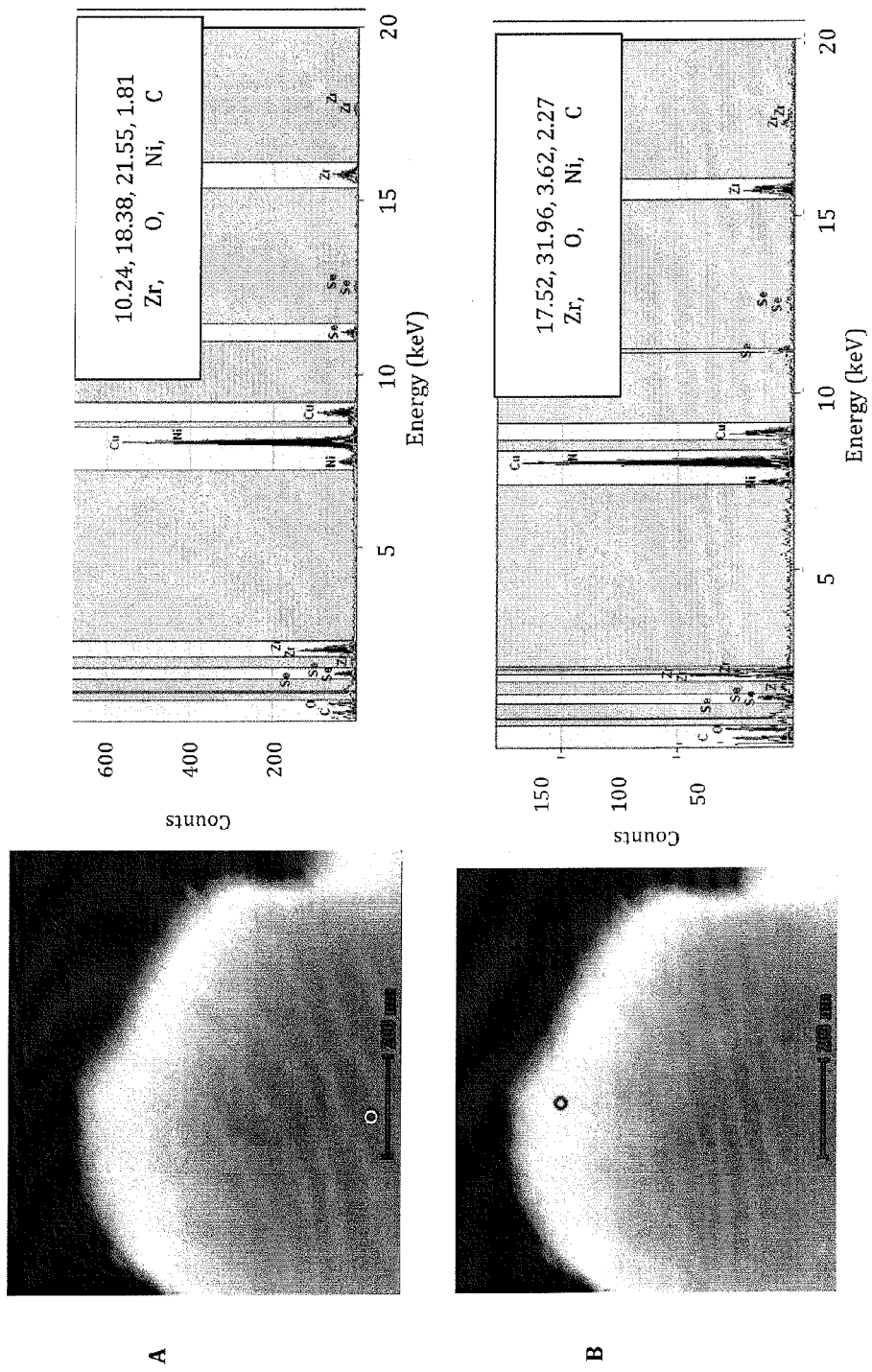
FIG. 33 shows elemental analysis of $Ni/ZrO_2$ hybrid nanofibers.

Energy-dispersive x-ray spectroscopy (EDX) was used to measure the elemental composition of the ZrO2/Ni hybrid nanofiber produced in Example 19. FIG. 33 shows that the dark (panel A) and bright (panel B) regions of the TEM images have different compositions. There is much more nickel in the center (left, dark) than on the exterior (right, light). Furthermore, the EDAX shows that the ratio of Zr to 0 was 1:2 for both cases, indicated the formation of ZrO2.

Example 21

Fuel Cells Electrodes

Figure 34:
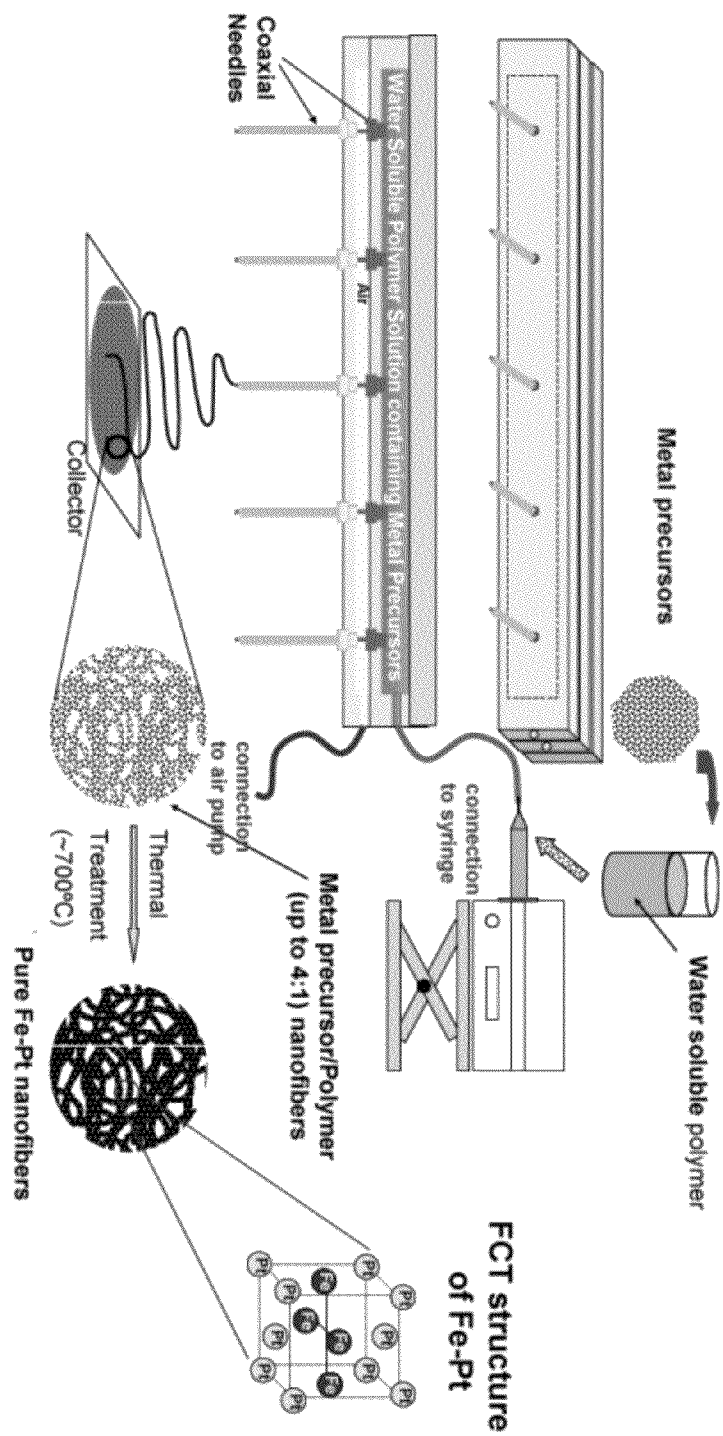
FIG. 34 shows a schematic of the process and system for producing Fe/Pt nanofibers suitable for use in fuel cells.

Disclosed herein are fuel cell electrodes that include Fe—Pt nanofibers. These nanofibers may be prepared according to the procedures and system depicted in FIG. 34. Water-soluble Fe and Pt acetates are mixed with a water-soluble polymer such as PVA to create a fluid stock as in Example 1. The ratio of precursor to polymer is 4:1 in this example. In addition, gas assisted electrospinning will be adapted to increase the throughput. We have demonstrated that the nanofiber production rate can be increased by more than ten times by incorporate air flow into the sheath jet layer in a coaxial scheme. As depicted in FIG. 34, the spinning dope can be prepared by adding an adequate ratio of Fe to Pt precursors to aqueous polymer solution and is used as the core jet in coaxial electrospinning, while a high-speed air stream is used as the sheath layer jet to stretch the core jet of precursor solution. The creation of the face-centered tetragonal structure of Fe—Pt is pursued to enhance oxygen reduction and durability under the minimized Pt loading.

Example 22

Hollow Si or Ge Nanofibers Suitable for Lithium Ion Battery Anodes

FIG. 35 shows an apparatus suitable for producing hollow Si or Ge nanofibers suitable for use as anodes in lithium ion batteries. The high speed air and Si or Ge precursor solution form the core and sheath jets in gas-assisted coaxial electro-spinning.

Example 23

Al$_2$O$_3$/ITO Hybrid Nanofibers Suitable for Use in Flexible Solar Cells

Figure 36:
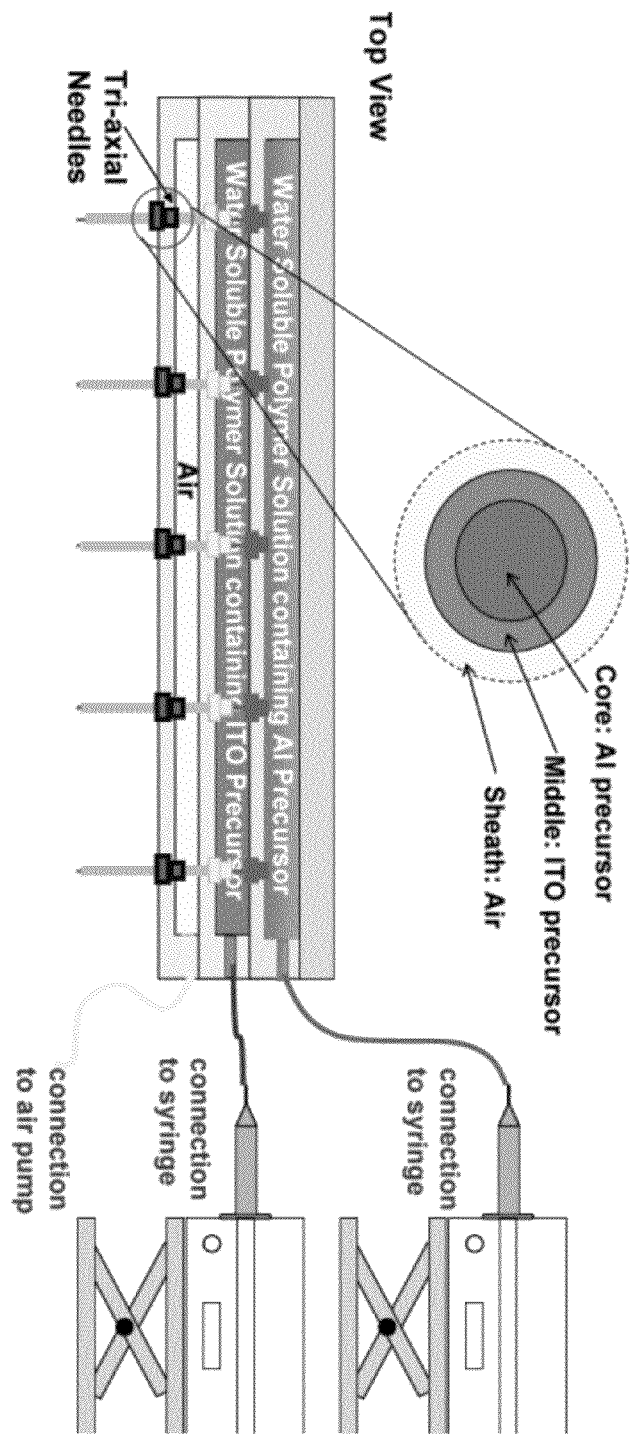
FIG. 36 shows a schematic of the process and system for producing $Al_2O_3$/ITO hybrid nanofibers suitable for use in flexible solar cells.
Figure 37:
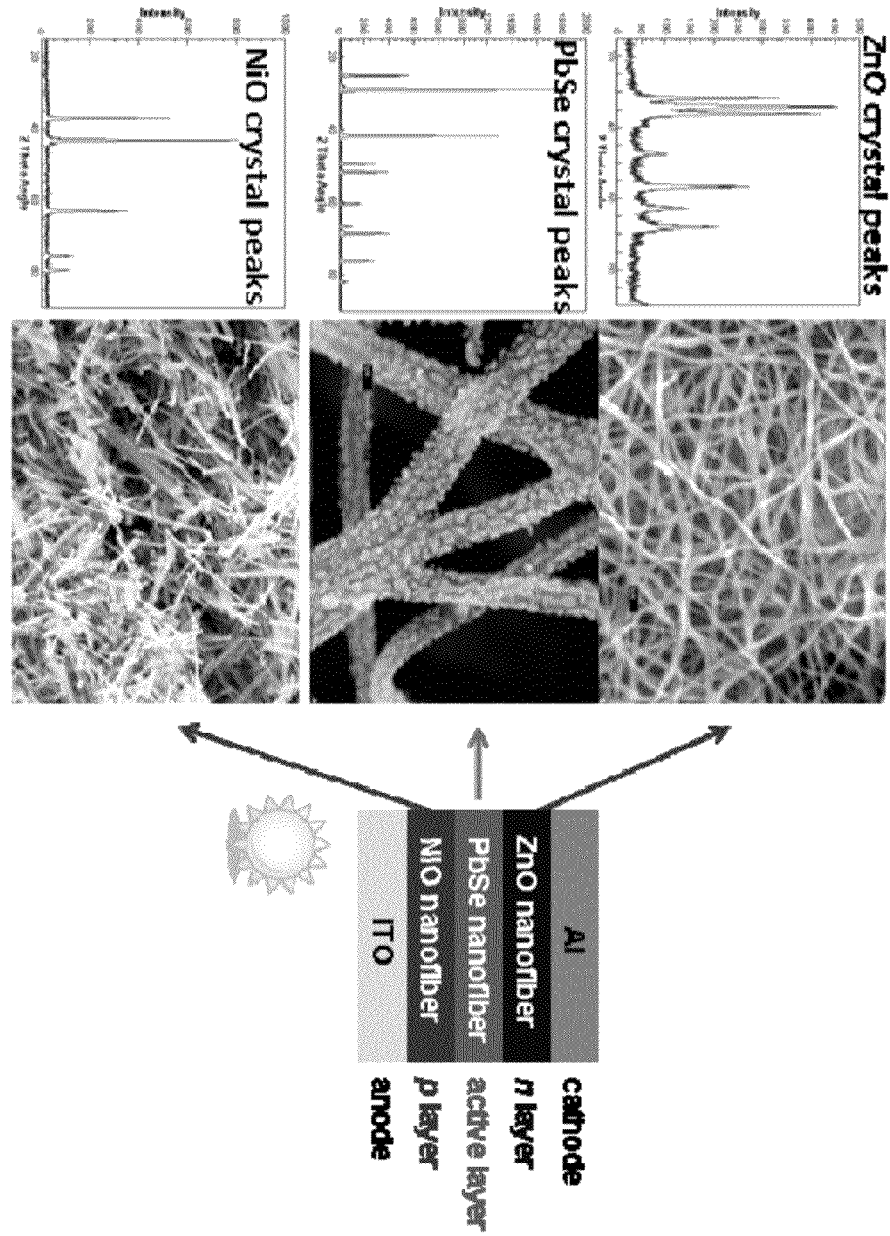
FIG. 37 shows micrographs, x-ray diffraction plots and a schematic for a solar cell with a plurality of components made from nanofibers.

FIG. 36 shows a schematic of the process and system for producing Al$_2$O$_3$/ITO hybrid nanofibers suitable for use in flexible solar cells. Triaxial configuration of Al$_2$O$_3$/ITO/air in gas-assisted electrospinning is utilized to produce a coaxial Al$_2$O$_3$/ITO nanofiber. FIG. 37 shows micrographs, x-ray diffraction plots and a schematic for a solar cell with a plurality of components made from nanofibers.

Example 24

Further Examples of Nanofibers

Figure 16:
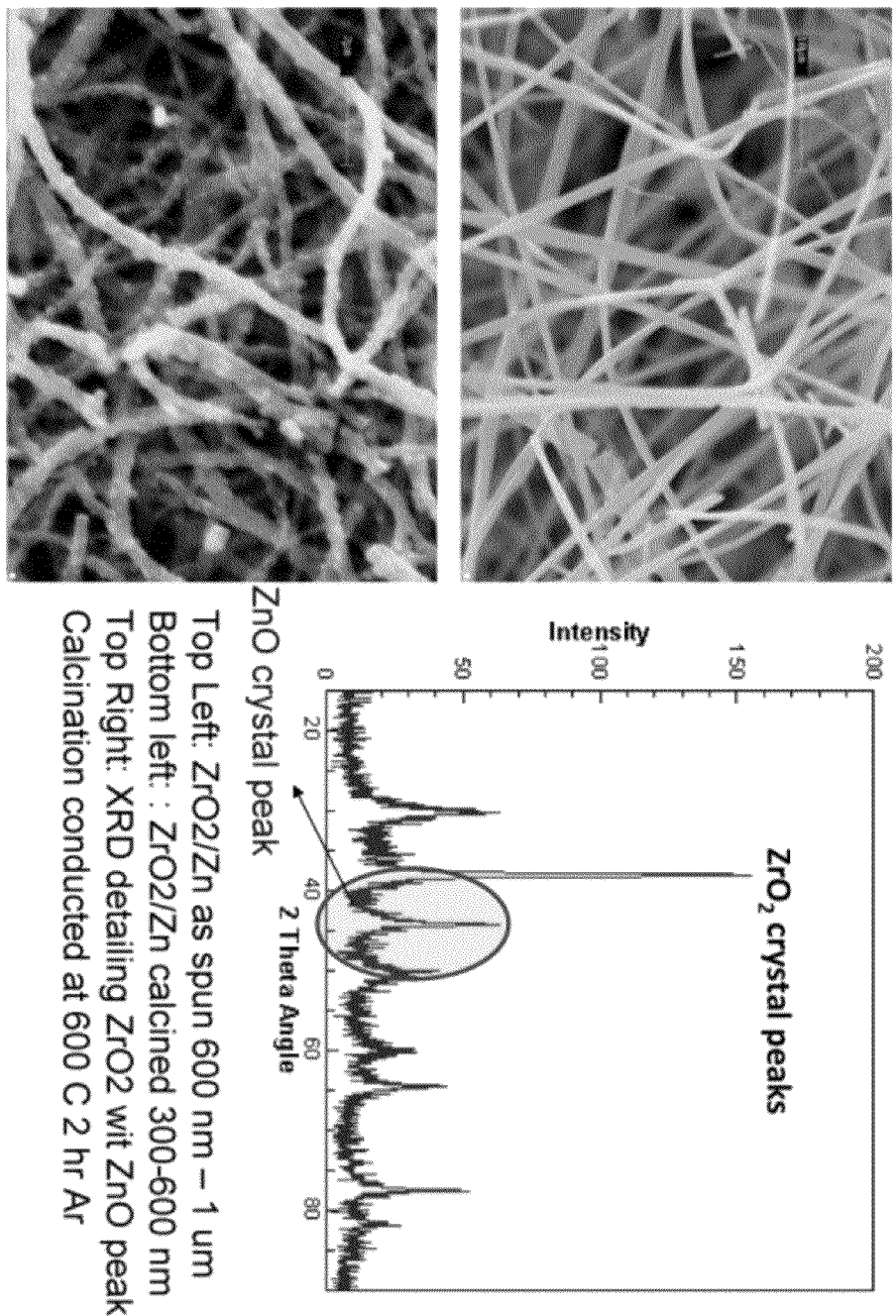
FIG. 16 shows micrographs and an x-ray diffraction plot of $ZnO/ZrO_2$ hybrid nanofibers.
Figure 17:
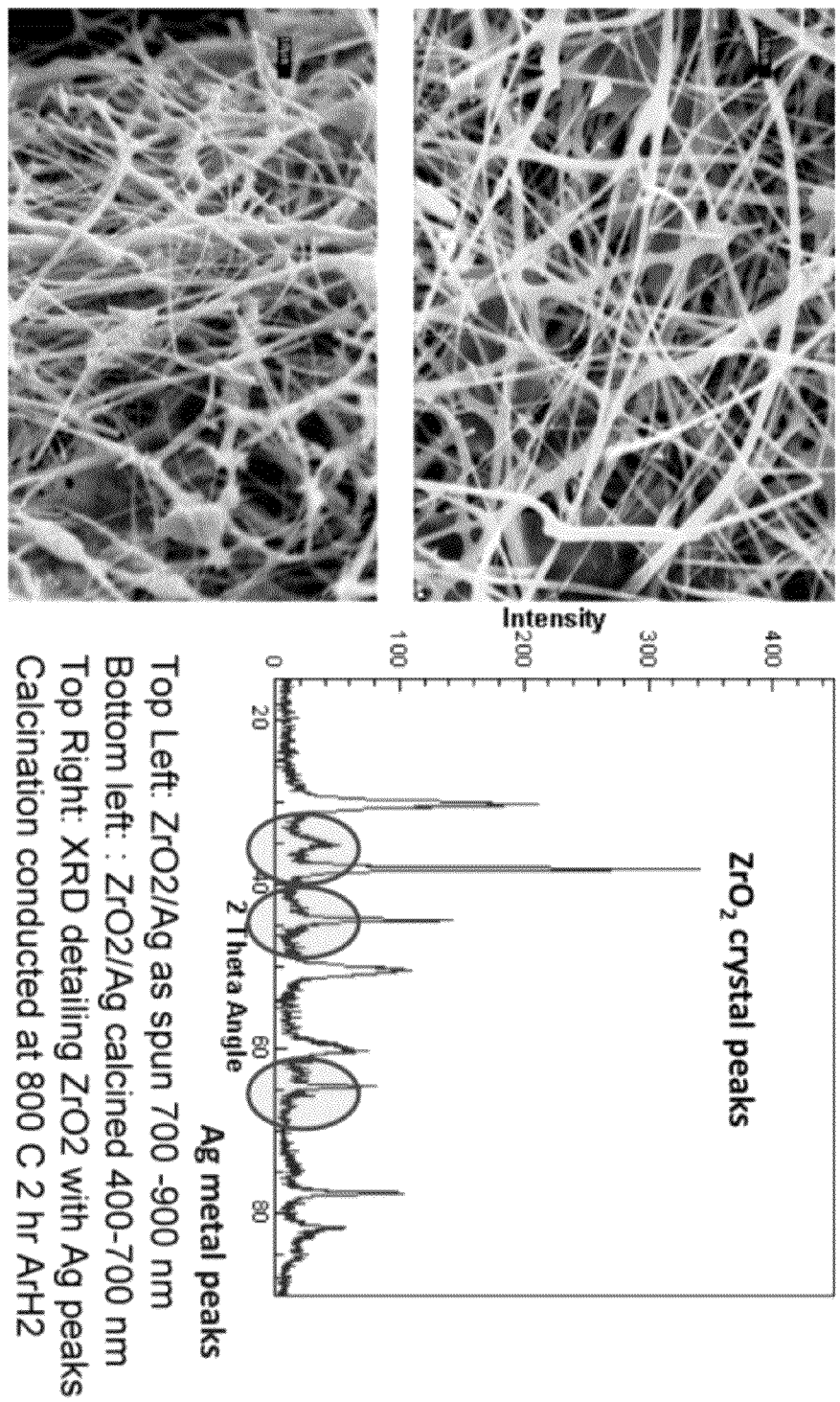
FIG. 17 shows micrographs and an x-ray diffraction plot of $Ag/ZrO_2$ hybrid nanofibers.
Figure 18:
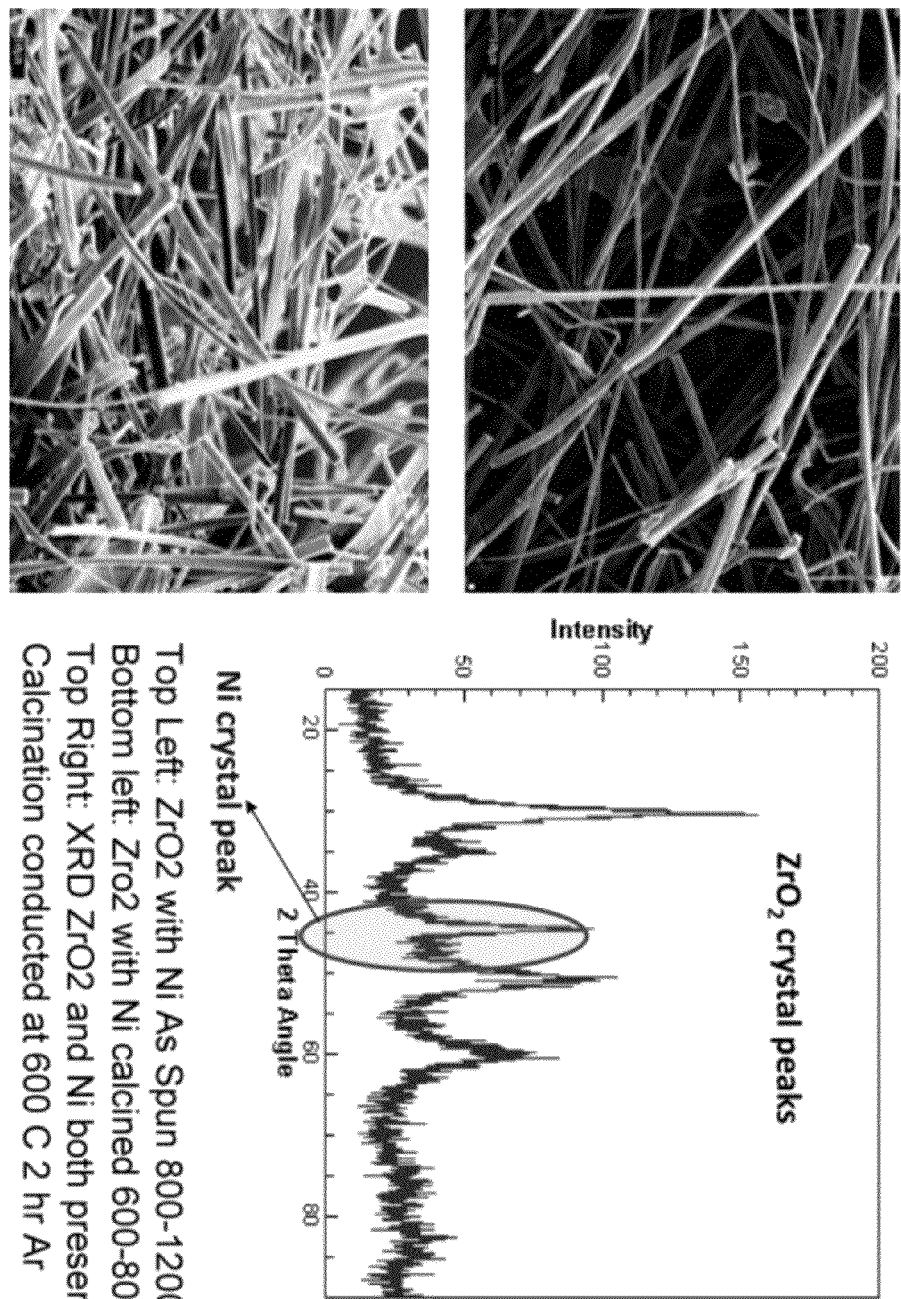
FIG. 18 shows micrographs and an x-ray diffraction plot of $Ni/ZrO_2$ hybrid nanofibers.
Figure 19:
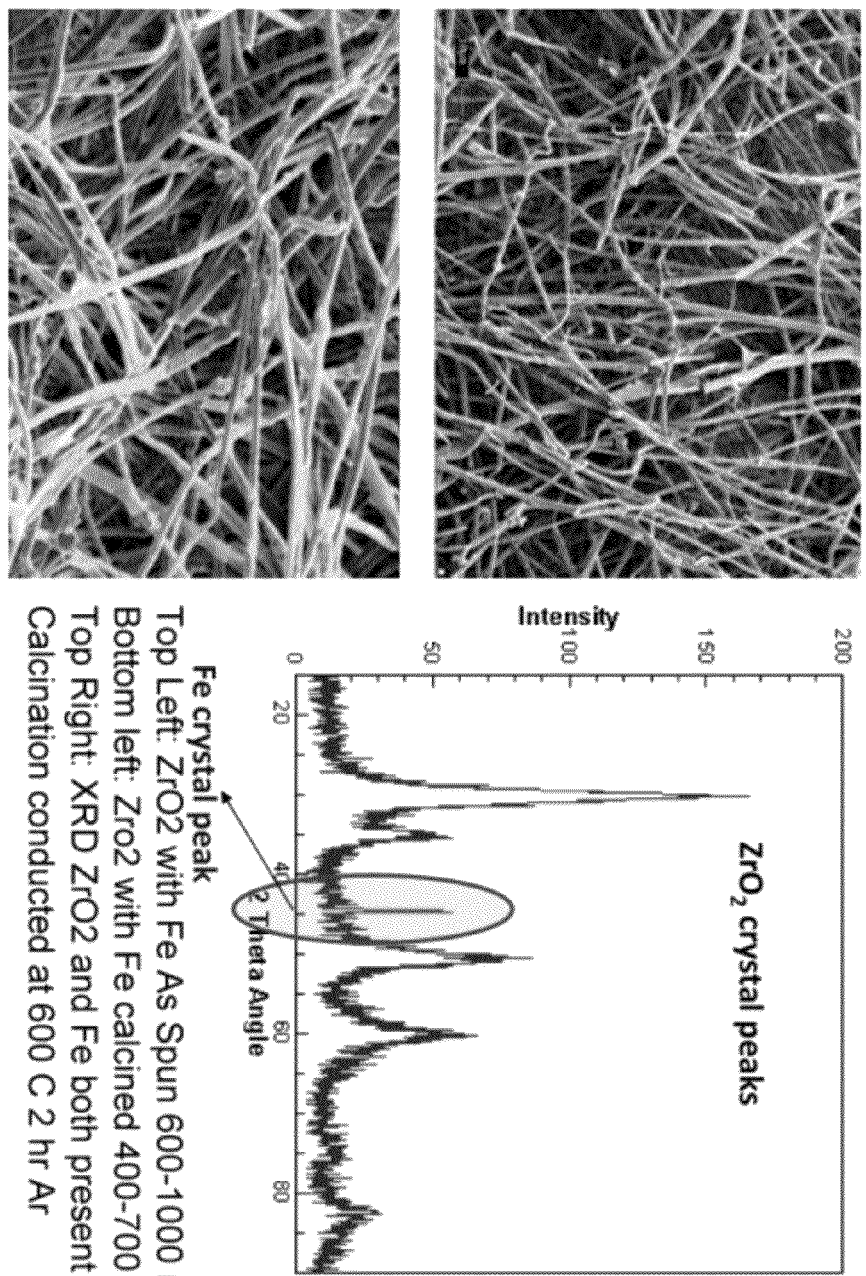
FIG. 19 shows micrographs and an x-ray diffraction plot of $Fe/ZrO_2$ hybrid nanofibers.
Figure 21:
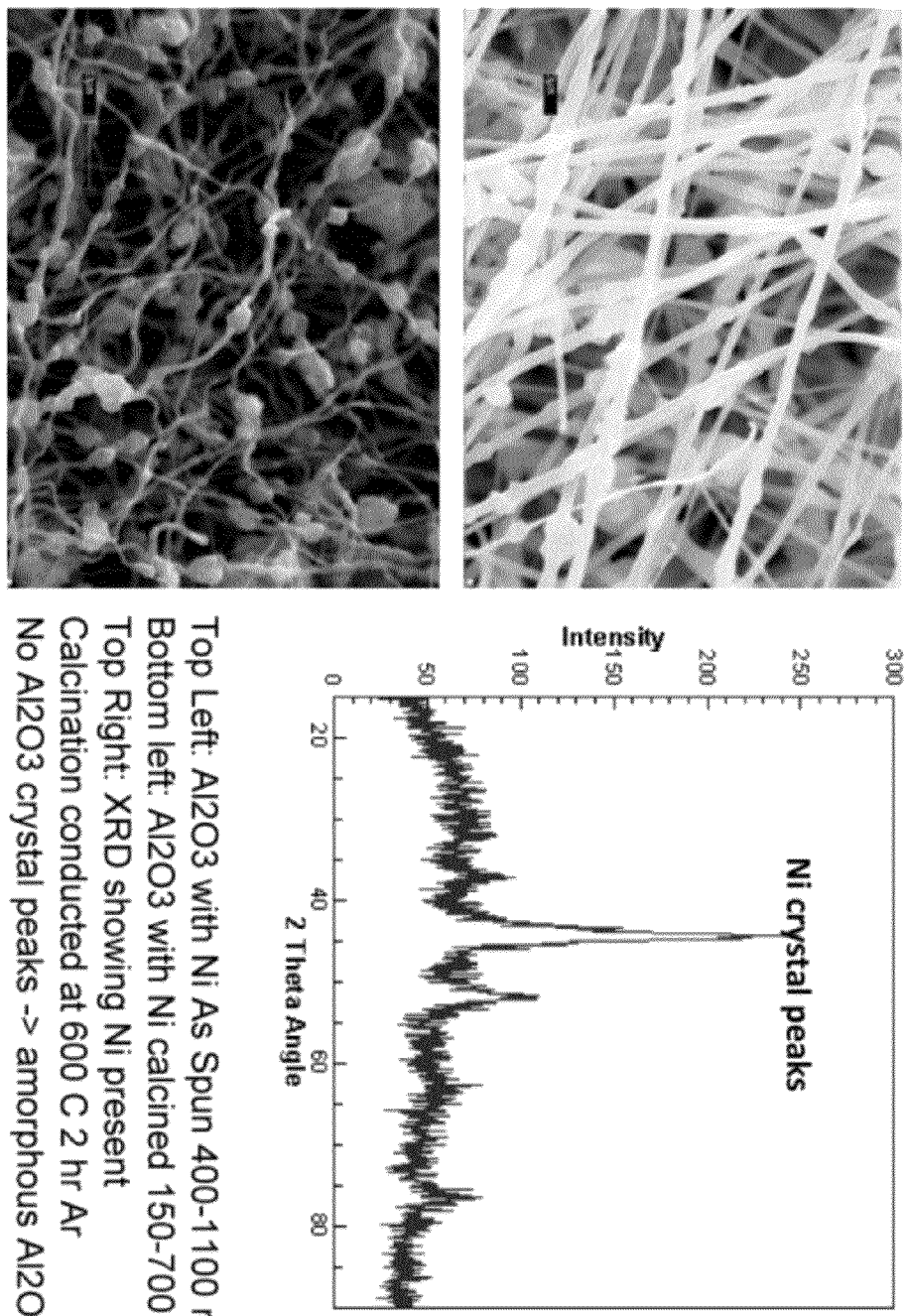
FIG. 21 shows micrographs and an x-ray diffraction plot of $Ni/Al_2O_3$ hybrid nanofibers.
Figure 22:
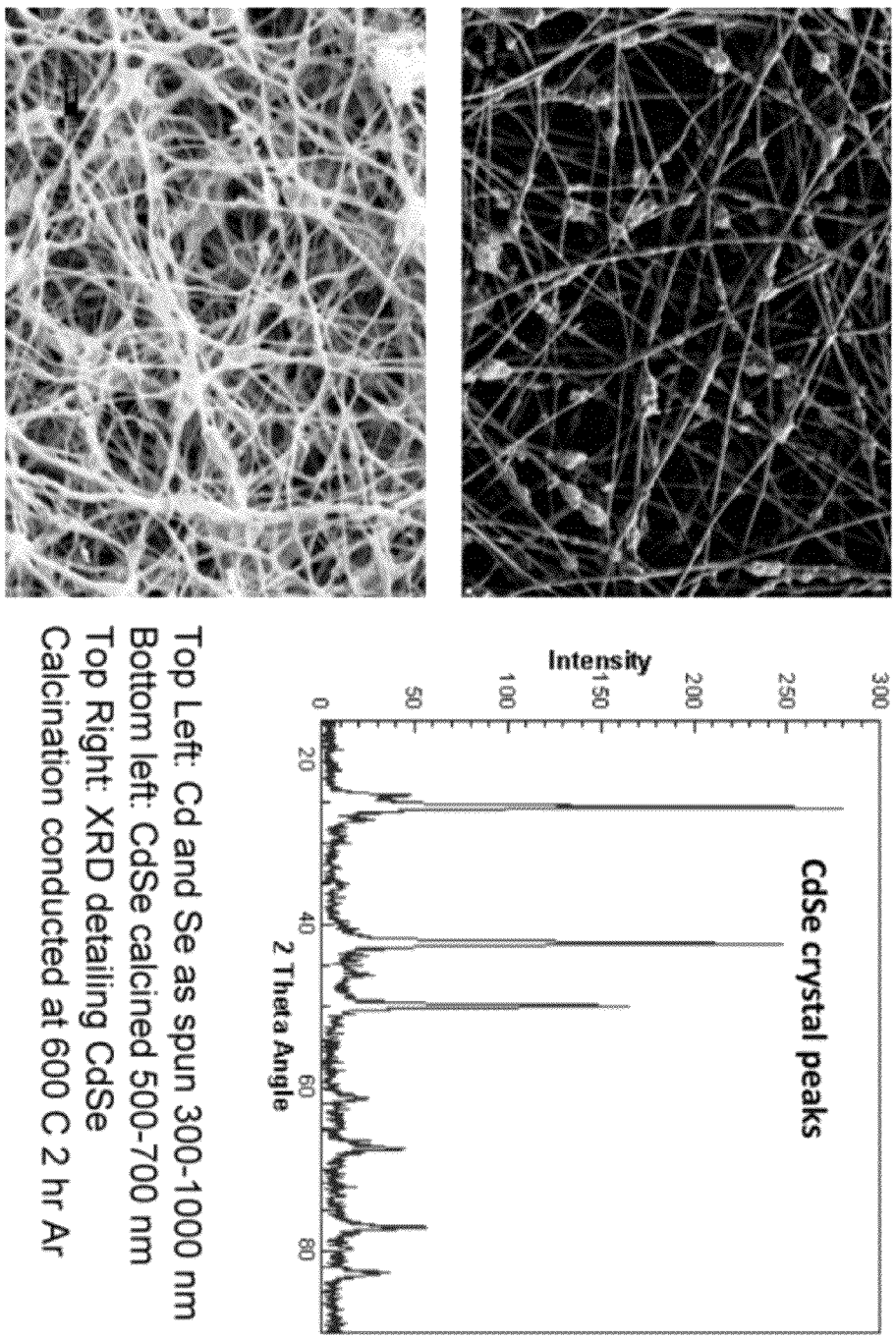
FIG. 22 shows micrographs and an x-ray diffraction plot of CdSe alloy nanofibers.
Figure 26:
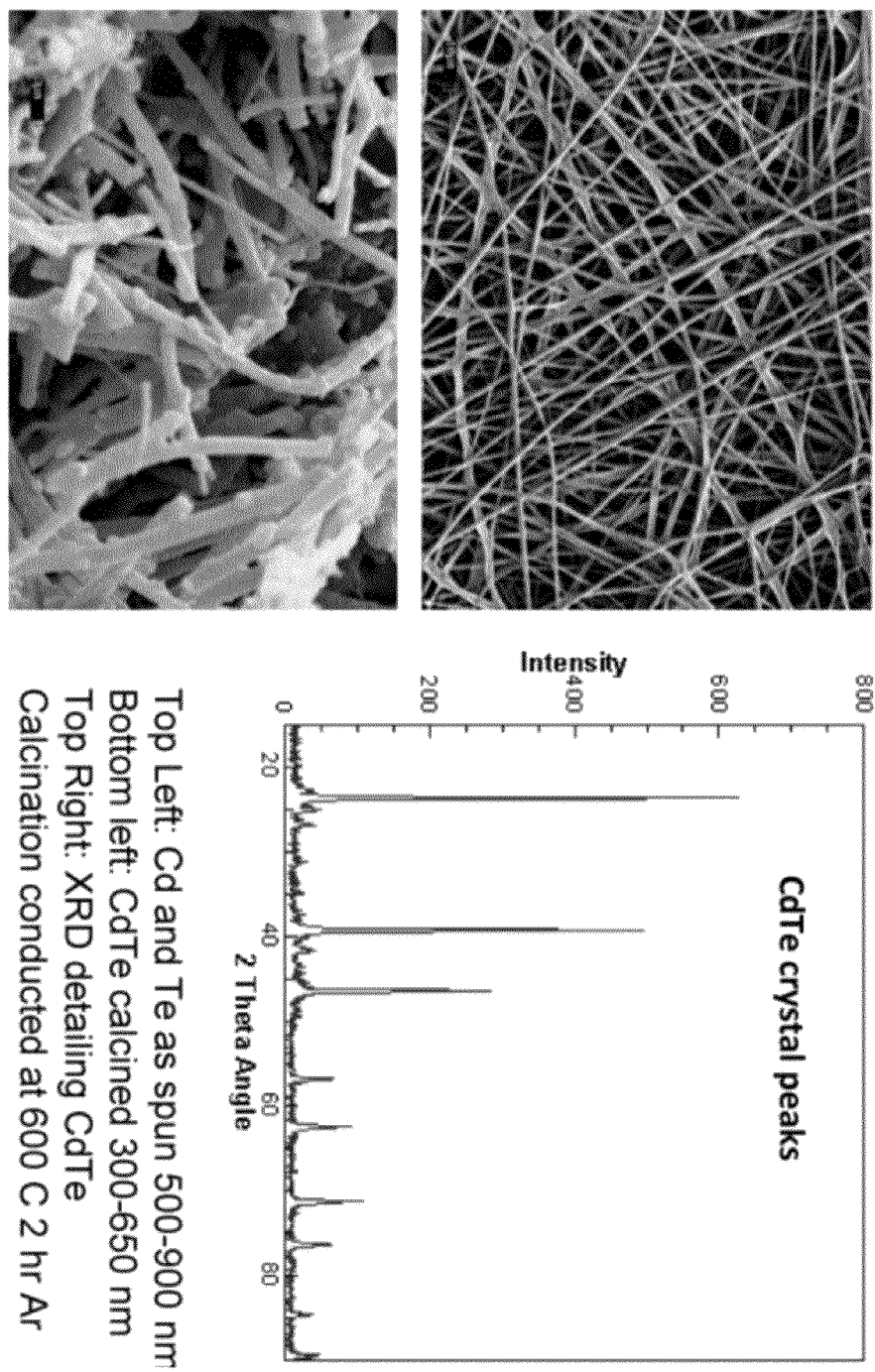
FIG. 26 shows micrographs and an x-ray diffraction plot of CdTe alloy nanofibers.
Figure 27:
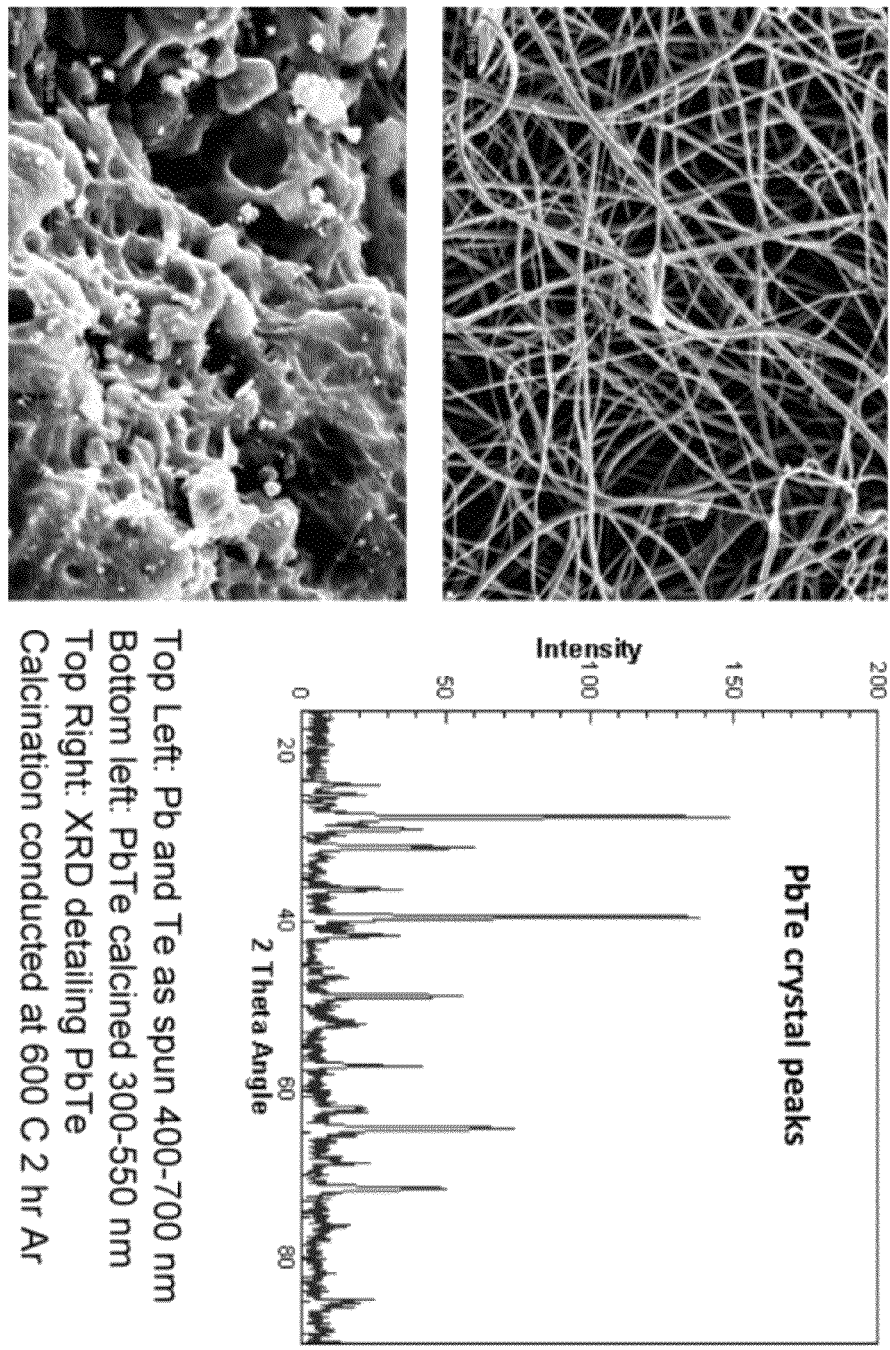
FIG. 27 shows micrographs and an x-ray diffraction plot of PbTe alloy nanofibers.
Figure 28:
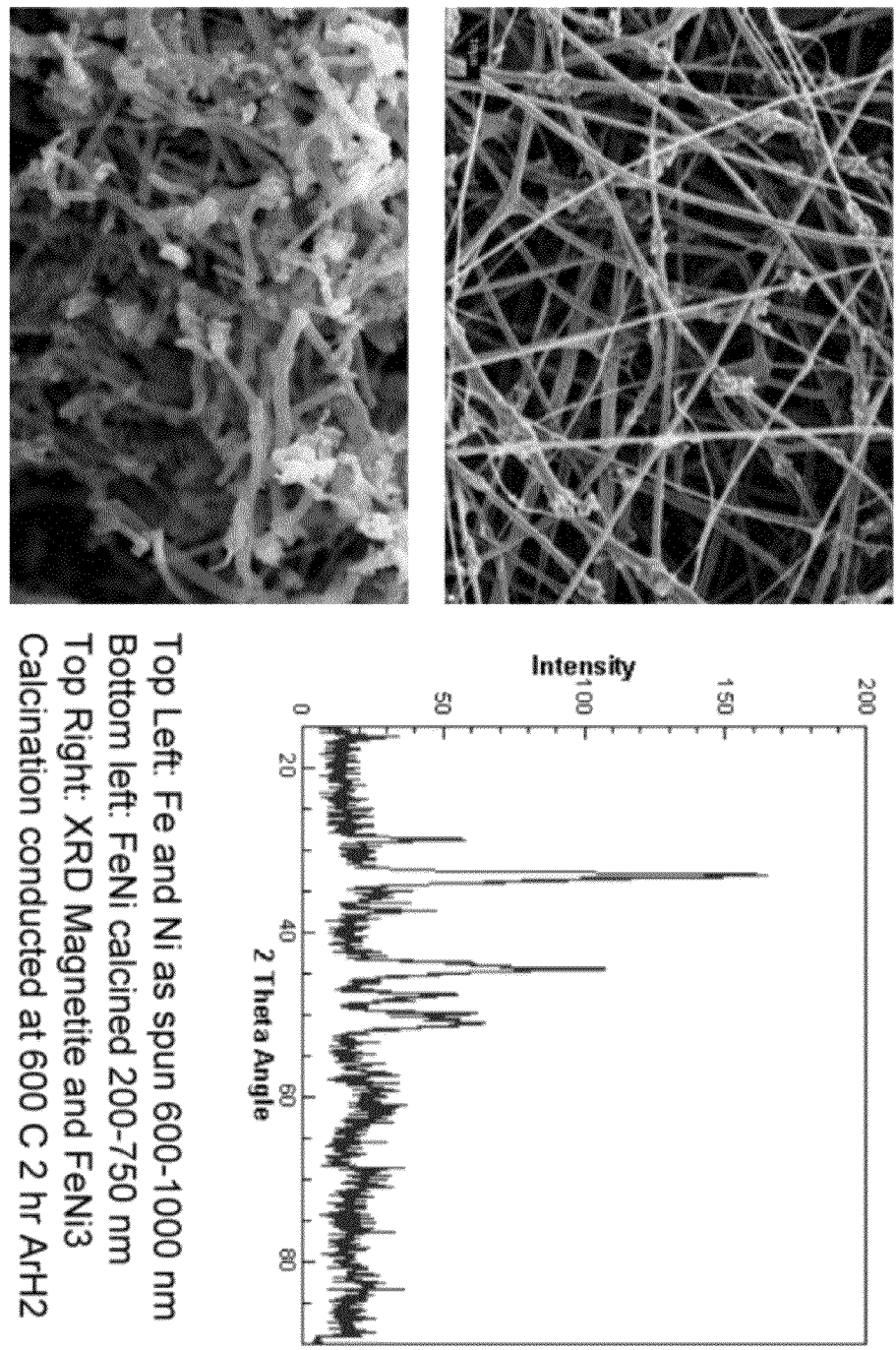
FIG. 28 shows micrographs and an x-ray diffraction plot of $Fe_3O_4$/FeNi alloy nanofibers.
Figure 29:
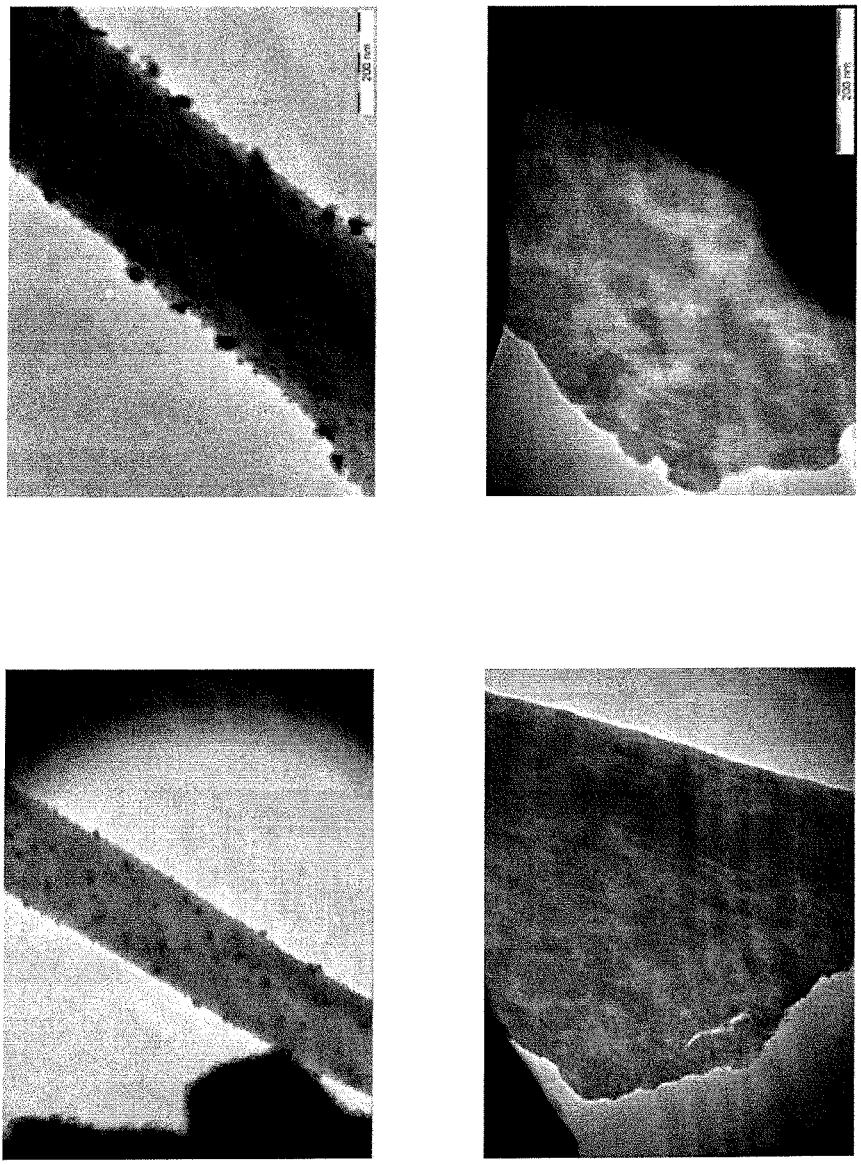
FIG. 29 shows TEM micrographs of $Fe_3O_4$/FeNi alloy nanofibers.

In one aspect, described herein are various nanofibers comprising metal, ceramic, metal alloy, and combinations thereof. In one aspect, described herein are methods for producing various nanofibers comprising metal, ceramic, metal alloy, and combinations thereof. For example: FIG. 16 shows micrographs and an x-ray diffraction plot of ZnO/ZrO$_2$ hybrid nanofibers; FIG. 17 shows micrographs and an x-ray diffraction plot of Ag/ZrO$_2$ hybrid nanofibers; FIG. 18 shows micrographs and an x-ray diffraction plot of Ni/ZrO$_2$ hybrid nanofibers; FIG. 19 shows micrographs and an x-ray diffraction plot of Fe/ZrO$_2$ hybrid nanofibers; FIG. 21 shows micrographs and an x-ray diffraction plot of Ni/Al$_2$O$_3$ hybrid nanofibers; FIG. 22 shows micrographs and an x-ray diffraction plot of CdSe alloy nanofibers; FIG. 26 shows micrographs and an x-ray diffraction plot of CdTe alloy nanofibers; FIG. 27 shows micrographs and an x-ray diffraction plot of PbTe alloy nanofibers; FIG. 28 shows micrographs and an x-ray diffraction plot of Fe$_3$O$_4$/FeNi alloy nanofibers; and FIG. 29 shows TEM micrographs of Fe$_3$O$_4$/FeNi alloy nanofibers.

Figure 20:
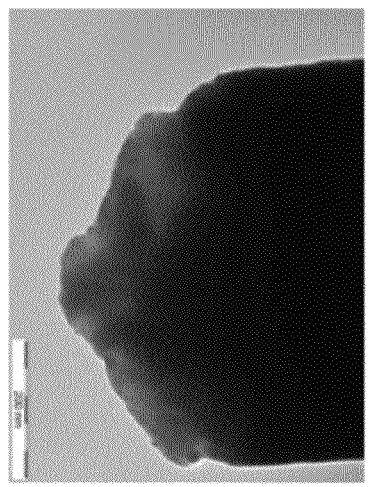
FIG. 20 shows TEM micrographs of various hybrid nanofibers.
Figure 20:
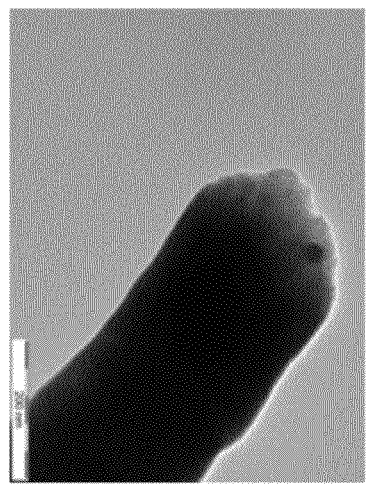
Figure 20:
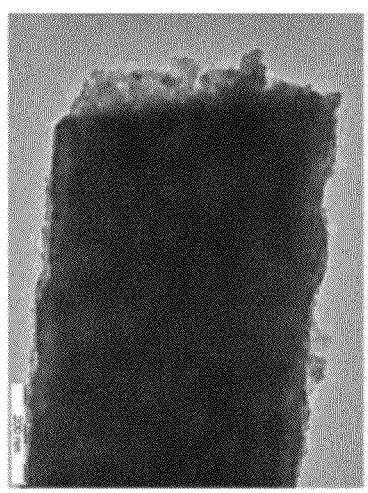
Figure 20:
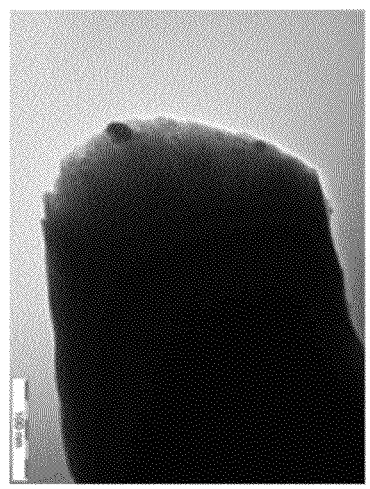

FIG. 20 shows TEM micrographs of various hybrid nanofibers.

Figure 39:
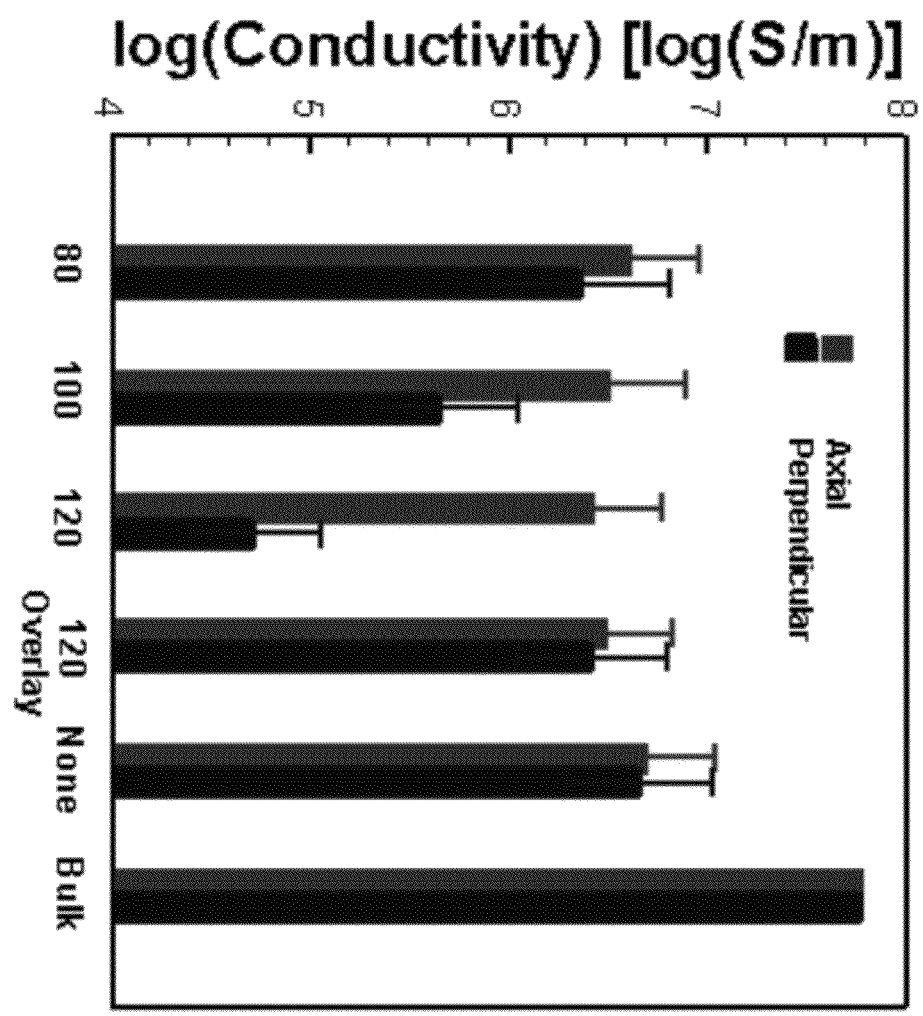
FIG. 39 shows a graphic comparing the effect of fiber alignment conditions on electrical conductivity in the axial and perpendicular direction of a Ni nanofiber mat.

In some instances, the nanofibers are assembled into a nanofiber mat. For example, FIG. 39 shows a graphic comparing the effect of fiber alignment conditions on electrical conductivity in the axial and perpendicular direction of a Ni nanofiber mat.

What is claimed is:

1. A process of producing a nanofiber, the process comprising coaxially electrospinning a fluid stock with a gas into an electrospun material, the gas at least partially surrounding the electrospinning fluid stock, the fluid stock comprising a polymer and a precursor, the precursor comprising (i) metal precursor, (ii) ceramic precursor, or (iii) a combination thereof, and the weight to weight ratio of the precursor to polymer being at least 1:1, and the concentration of the precursor in the fluid stock being at least 200 mM.

2. The process of claim 1, wherein the fluid stock is an aqueous fluid stock.

3. The process of claim 1, wherein the process further comprises removing the polymer from the electrospun material.

4. The process of claim 1, wherein the process further comprises calcination of the precursor to metal, metal oxide, metal alloy, ceramic, or a combination thereof.

5. The process of claim 4, wherein calcination of the metal and/or ceramic precursor(s) is performed under inert, oxidative, or reductive conditions.

6. The process of claim 4, wherein the metal is selected from the group consisting of Ag, Cu, Ni, Fe, Co, Pb, Au, Sn, and Al.

7. The process of claim 4, wherein the ceramic or metal oxide is selected from the group consisting of Al$_2$O$_3$, ZrO$_2$, Fe$_2$O$_3$, CuO, NiO, ZnO, CdO, C, Ge, Si, SiO$_2$, TiO$_2$, V$_2$O$_5$, VO$_2$, Fe$_3$O$_4$, SnO, SnO$_2$, CoO, CoO$_2$, CO$_3$O$_4$, HfO$_2$, BaTiO$_3$, SrTiO$_3$, and BaSrTiO$_3$.

8. The process of claim 1, wherein the fluid stock comprises the precursor associated with the polymer by covalent or non-covalent interactions.

9. The process of claim 8, wherein the association of the precursor with the polymer provides a fluid stock comprising precursor uniformly dispersed therein.

10. The process of claim 1, wherein the polymer and precursor taken together comprise about 1 weight % to about 20 weight % of the fluid stock.

11. The process of claim 1, wherein the metal precursor comprises a metal-ligand complex.

12. The process of claim 11, wherein the metal-ligand complex is a metal acetate, metal nitrate, metal chloride, or metal alko-oxide.

13. The process of claim 1, wherein the polymer is a thermally degradable or chemically degradable polymer.

14. The process of claim 1, wherein the polymer is polyvinyl alcohol, polyvinyl acetate, polyvinyl ether, polyvinyl pyrrolidone, polyglycolic acid, polyethylene oxide, hydroxyethylcellulose (HEC), ethylcellulose, cellulose ethers, polyacrylic acid, polyisocyanate, or any combination thereof.

15. The process of claim 1, wherein the process of electrospinning the fluid stock comprises electrospinning the fluid stock with a second fluid stock about the same or similar axis to produce a layered nanofiber.

16. The process of claim 1, wherein the weight to weight ratio of precursor to polymer is at least 1.5:1.

17. The process of claim 16, wherein the weight to weight ratio of precursor to polymer is at least 2:1.

18. The process of claim 17, wherein the weight to weight ratio of precursor to polymer is 1:1 to 4:1.

* * * * *